(12) United States Patent
Miller

(10) Patent No.: US 8,800,217 B1
(45) Date of Patent: Aug. 12, 2014

(54) BUILDING UTILIZING PANEL CONSTRUCTION

(71) Applicant: Martin P. Miller, Anchorage, AK (US)

(72) Inventor: Martin P. Miller, Anchorage, AK (US)

( * ) Notice: Subject to any disclaimer, the term of this patent is extended or adjusted under 35 U.S.C. 154(b) by 0 days.

(21) Appl. No.: 13/859,160

(22) Filed: Apr. 9, 2013

(51) Int. Cl.
　　*E04H 1/00* (2006.01)
　　*E04F 19/02* (2006.01)
　　*E04H 9/14* (2006.01)
　　*E04B 1/66* (2006.01)
　　*E04B 1/38* (2006.01)

(52) U.S. Cl.
　　CPC *E04H 1/00* (2013.01); *E04F 19/02* (2013.01); *E04H 9/14* (2013.01); *E04B 1/66* (2013.01); *E04B 1/38* (2013.01)
　　USPC .......................................................... 52/79.9

(58) Field of Classification Search
　　USPC .................. 52/79.1, 79.4, 79.9, 79.11, 79.12, 52/79.13, 79.14
　　See application file for complete search history.

(56) References Cited

U.S. PATENT DOCUMENTS

| | | | | |
|---|---|---|---|---|
| 3,566,554 | A * | 3/1971 | Schaffer | 52/64 |
| 4,882,883 | A * | 11/1989 | Horn | 52/79.1 |
| 4,910,931 | A * | 3/1990 | Pardue, Jr. | 52/169.5 |
| 5,657,583 | A * | 8/1997 | Tennant | 52/79.5 |
| 5,890,845 | A * | 4/1999 | Buonaiuto et al. | 405/268 |
| 6,101,779 | A * | 8/2000 | Davenport | 52/602 |
| 6,244,008 | B1 * | 6/2001 | Miller | 52/602 |
| 6,581,337 | B1 * | 6/2003 | Skov et al. | 52/79.5 |
| 6,584,746 | B1 * | 7/2003 | Hohmann et al. | 52/513 |
| 6,604,328 | B1 * | 8/2003 | Paddock | 52/93.1 |
| 6,701,678 | B1 * | 3/2004 | Skov et al. | 52/79.9 |
| 7,658,038 | B2 * | 2/2010 | Mower et al. | 52/79.1 |
| 7,677,006 | B2 * | 3/2010 | Rozenberg et al. | 52/582.2 |
| 7,707,799 | B2 * | 5/2010 | Wrass et al. | 52/784.14 |
| 7,856,767 | B2 * | 12/2010 | Janesky | 52/169.14 |
| 7,874,121 | B1 * | 1/2011 | Hohmann, Jr. | 52/717.01 |
| 7,926,227 | B2 * | 4/2011 | Mower et al. | 52/79.6 |
| 8,033,062 | B2 * | 10/2011 | Ferriere | 52/79.9 |
| 8,065,841 | B2 * | 11/2011 | Antonic | 52/90.1 |
| 8,132,372 | B2 * | 3/2012 | Mower et al. | 52/79.1 |
| 8,646,220 | B2 * | 2/2014 | Kopp et al. | 52/79.1 |
| 2009/0300999 | A1 * | 12/2009 | Ferriere | 52/79.9 |
| 2012/0042582 | A1 * | 2/2012 | Hohmann, Jr. | 52/62 |
| 2012/0102847 | A1 * | 5/2012 | Kopp et al. | 52/79.1 |

OTHER PUBLICATIONS http://www.infoforbuilding.com/soffit_fascia_n.html , "info for building," Soffit and Fascia, Jul. 4, 2004.*

* cited by examiner

*Primary Examiner* — William Gilbert
*Assistant Examiner* — Gisele Ford
(74) *Attorney, Agent, or Firm* — Michael Tavella

(57) ABSTRACT

A building utilizing Panel construction that has a floor assembly, wall assemblies and a roof assembly. The assemblies are manufactured off site and delivered ready to install. After a foundation is prepared, the Floor Joist Assembly (FJA) system is installed. The walls have three main components—a Stationary Structural Wall (SSW) that is delivered assembled; a Removable Facade Wall (RFW) that is delivered assembled; and a Crawlspace Insulation Assembly (CIA) that is partially assembled on site. The Roof Assembly Material (RAM) has trusses, an exterior weatherproof cover; and a finished ceiling assembly. The system is designed to provide an easy assembly of a complete structure that meets all hurricane and other building code measures in an economical package. The Electrical, Plumbing and Mechanical systems are installed with/ as the floor and walls are installed. The lines are then connected after the structure is in place.

18 Claims, 95 Drawing Sheets

1060d

1060b

1060d

1060b

US 8,800,217 B1

BUILDING UTILIZING PANEL CONSTRUCTION

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to stick constructed buildings and particularly to modular type building construction utilizing double wall type construction.

2. Description of the Prior Art

Constructing shelters has been an essential part of human development since the beginning of civilization. In the last century, buildings have been developed beyond the ordinary "stick-frame" construction into new modular designs. Many of these designs essentially build the structure in a factory as several sub assemblies. In some cases, these structures are simply factory made structural insulated panel (SIPs) assemblies made of two pieces of plywood sandwiching insulation, that are moved to a construction site and connected by trained contractors. In others, the modules are designed into entire rooms that are moved to a construction site, lifted into place with a crane and assembled as giant building blocks by contractors. In most of these systems all of the life supports systems-electrical, plumbing and hvac are pre-installed. All that is needed are the final finishes. What is missing from this field is a simple system that is cost effective; the owner can easily assemble using no heavy equipment, and that is energy efficient and safe.

BRIEF DESCRIPTION OF THE INVENTION

The instant invention eliminates all of the problems associated with conventional stick built homes and makes improvements on conventional modular structures. This is a new concept that groups stick construction components into blocks for assembly. Instead of building a home, for example, with all of the plumbing and electrical installed by "contractors" in a large box module or contractors assembling a stick building, this system provides a structure what is essentially a floor, walls and a roof with attached panelized fixtures, utilities and lines installed by the "owner" or a contractor. The walls are finished in dry wall, paneling or other interior finish material. The exterior is provided with a siding material. One key advantage of this system is that the walls are formed of two parts. The first is an inner Stationary Structural Wall (SSW) and the second is an exterior "decorative" Removable Façade Wall (RFW). This outer wall can be easily replaced if it is damaged, or if the owner wished to change the look of the exterior with no contractor necessary.

All plumbing and electrical wiring as well as heating, ventilation and air conditioning are connected in the field by the owner with easy hookups, which is not the case in a conventional building. This provides the owner with the ability to build the building, without the help of any contractors; connecting the utility lines with simple easy hookups as the Panel Structure is erected.

The structure is an energy efficient unit having high R-values (degrees) of insulation. The walls are designed to be strong and are able to withstand hurricane and tornado winds and wind borne debris up to 135 MPH.

Figure 2:
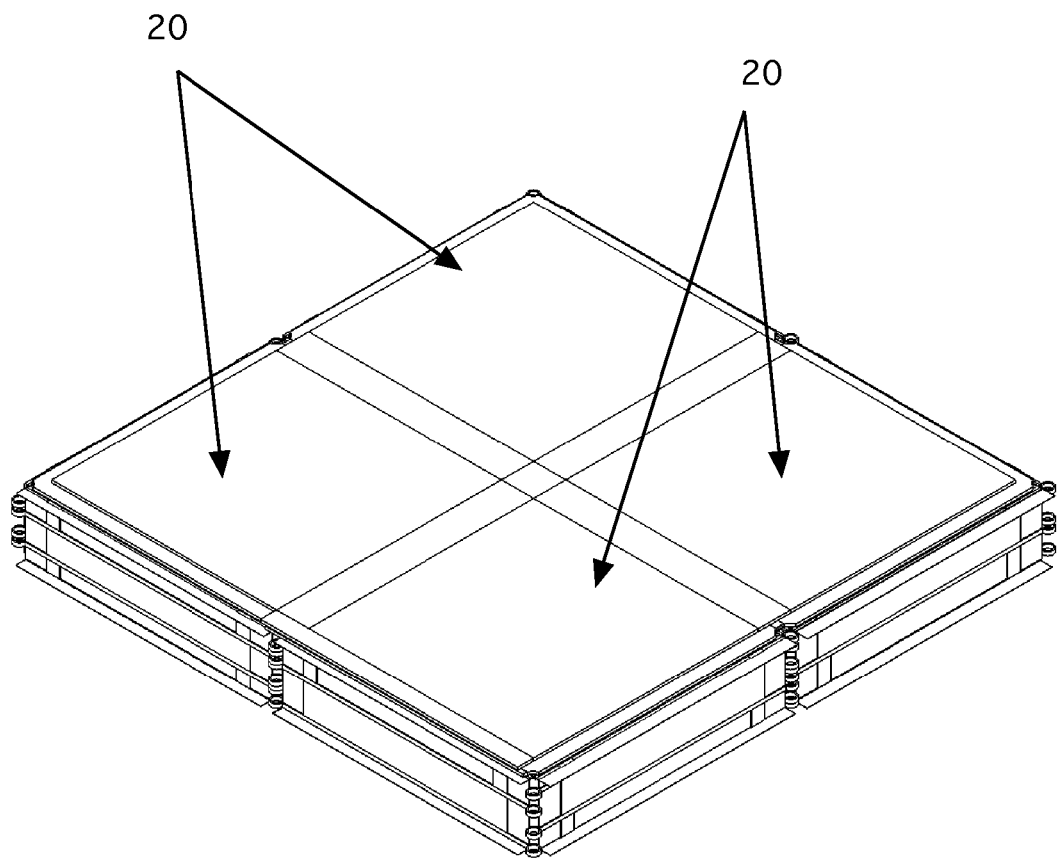

The floor:

FIG. 2 is a top perspective view of four assembled Floor Joist Assemblies (FJAs) and finished flooring strips.

Figure 3:
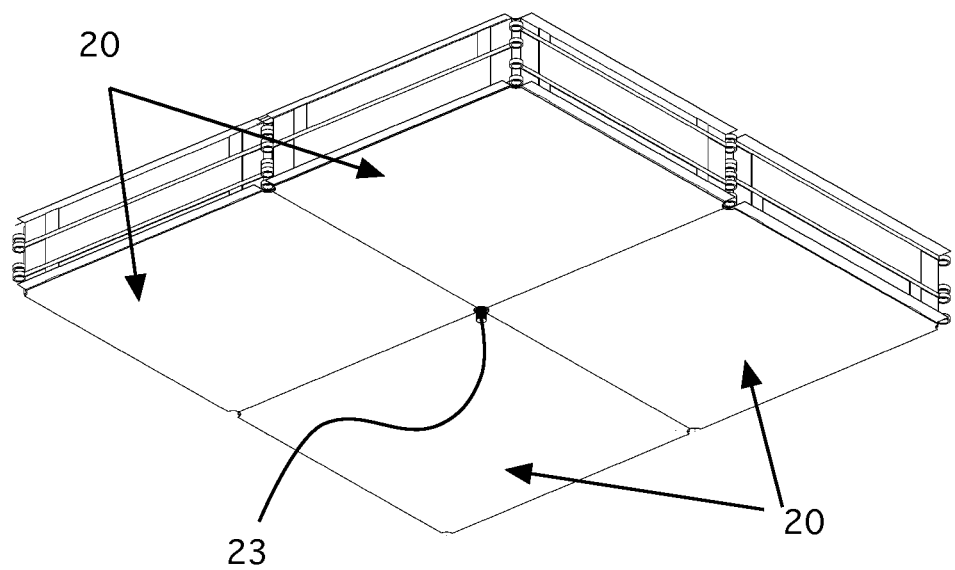

FIG. 3 is a bottom perspective view of four assembled Floor Joist Assemblies (FJAs) with Machine Shoulder Bolt (MSB) in the center.

Figure 3A:
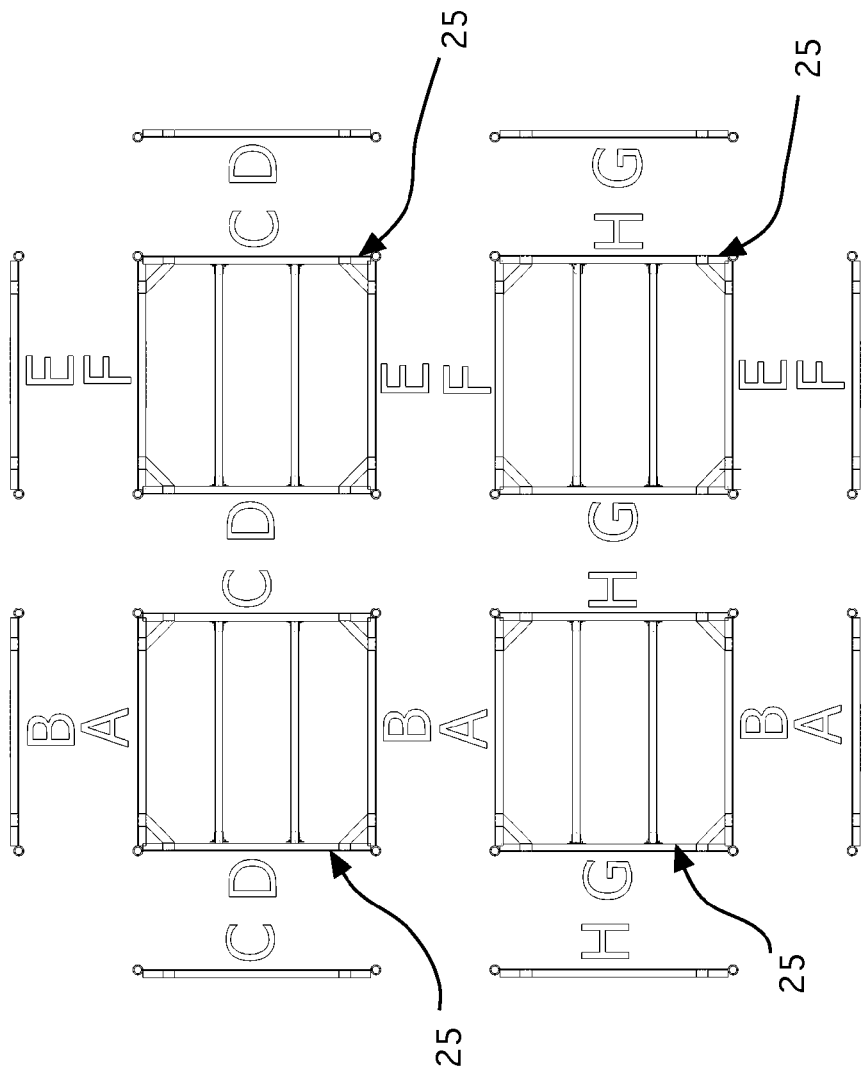

FIG. 3a is a detail view of the Floor Joist Assembly (FJAs) showing their alignments.

Figure 4:
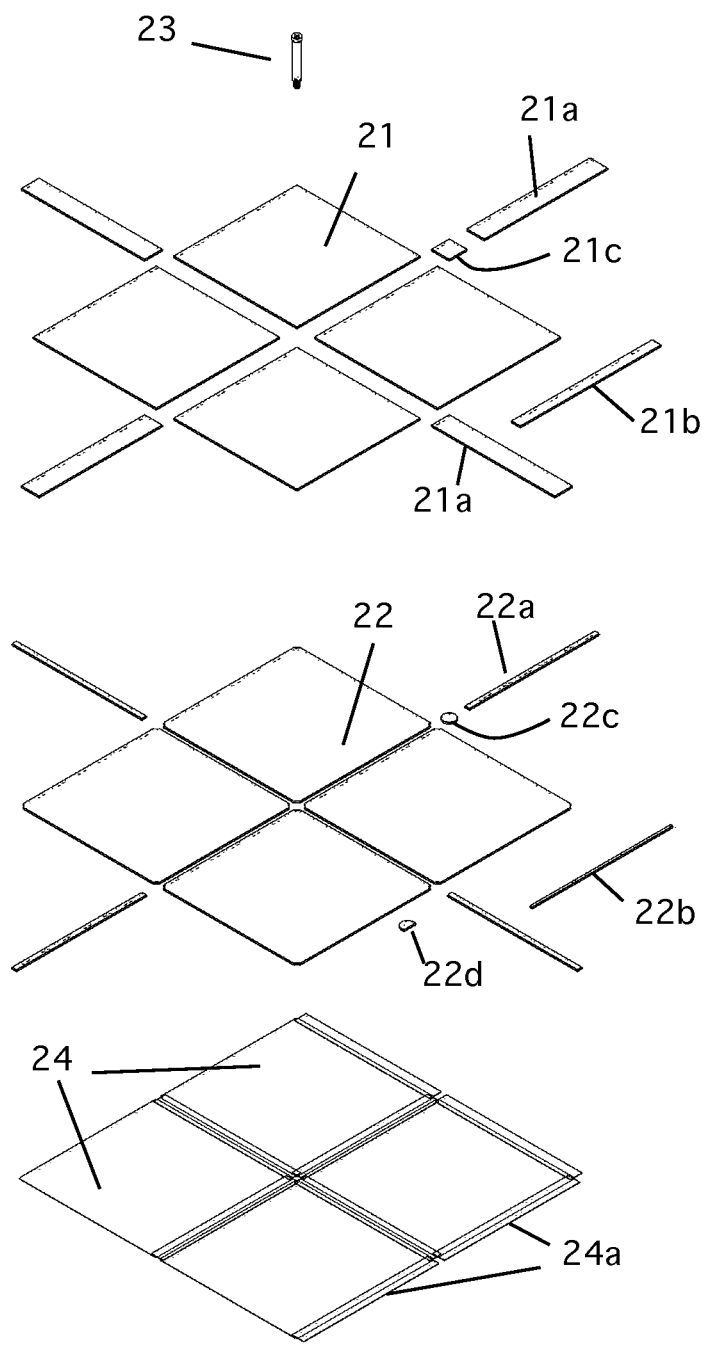

FIG. 4 is a top perspective exploded view showing the upper portion of the floor assembly.

Figure 5:
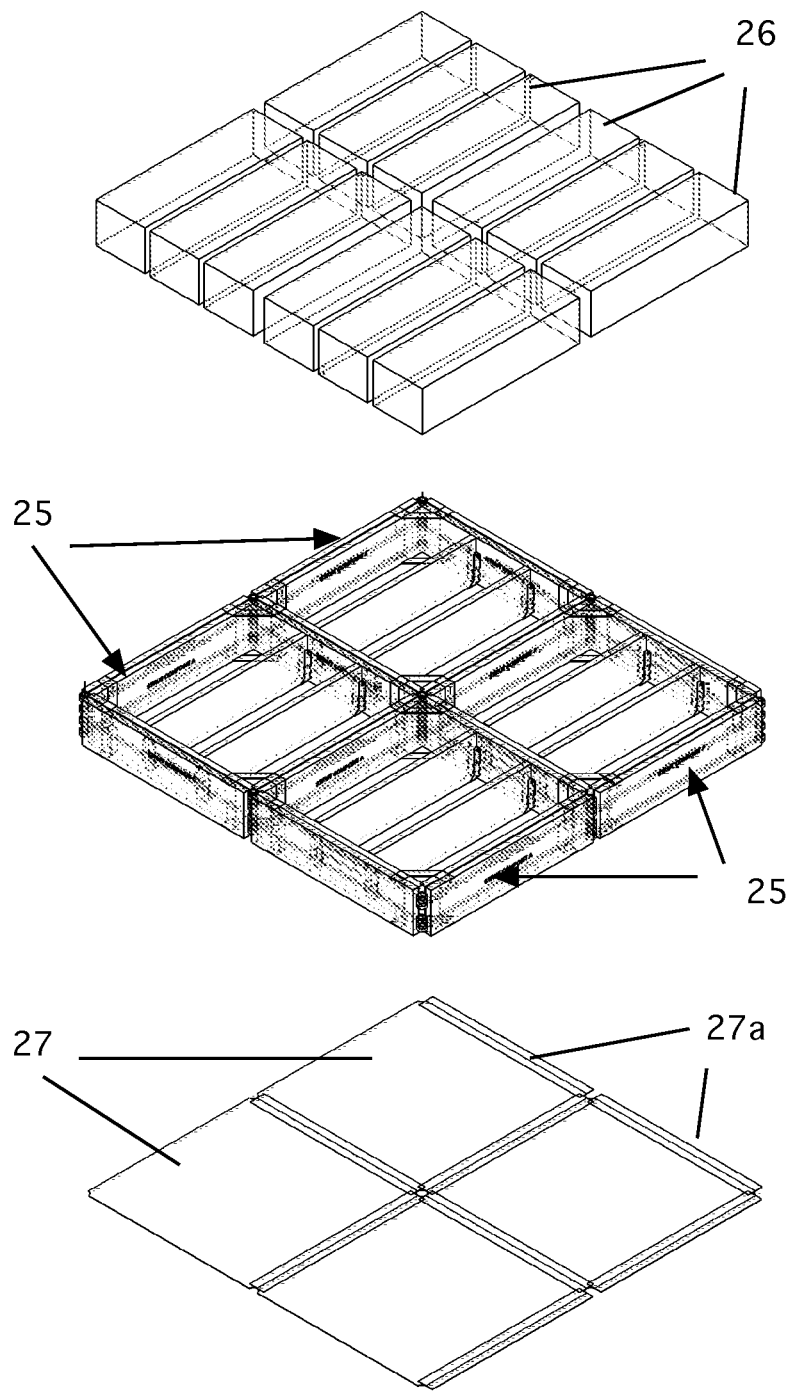

FIG. 5 is a top perspective exploded view showing the remainder of the floor assembly.

Figure 6:
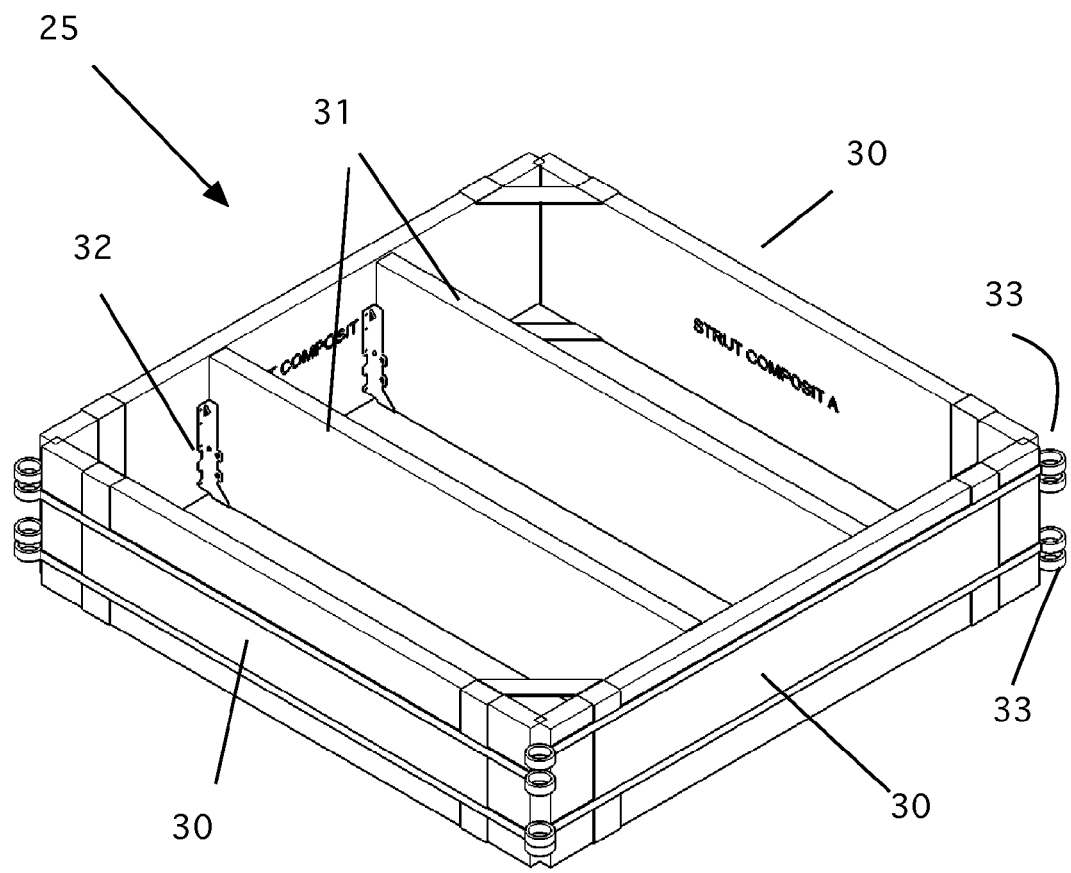

FIG. 6 is a top partial perspective view of a Floor Joist Assembly (FJA).

Figure 7:
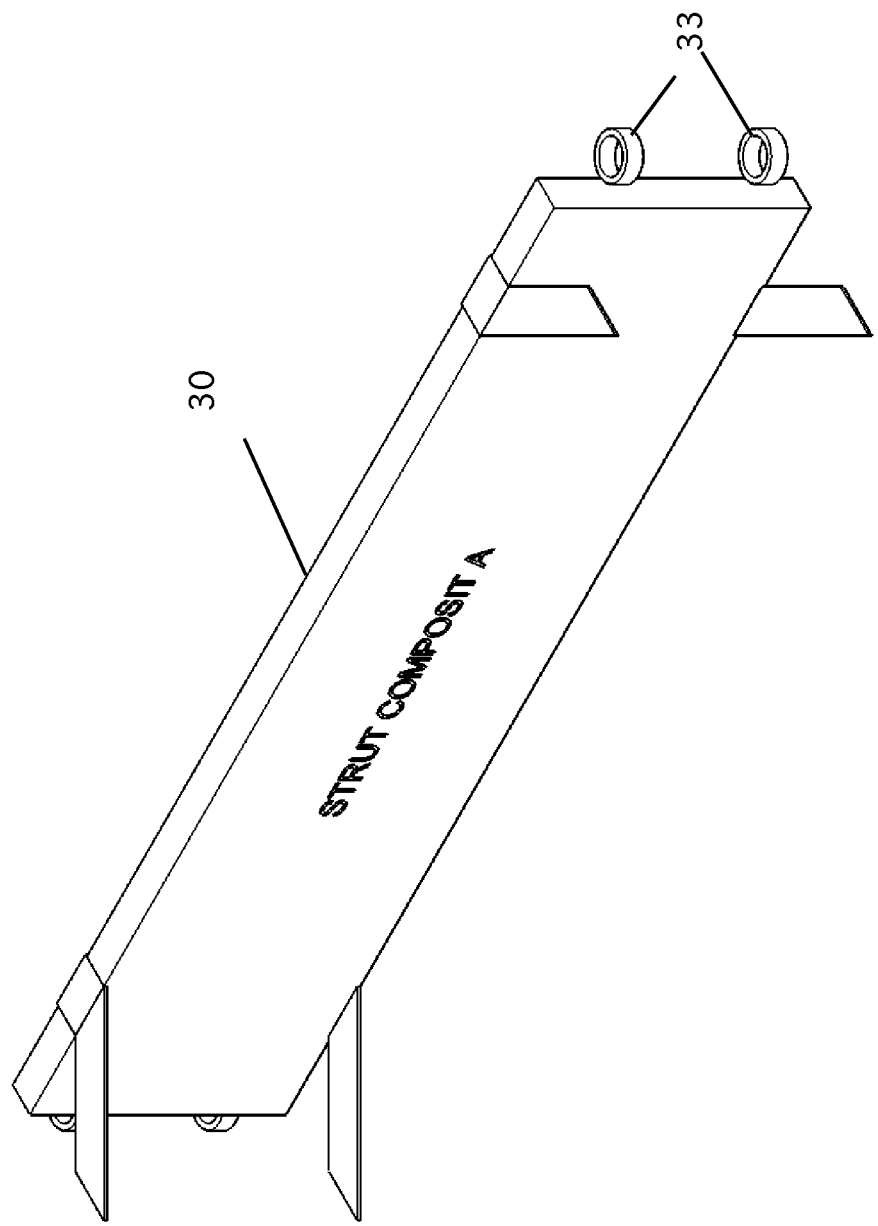

FIG. 7 is a front perspective view of one of the Floor Strut Composites (FSCs).

Figure 8:
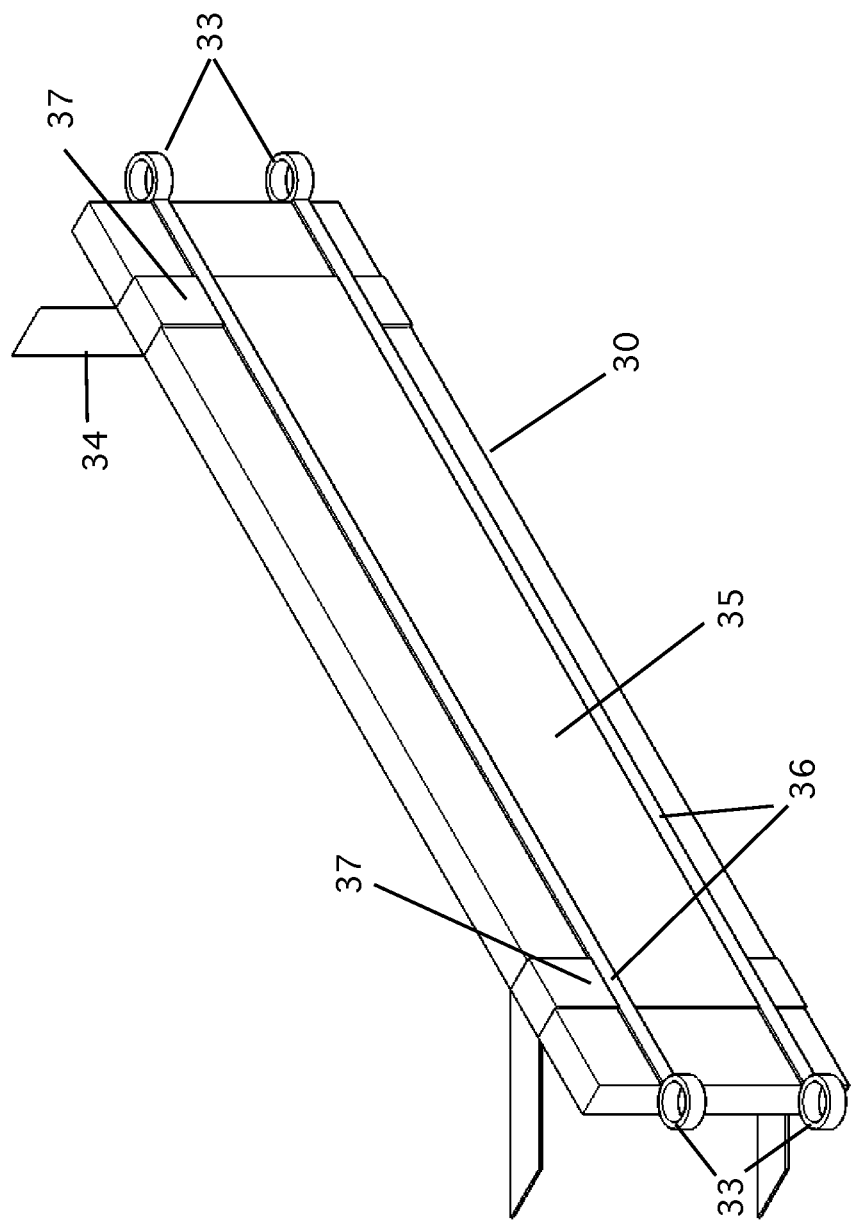

FIG. 8 is a rear perspective view of one of the Floor Strut Composites (FSCs).

Figure 9:
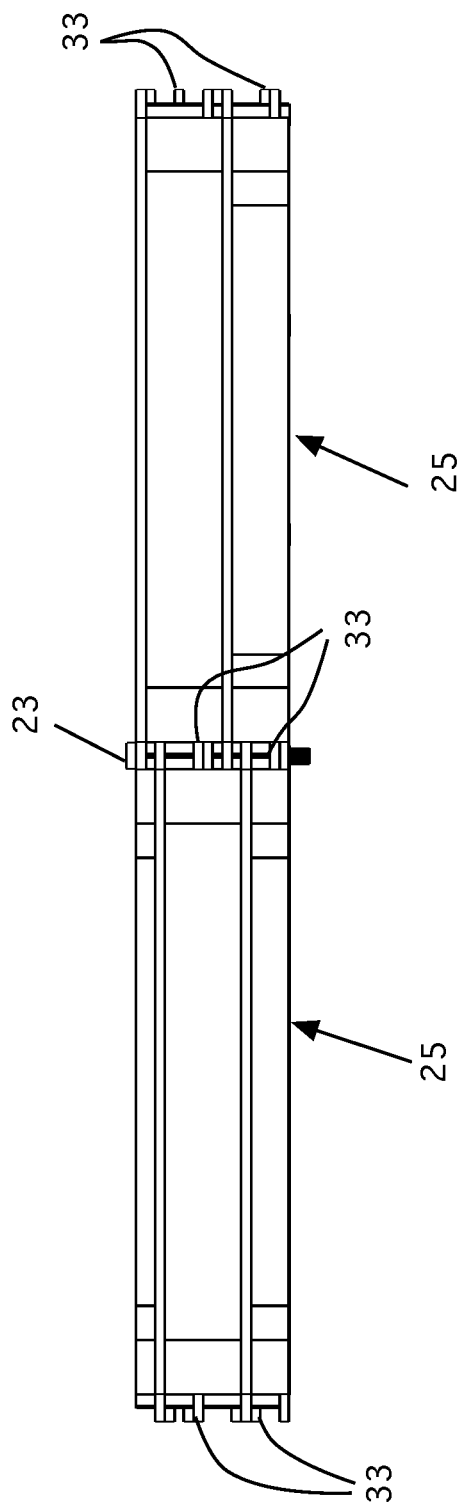

FIG. 9 is a side view of two assembled Floor Joist Assemblies (FJAs) with Machine Shoulder Bolt (MSB).

Figure 10:
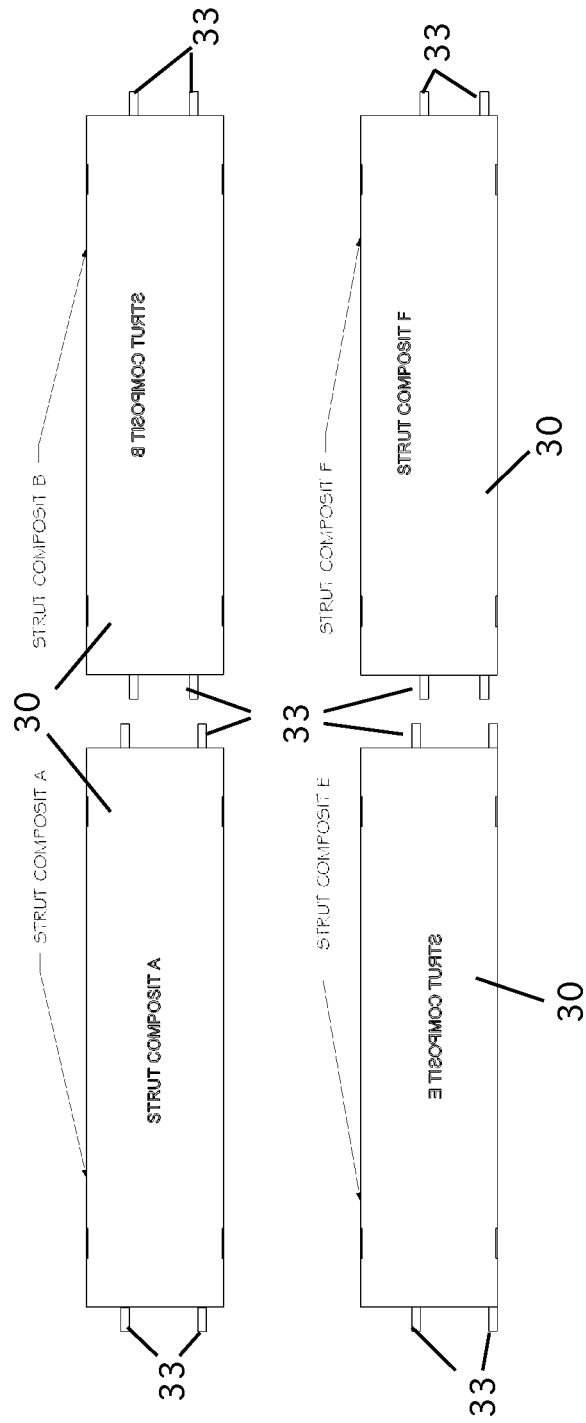

FIG. 10 is an inner detail view of the alignment for assembly of floor frames A to B and E to F.

Figure 11:
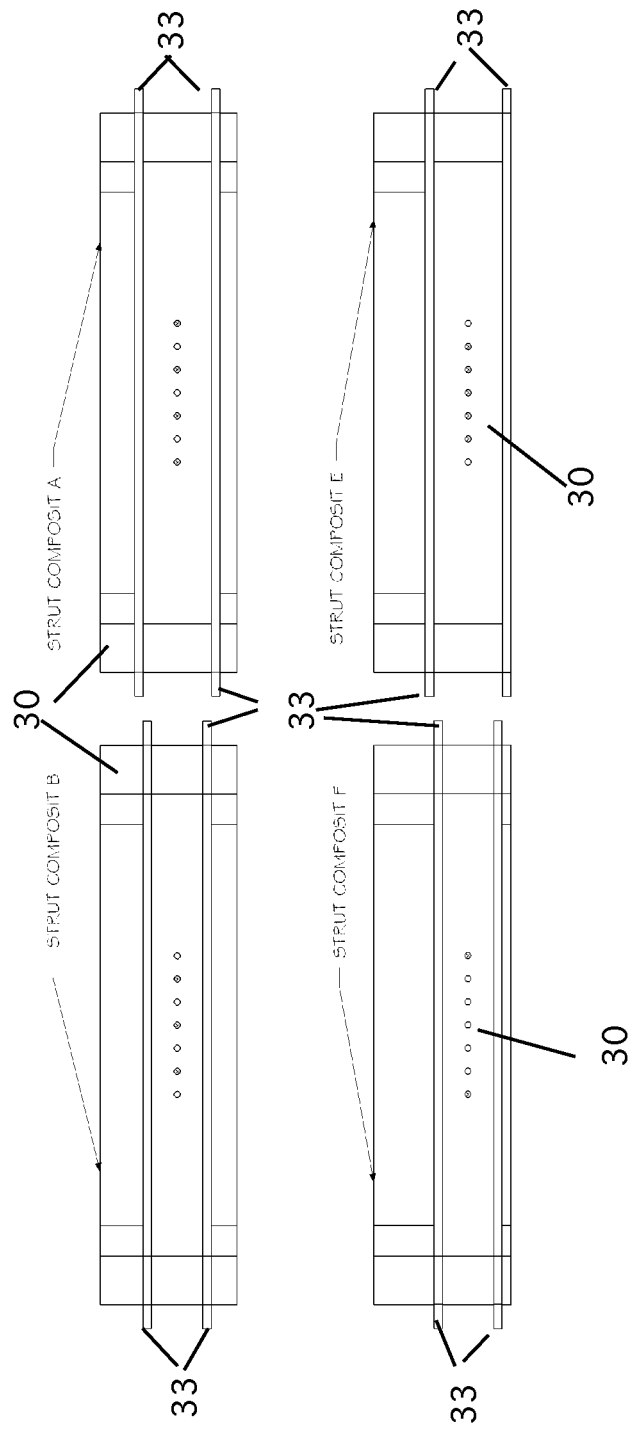

FIG. 11 is an outer detail view of the alignment for assembly of floor frames A to B and E to F.

Figure 12:
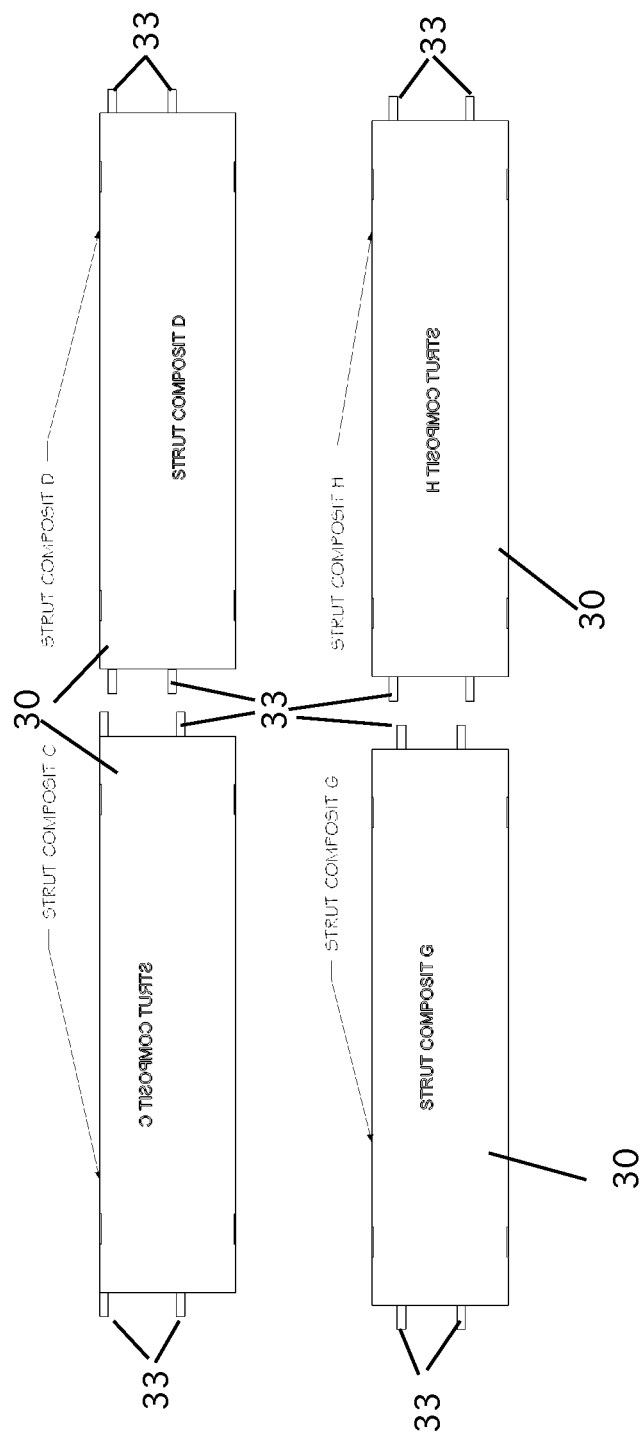

FIG. 12 is an inner detail view of the alignment for assembly of floor frames C to D and G to H.

Figure 13:
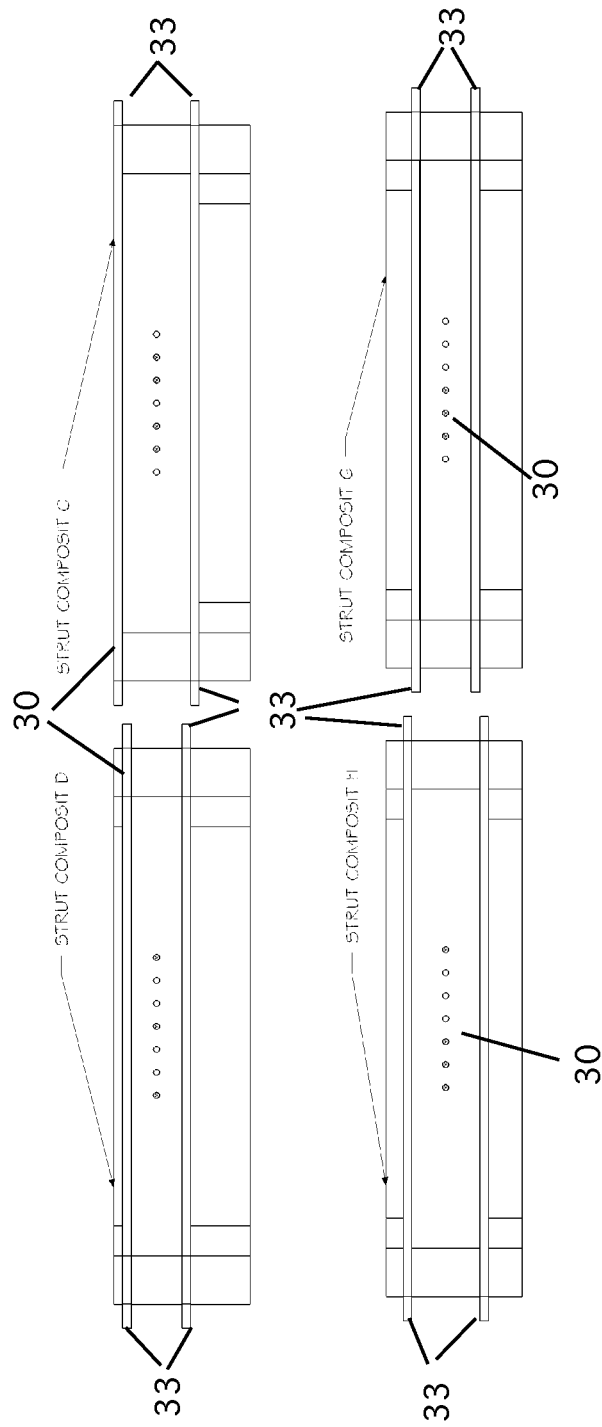

FIG. 13 is an outer detail view of the alignment for assembly of floor frames C to D and G to H.

Figure 14:
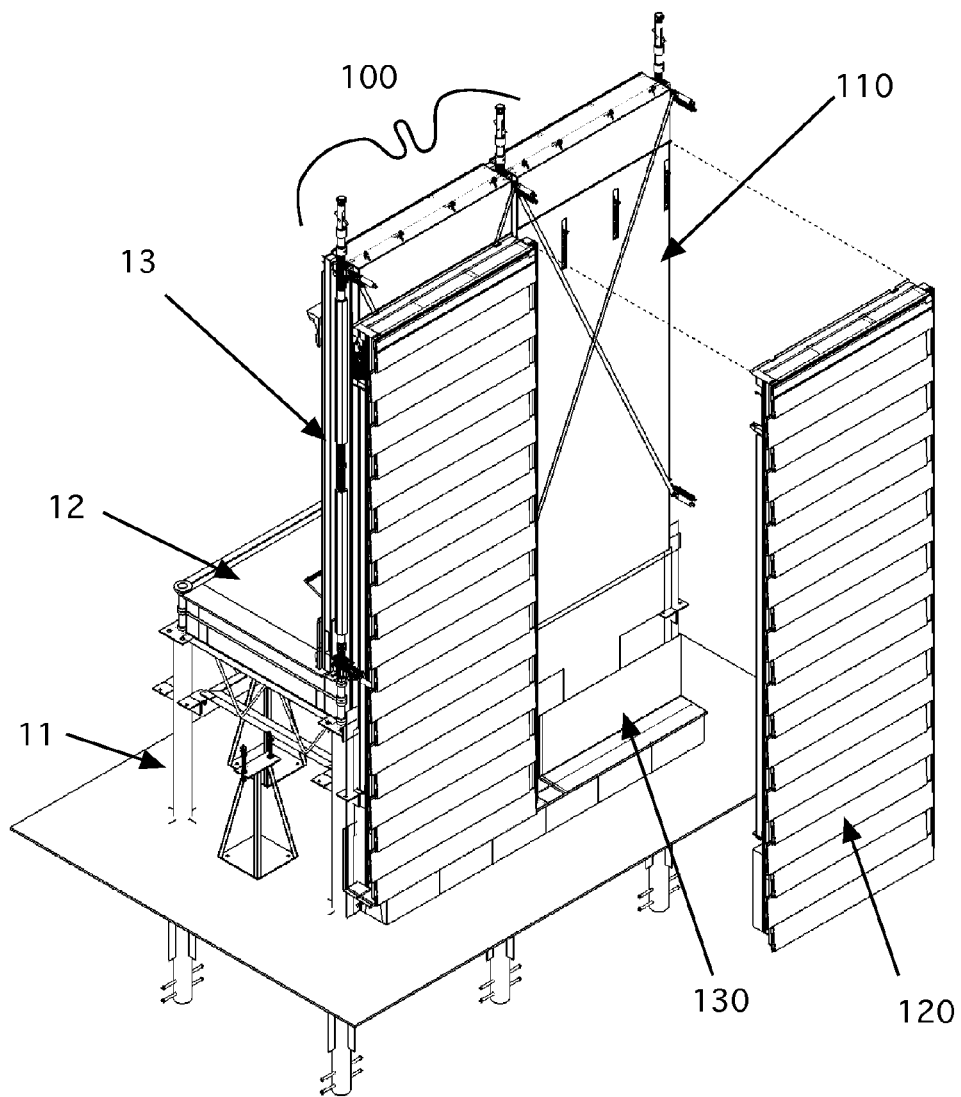

The walls:

FIG. 14 is a partially exploded front perspective view of two Smart Wall Panels (SWPs).

Figure 15:
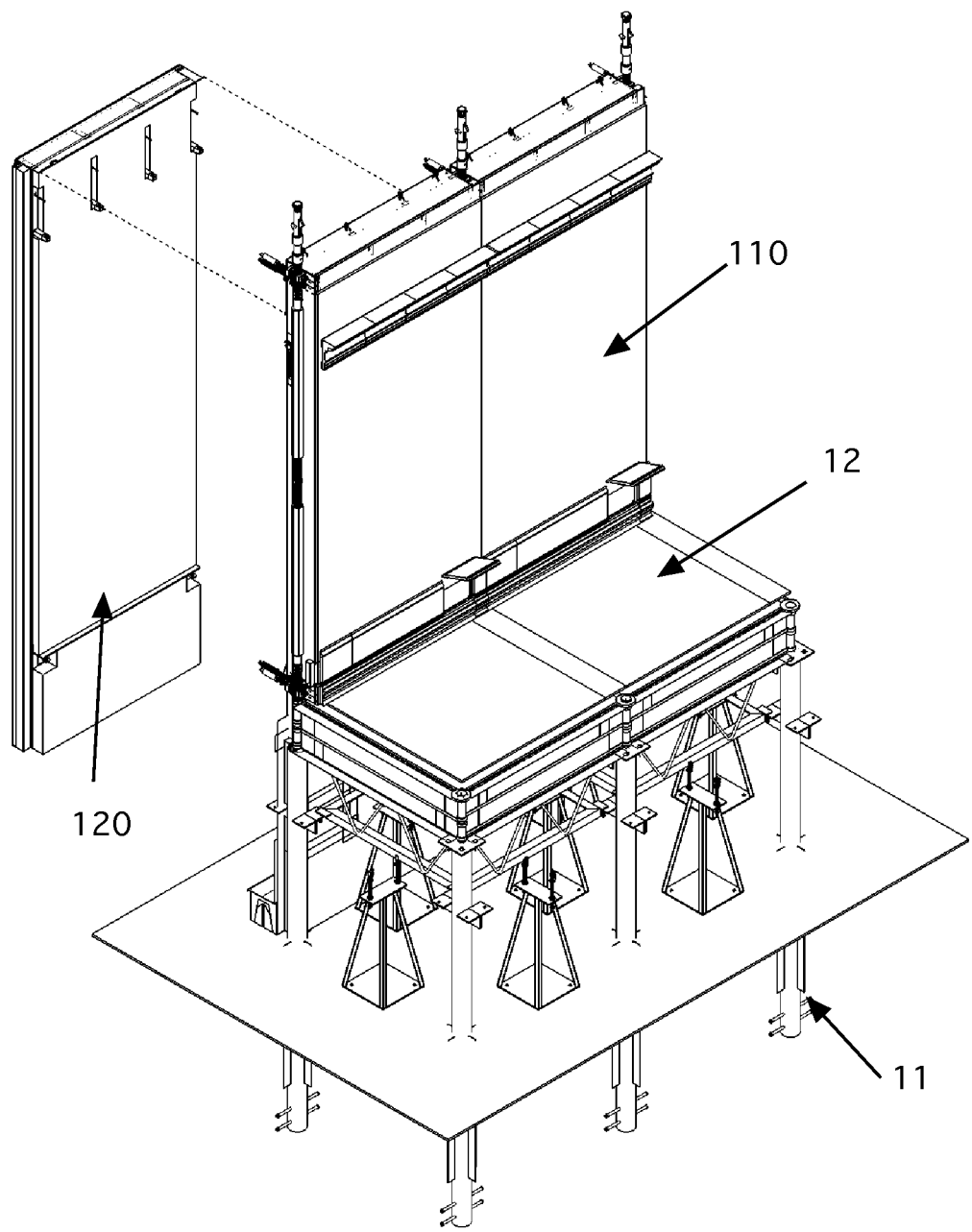

FIG. 15 is a partially exploded rear perspective view of two Smart Wall Panels (SWPs).

Figure 16:
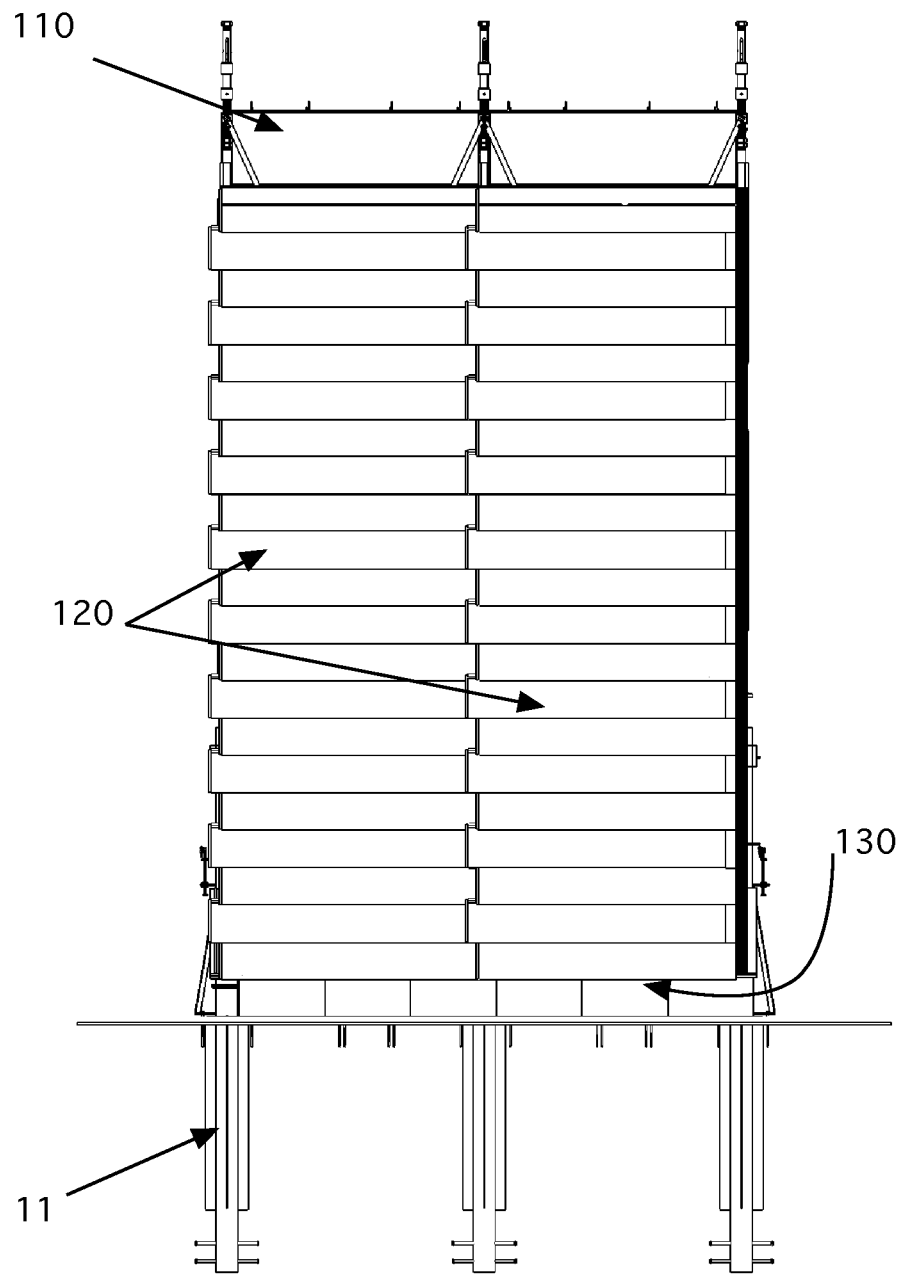

FIG. 16 is a front view of two Smart Wall Panels (SWPs).

Figure 17:
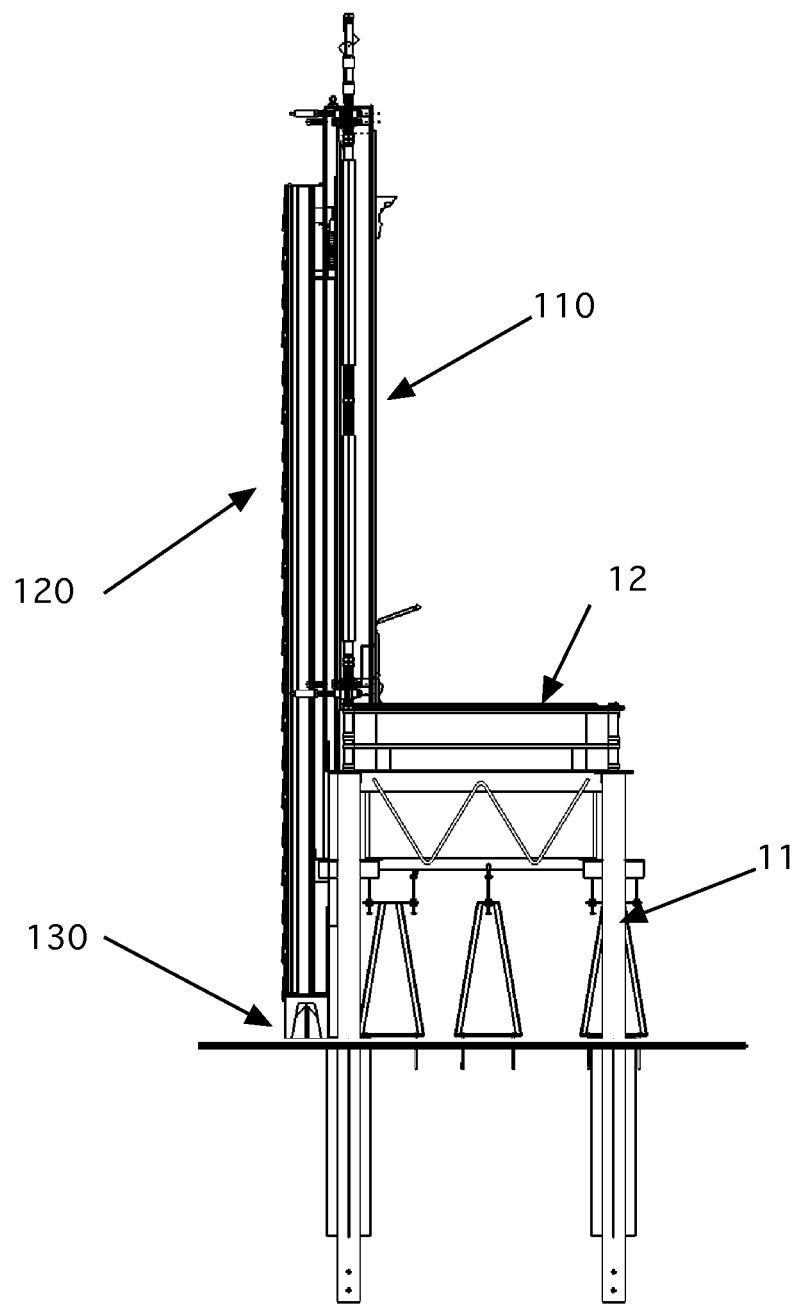

FIG. 17 is a side view of two Smart Wall Panels (SWPs).

Figure 18:
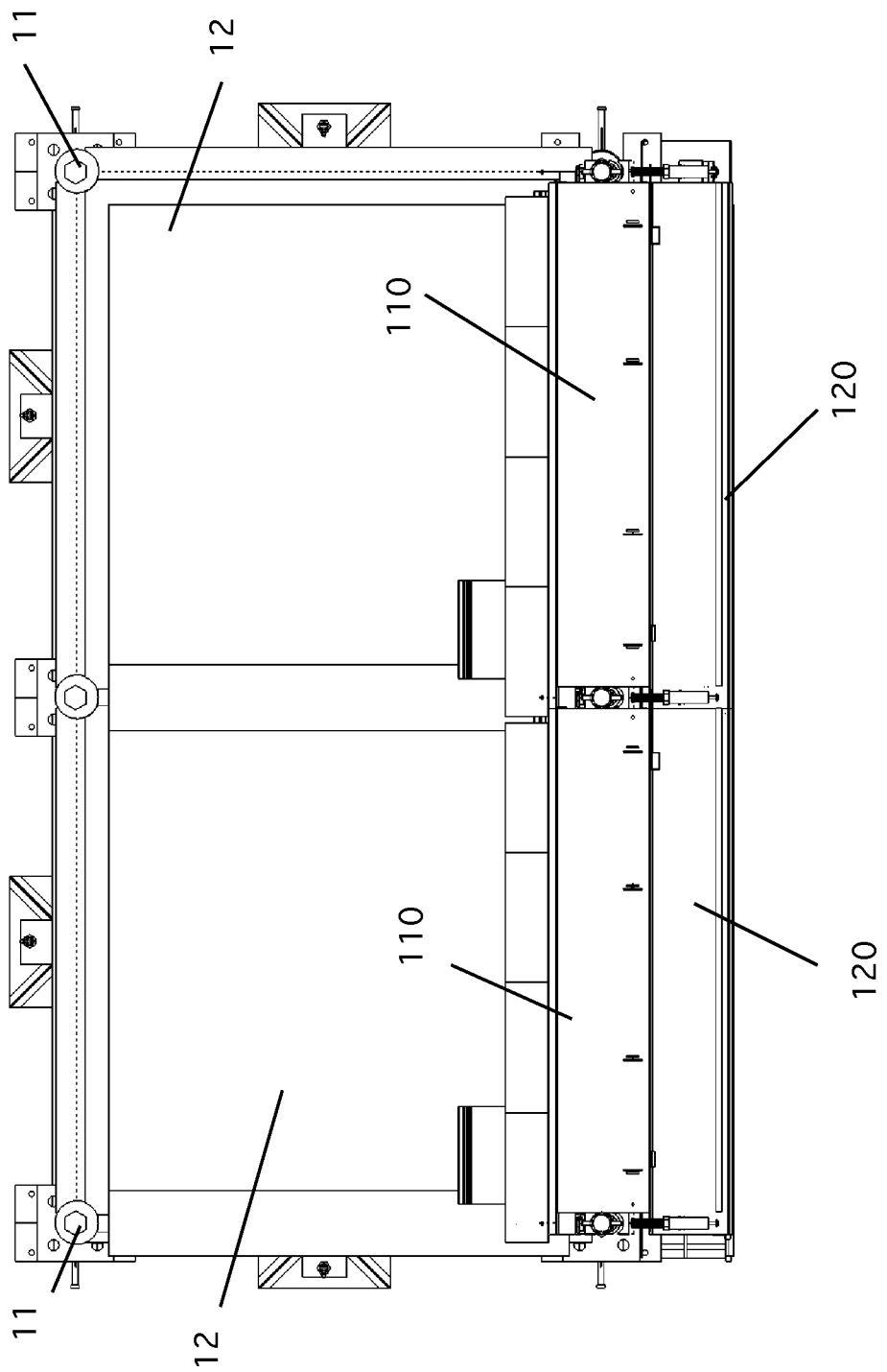

FIG. 18 is a top view of two Smart Wall Panels (SWPs).

Figure 19:
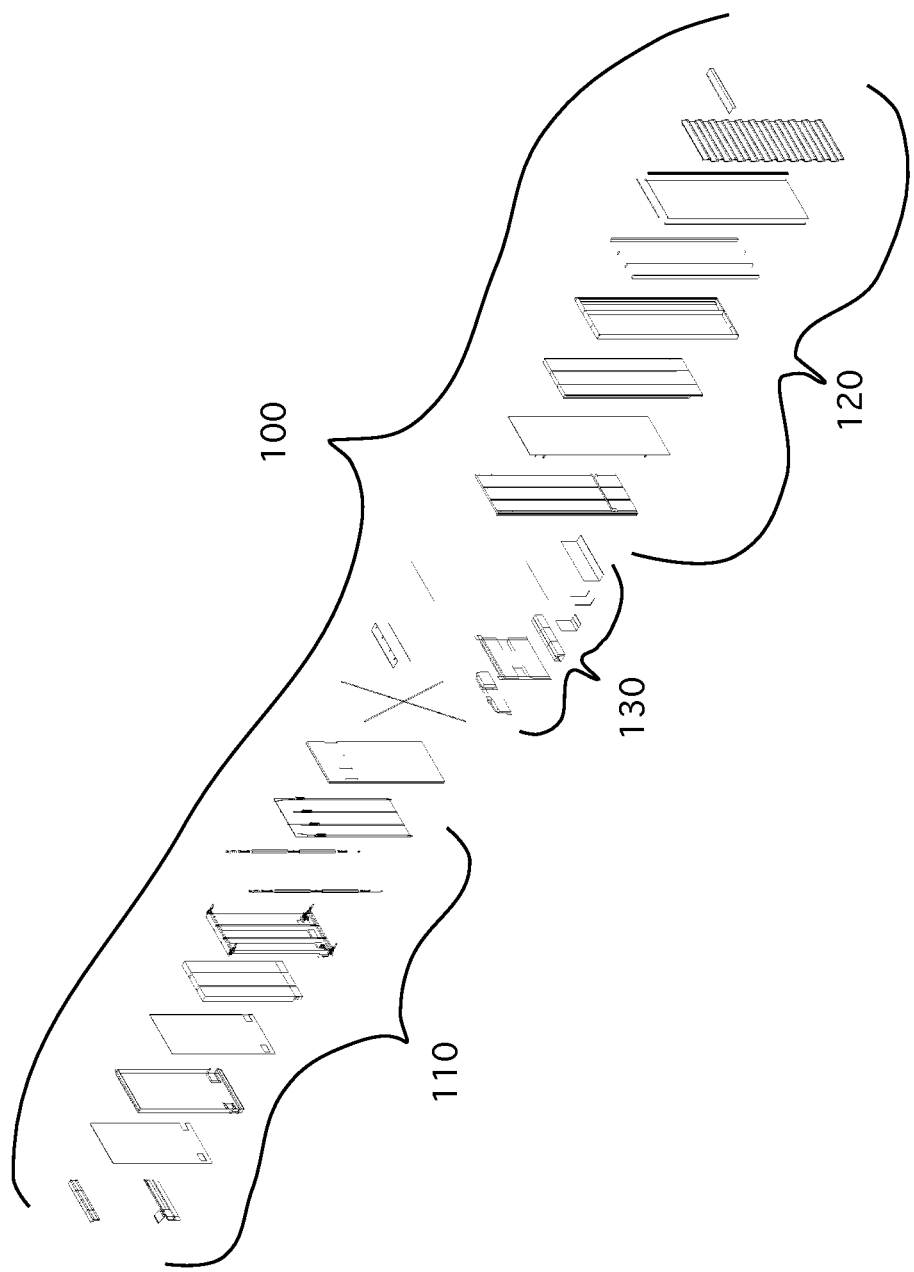

FIG. 19 is an exploded view of an entire Smart Wall Panel (SWP) and Crawlspace Insulation Assembly (CIA).

Figure 19A:
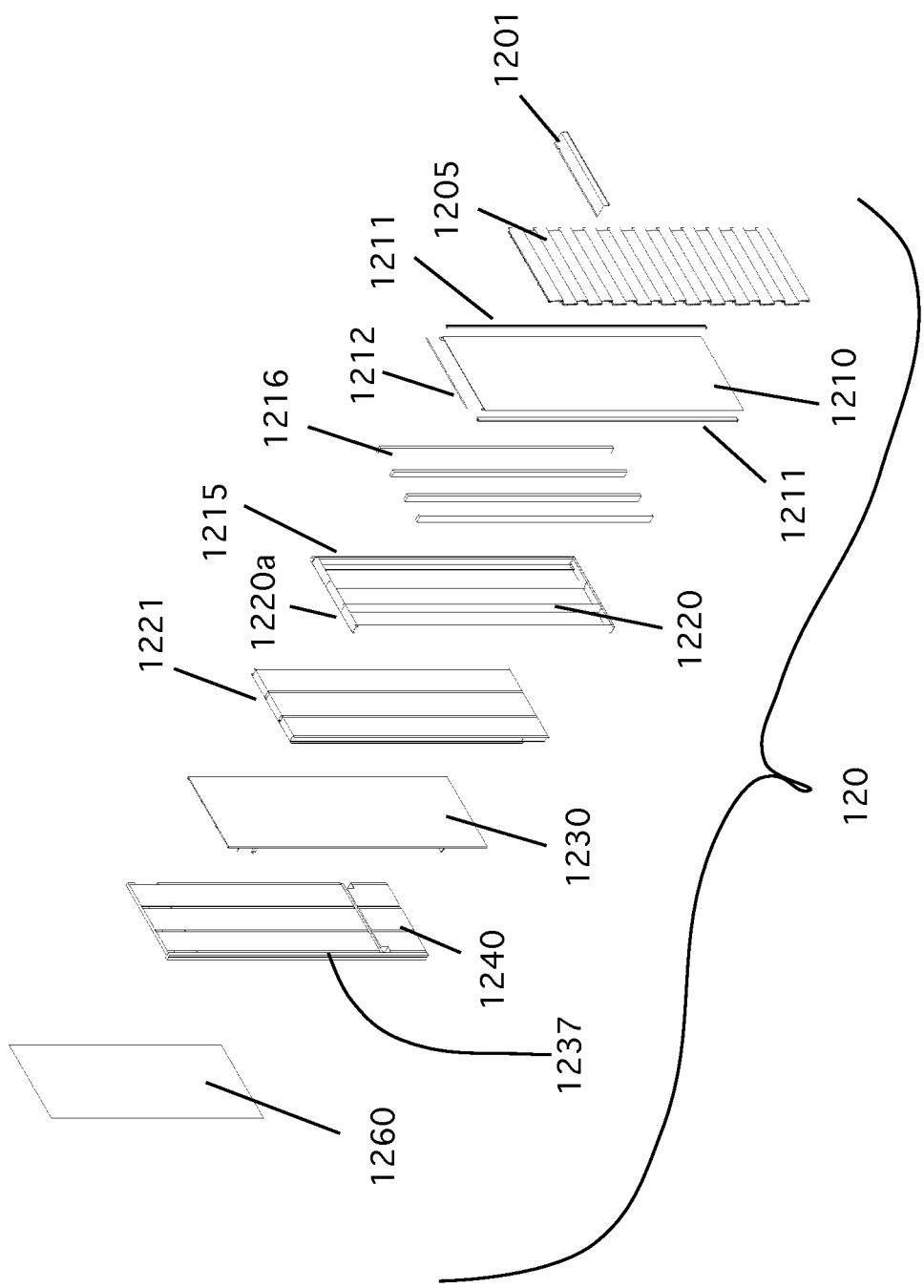

FIG. 19a id an exploded view of the outer Removable Facade Wall (RFW).

Figure 19B:
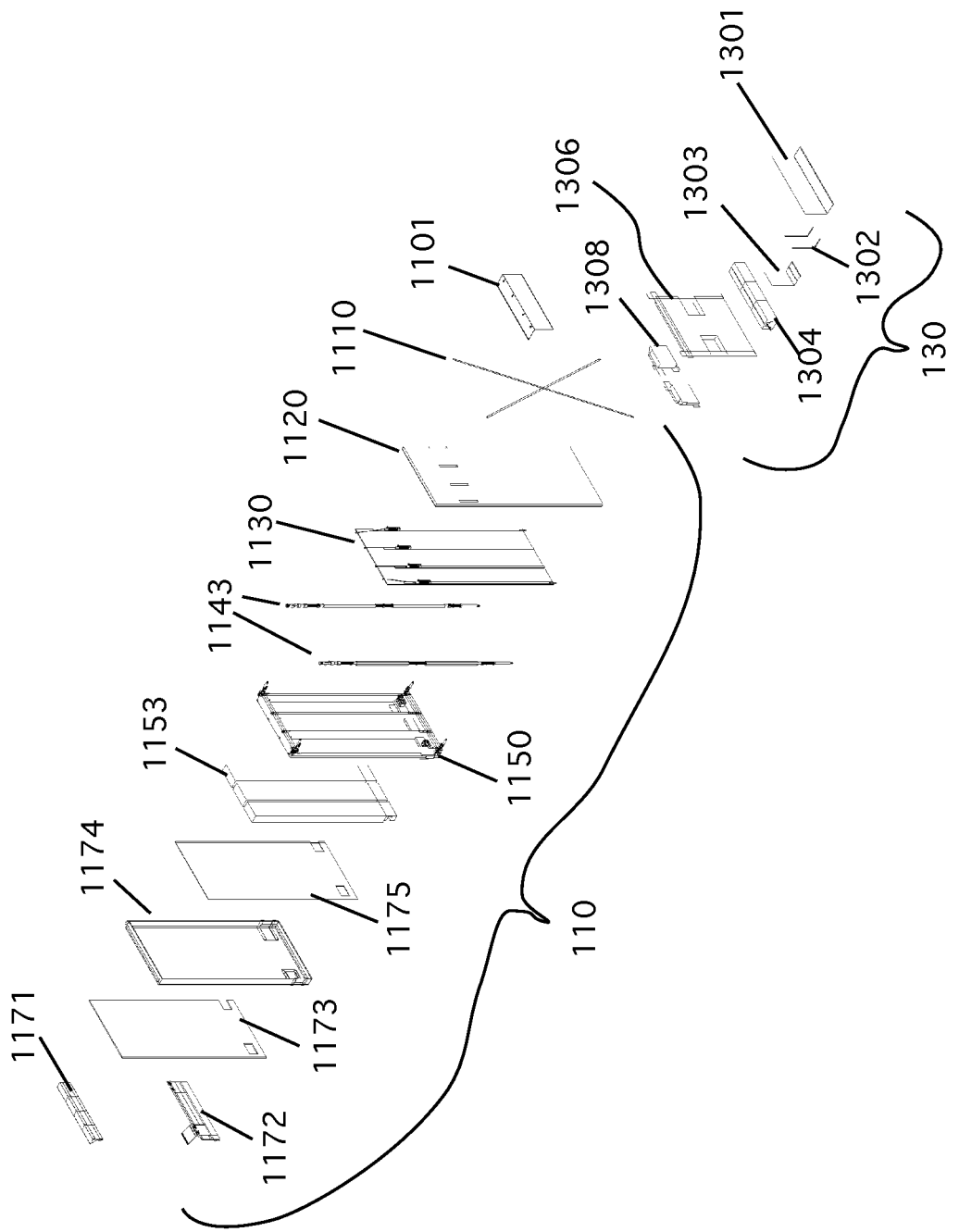

FIG. 19b is an exploded view of the inner Stationary Structural Wall (SSW) and Crawlspace Insulation Assembly (CIA).

Figure 20A:
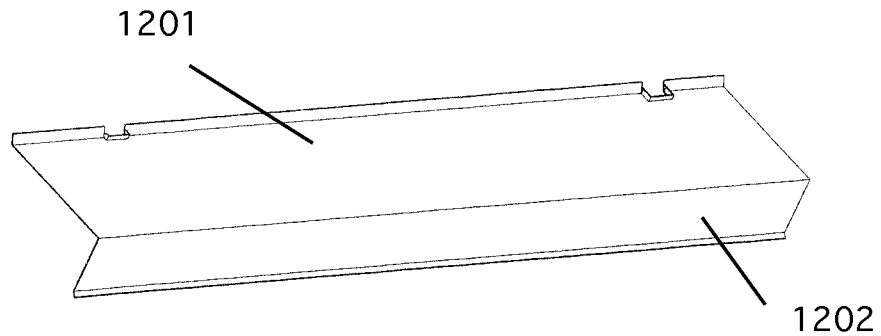

FIG. 20a is perspective view of the removable wall's top Facade Wall Flashing (FWF).

Figure 20B:
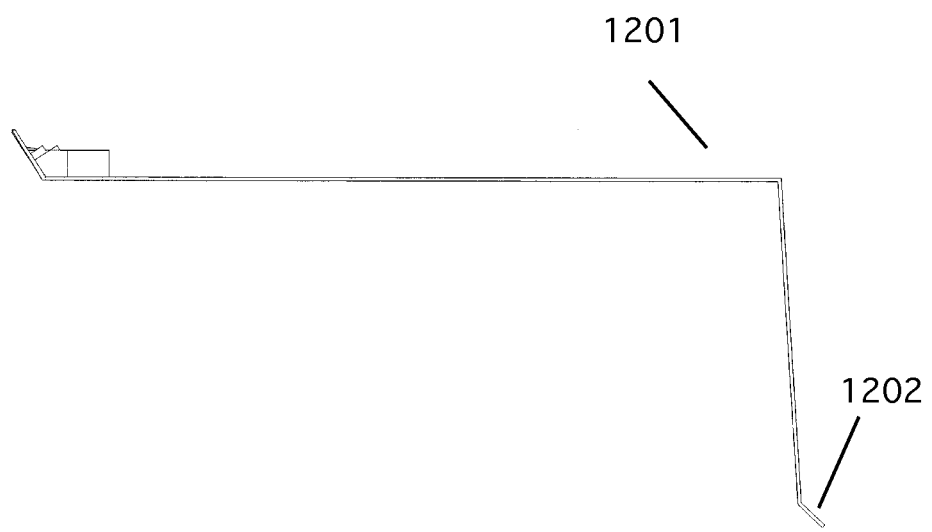

FIG. 20b is side view of the removable wall's top Façade Wall Flashing (FWF).

Figure 21:
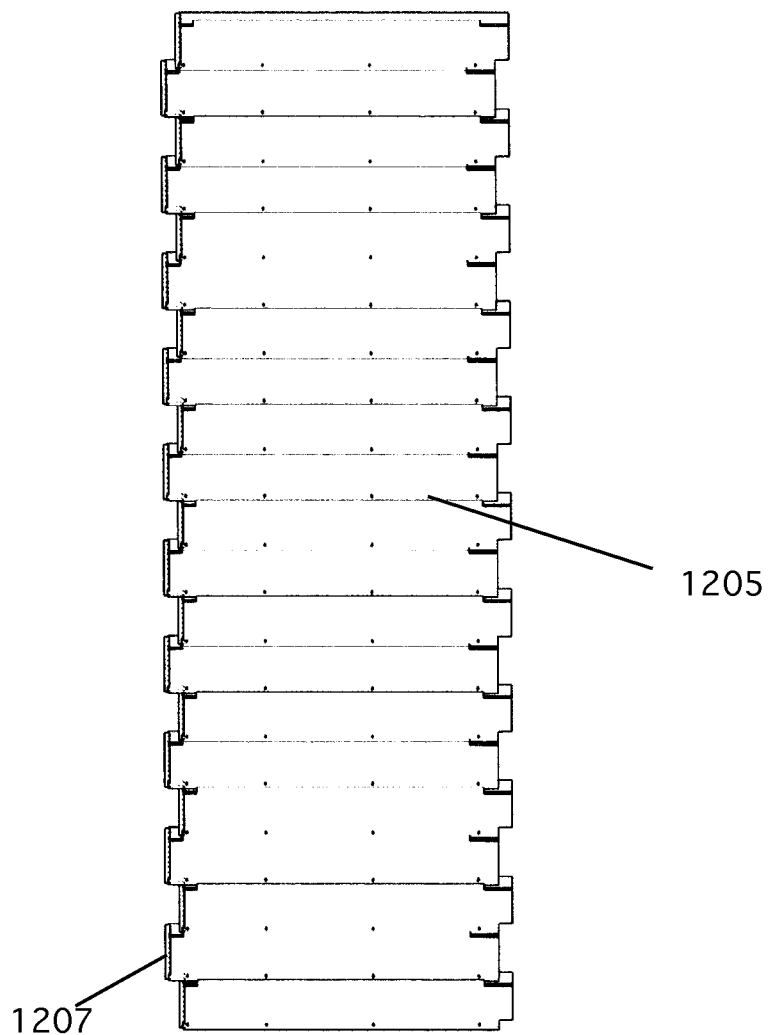

FIG. 21 is a front view of the removable wall Hurricane Exterior Siding (HES).

Figure 22:
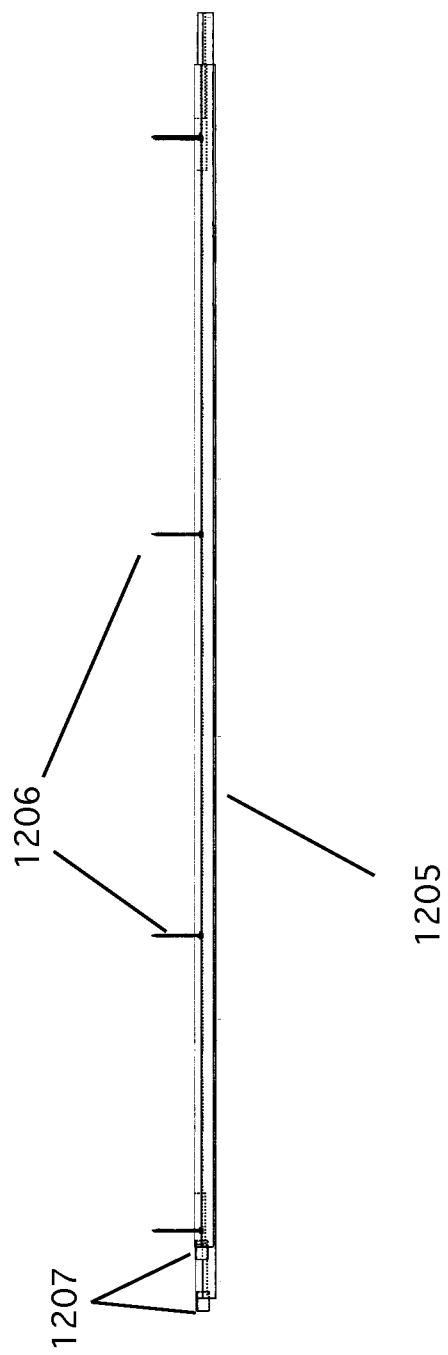

FIG. 22 is a top view of the removable wall Hurricane Exterior Siding (HES).

Figure 23A:
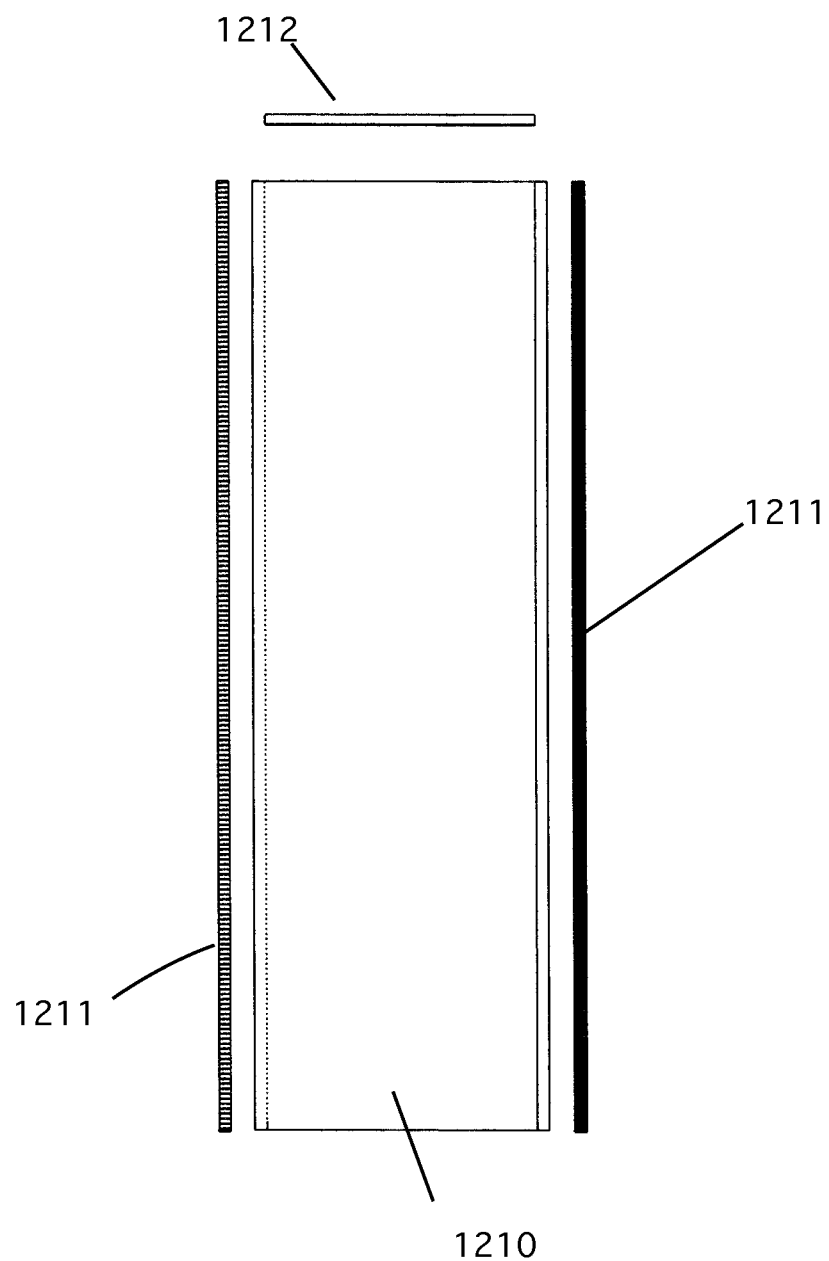

FIG. 23a is a front exploded view of the Hurricane Protection Plate (HPP) and Weather Seal Blocks (WSB) for the Removable Facade Wall.

Figure 23B:
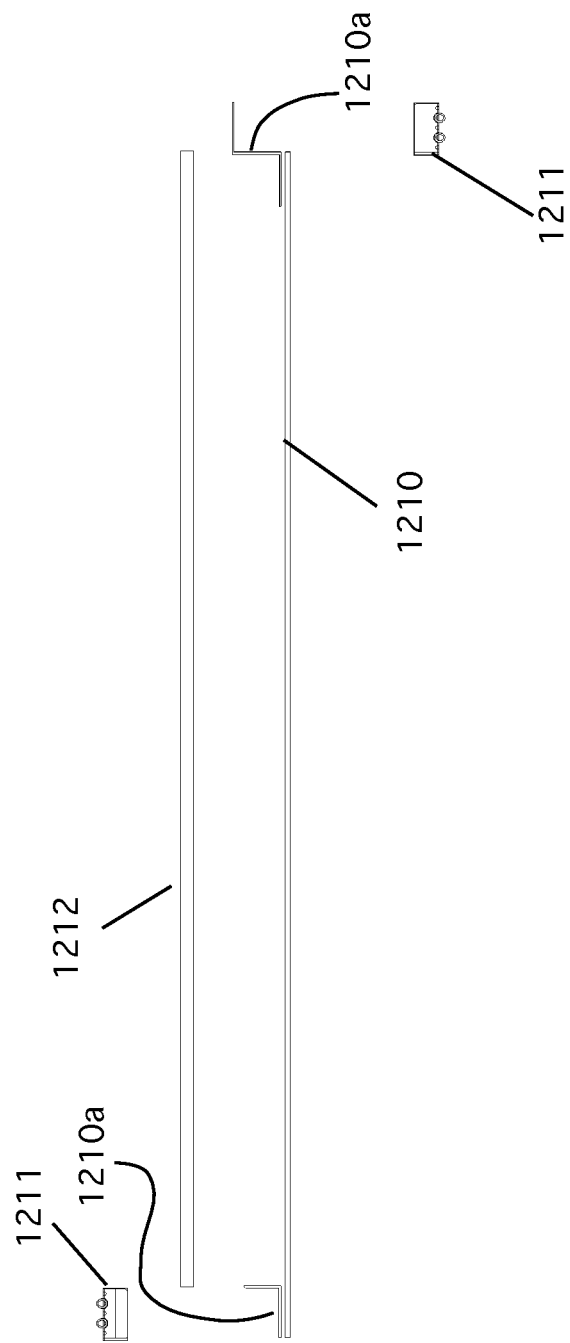

FIG. 23b is an exploded top view of the Hurricane Protection Plate (HPP) and Weather Seal Blocks (WSB) for the Removable Facade Wall (RFW).

Figure 23C:
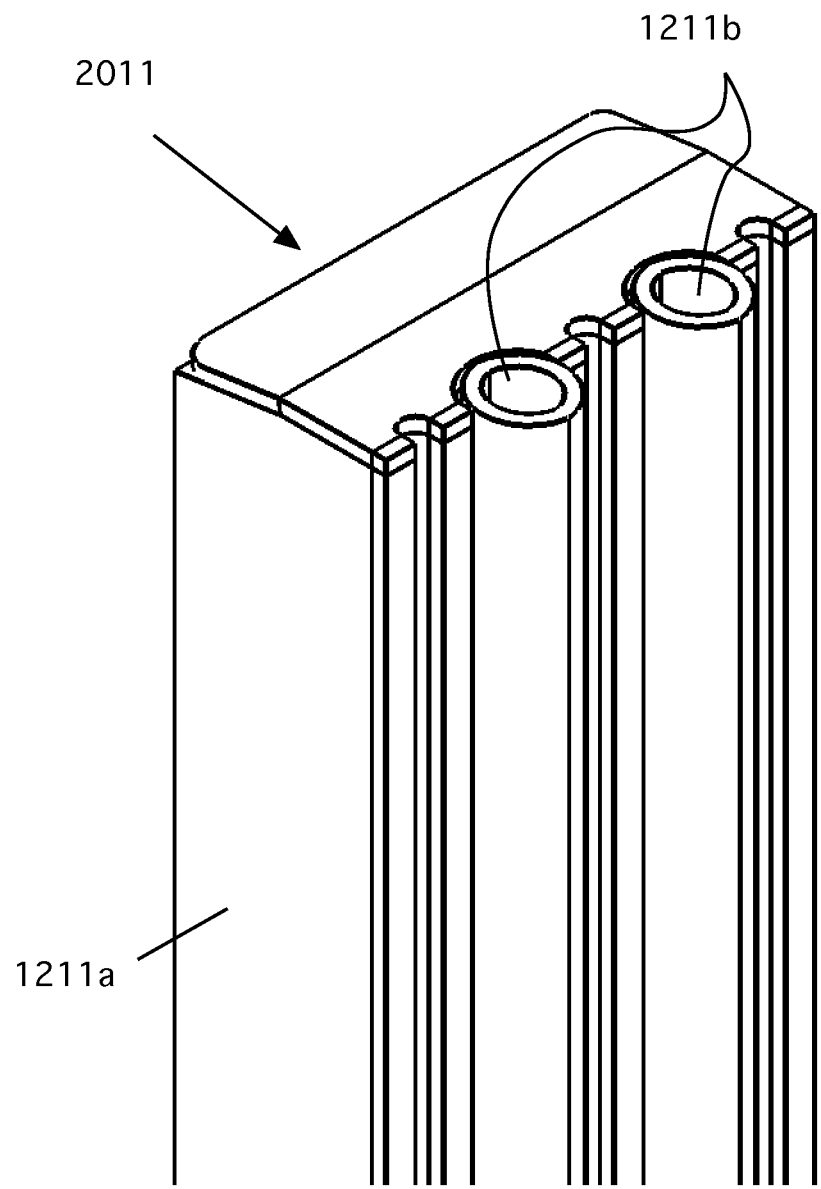

FIG. 23c is a detail view of one of the rubber seals with foam inserts (WSB) of Hurricane Protection Plate (HPP).

Figure 24A:
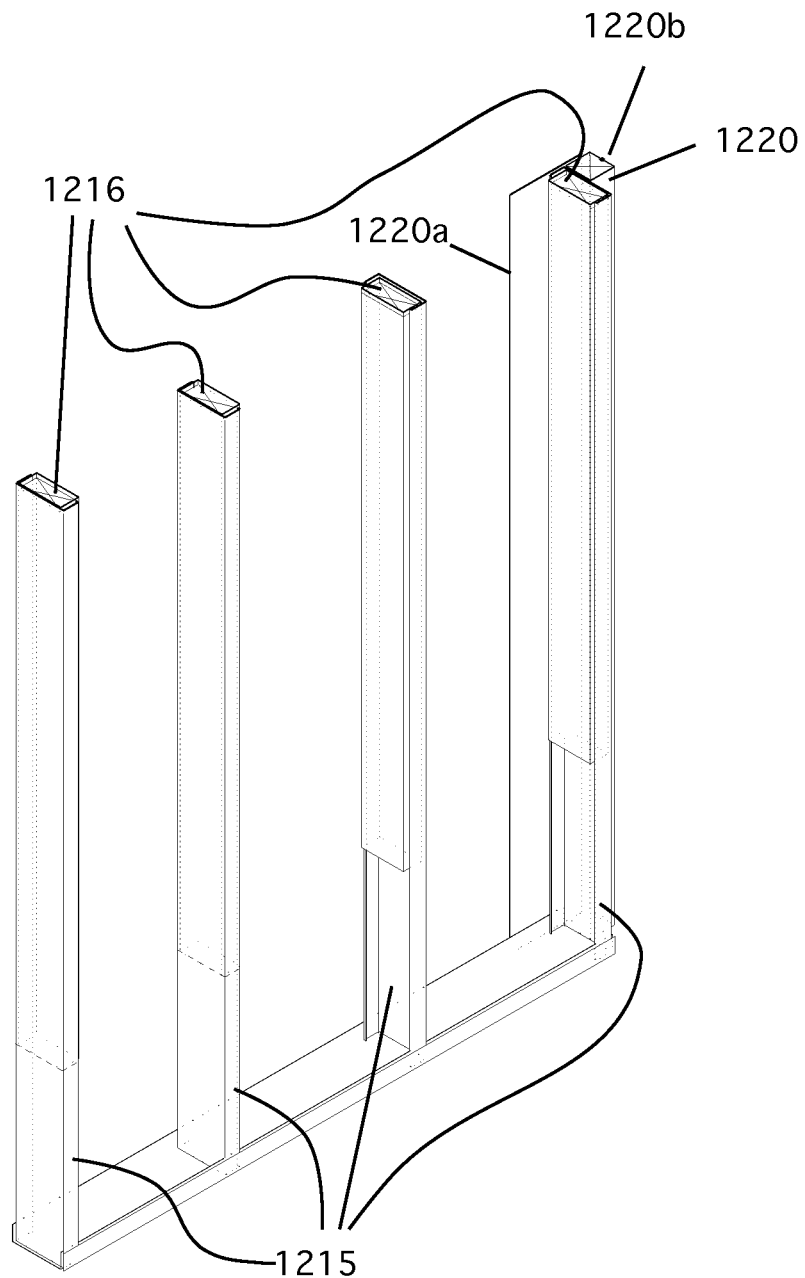

FIG. 24a is a section view of the steel studs and wood blocking that form part of the Removable Facade Wall (RFW).

Figure 24B:
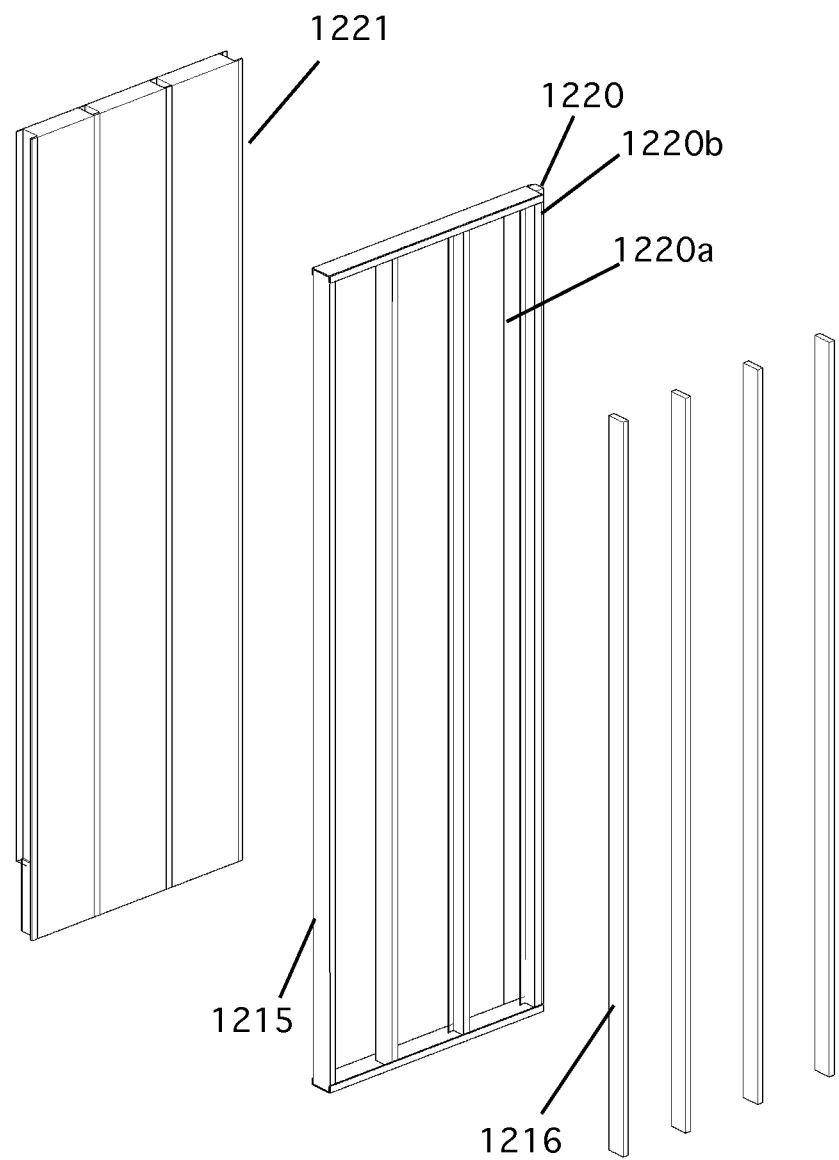

FIG. 24b is a detail view of the Rigid Insulation and Rigid Insulation Fillers and Vapor Retarder Tape.

Figure 25A:
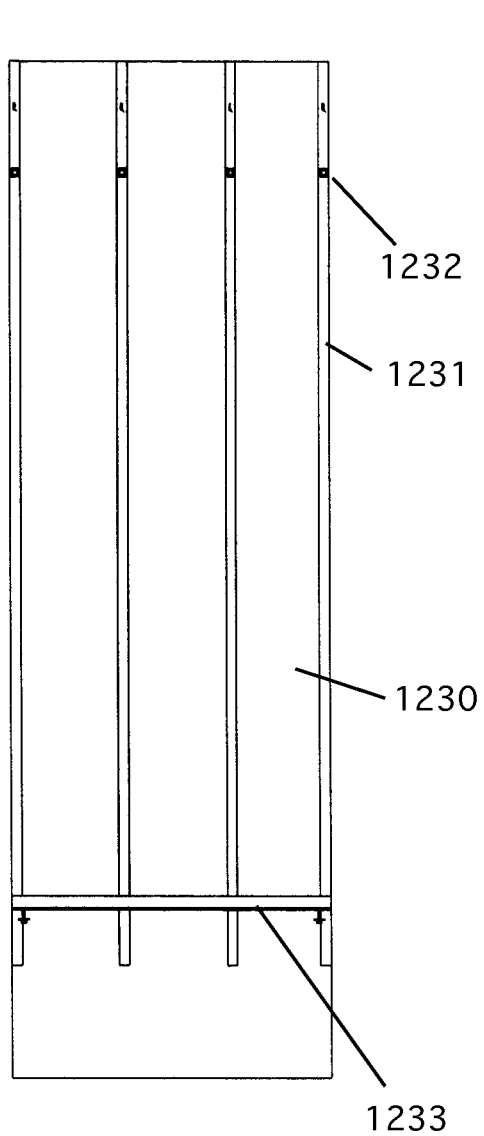

FIG. 25a is a rear view of the treated plywood with Wedge Locking Clamps (WLCs) system as part of the Removable Facade Wall (RFW).

Figure 25B:
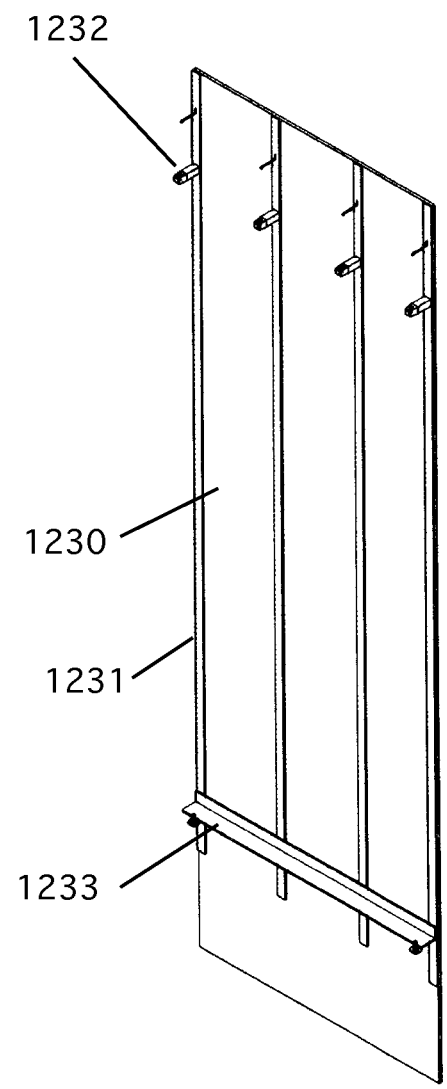

FIG. 25b is a rear perspective view of the treated plywood with Wedge Locking Clamps (WLCs) system as part of the Removable Facade Wall (RFW).

Figure 25C:
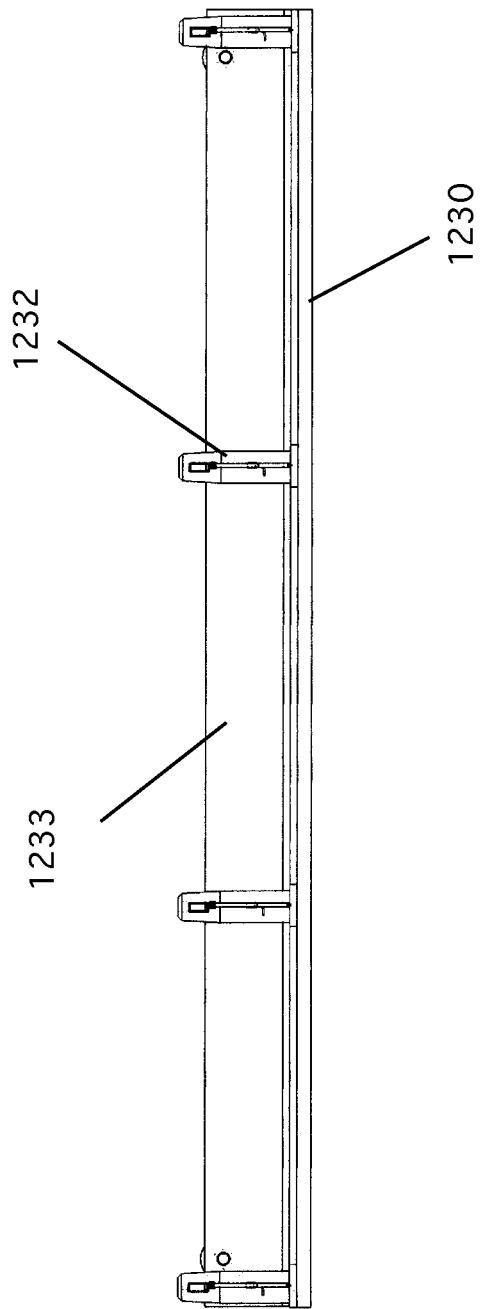

FIG. 25c is a top view of the treated plywood with Wedge Locking Clamps (WLCs) system as part of the Removable Facade Wall (RFW).

Figure 25D:
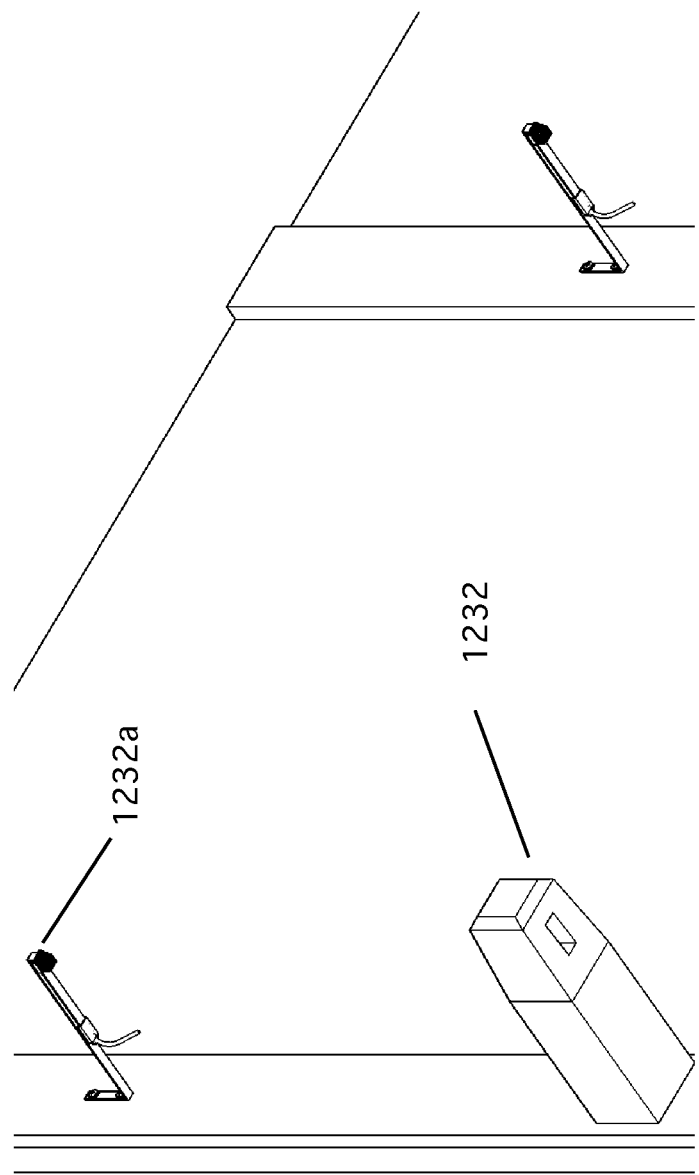

FIG. 25d is an upper perspective detail view of wall locking system as part of the Removable Facade Wall (RFW).

Figure 25E:
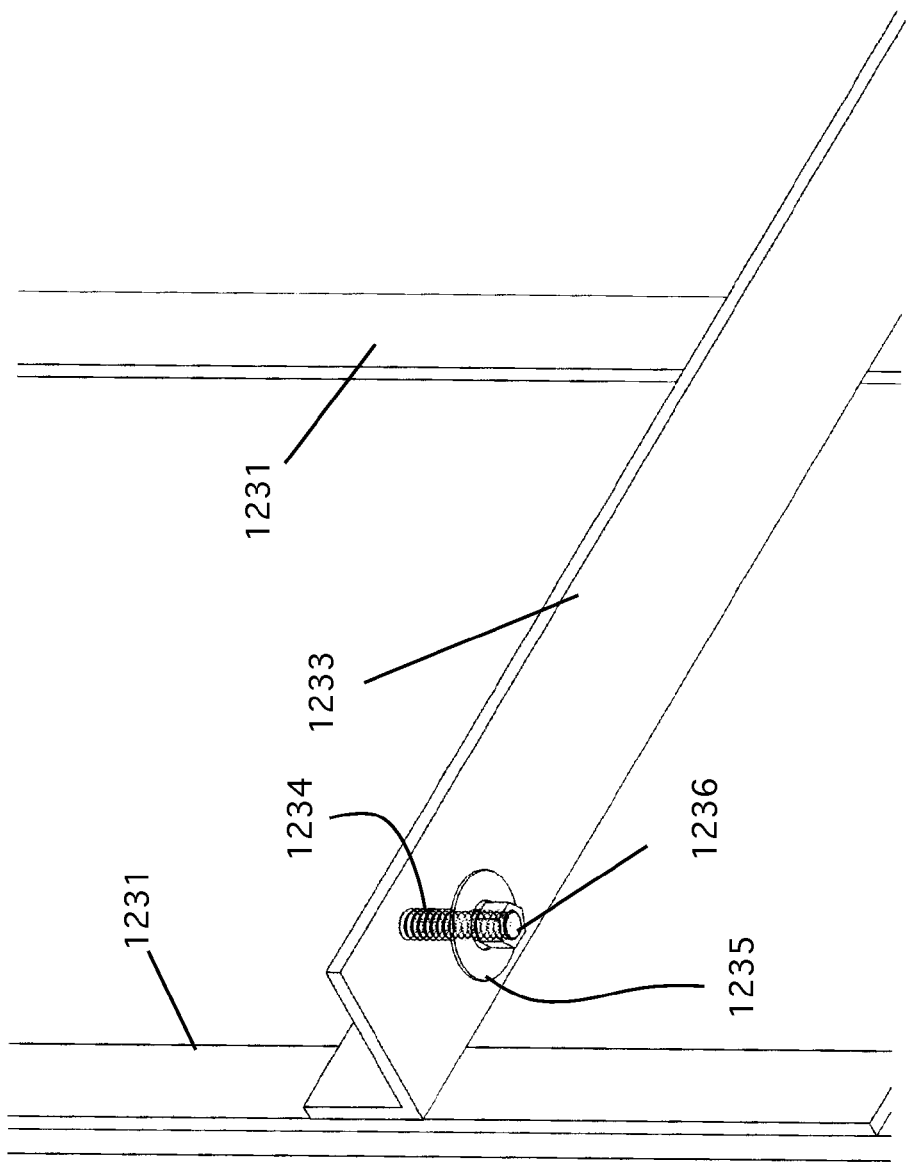

FIG. 25e is a lower perspective view of the treated plywood with wall locking system as part of the Removable Facade Wall (RFW).

Figure 26A:
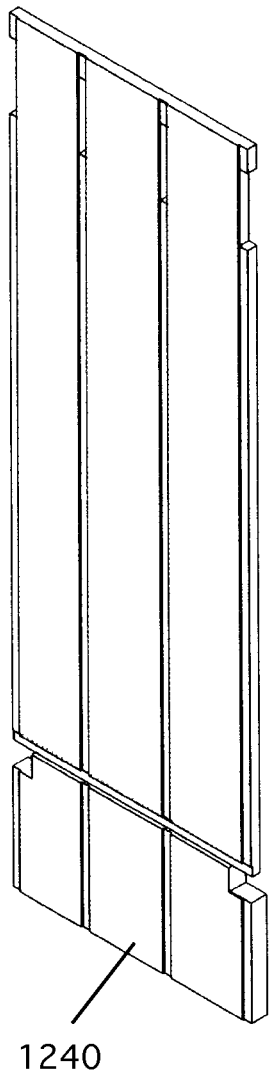

FIG. 26a is a perspective view of the spray foam insulation that is part of the Removable Facade Wall (RFW).

Figure 26B:
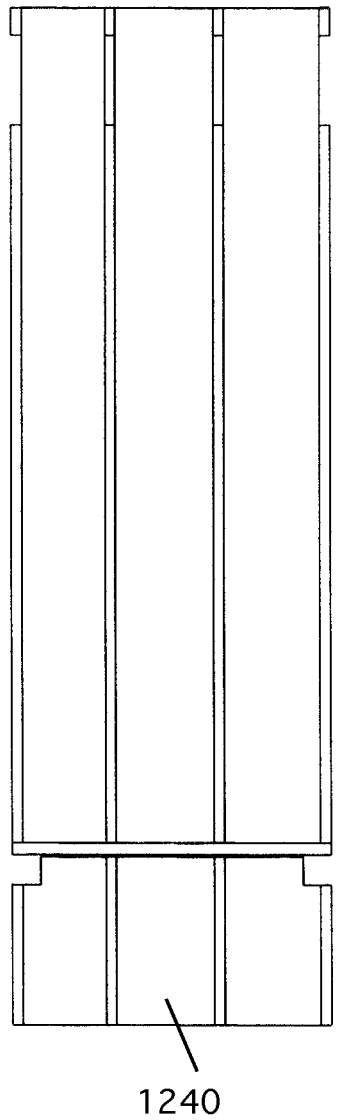

FIG. 26b is a front view of the spray foam insulation that is part of the Removable Facade Wall (RFW).

Figure 27A:
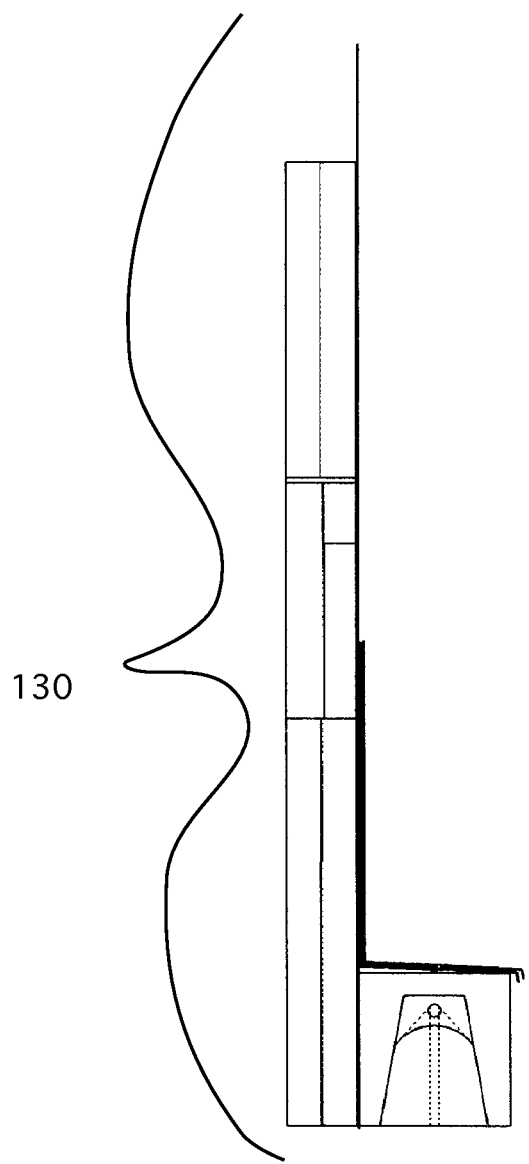

FIG. 27a is a side view of the Crawlspace Insulation Assembly (CIA).

Figure 27B:
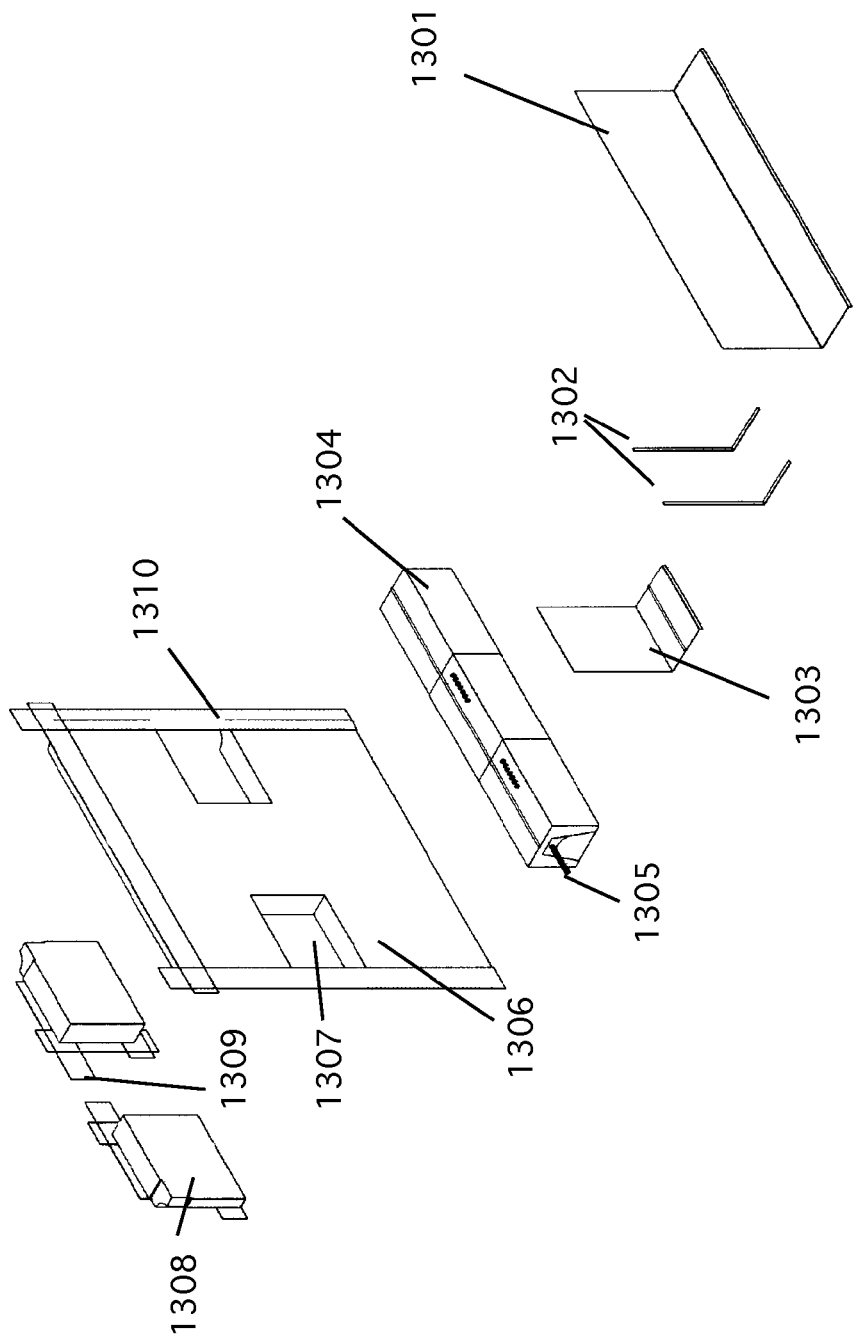

FIG. 27b is an exploded view of the Crawlspace Insulation Assembly (CIA).

Figure 28A:
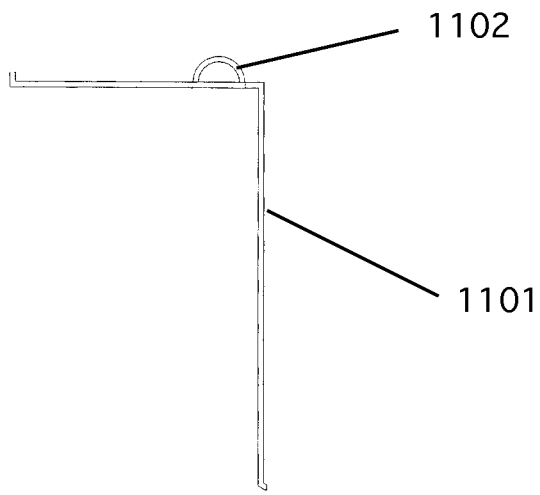

FIG. 28a is a side view of the top SSW Protection Plate (SPP) for the Stationary Structural Wall (SSW).

Figure 28B:
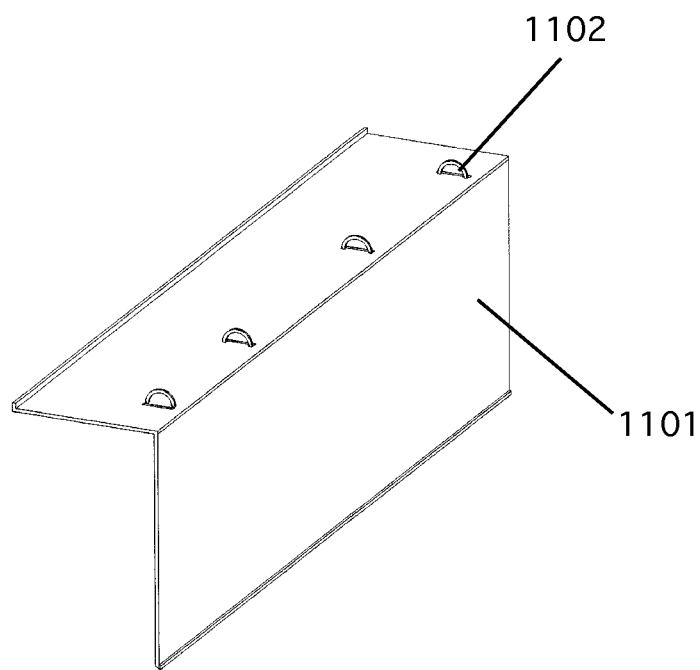

FIG. 28b is a perspective view of the top SSW Protection Plate (SPP) for the Stationary Structural Wall (SSW).

Figure 29:
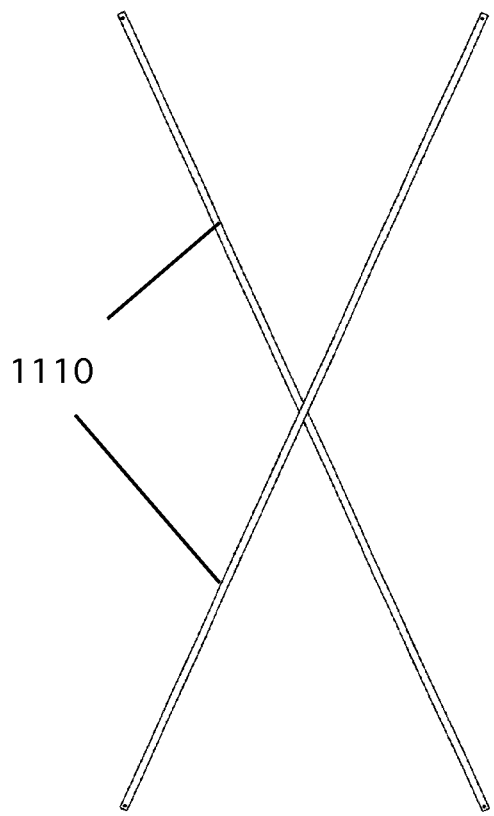

FIG. 29 is a front view of the Cross-Bracing Straps (CBSs) as part of the Stationary Structural Wall (SSW).

Figure 30A:
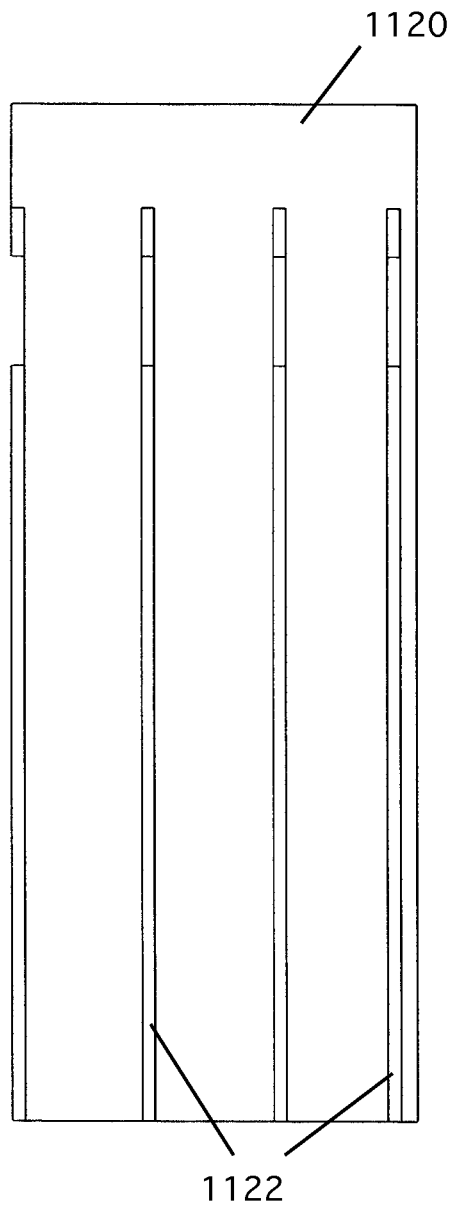

FIG. 30a is a front view of interior Rigid Insulation as part of the Stationary Structural Wall (SSW).

Figure 30B:
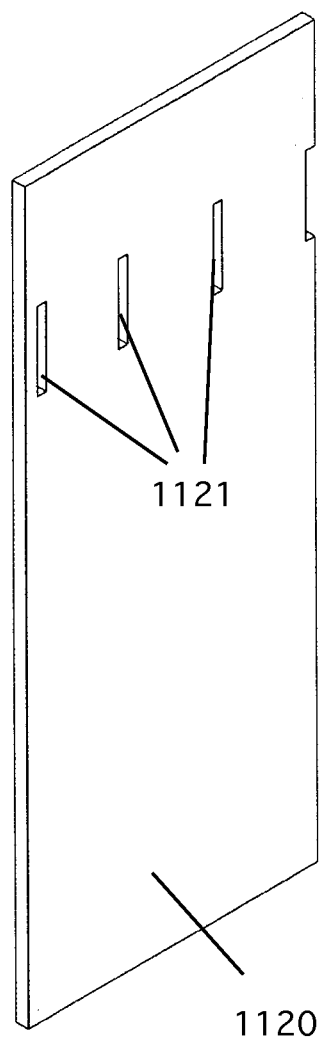

FIG. 30b is a front perspective view of interior Rigid Insulation as part of the Stationary Structural Wall.

Figure 31A:
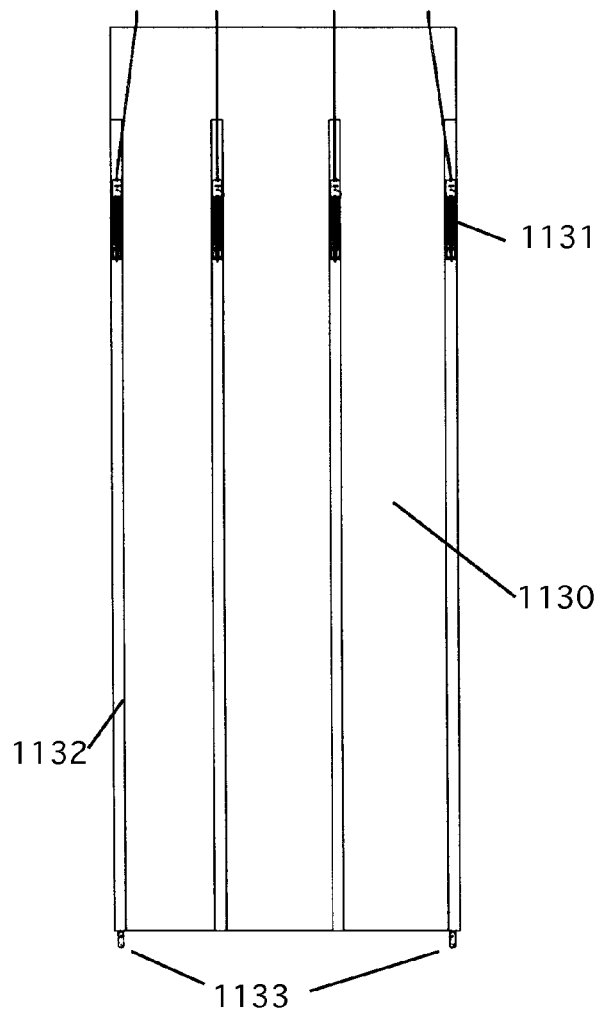

FIG. 31a is a front view of the treated plywood and steel plates with solenoid operated spring locking system as part of the Stationary Structural Wall (SSW).

Figure 31B:
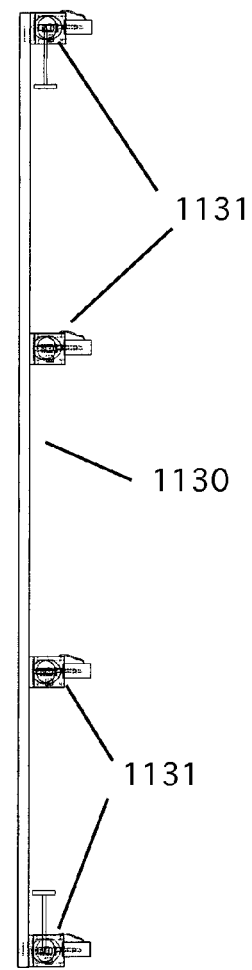

FIG. 31b is a top view of the treated plywood and steel plates with solenoid operated spring locking system as part of the Stationary Structural Wall (SSW).

Figure 31C:
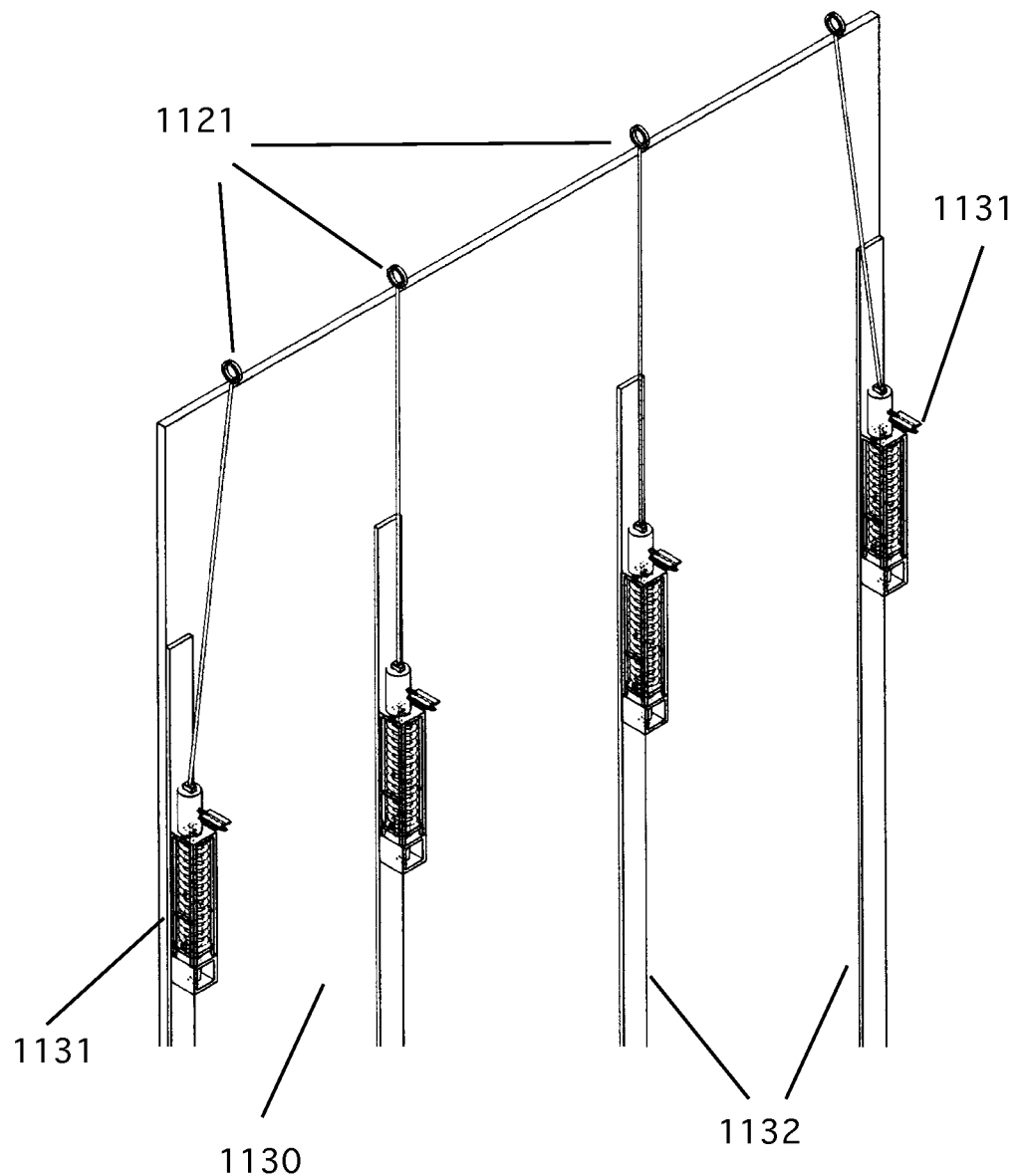

FIG. 31c is a perspective detail view of the solenoid-operated spring locking system as part of the Stationary Structural Wall (SSW).

Figure 31D:
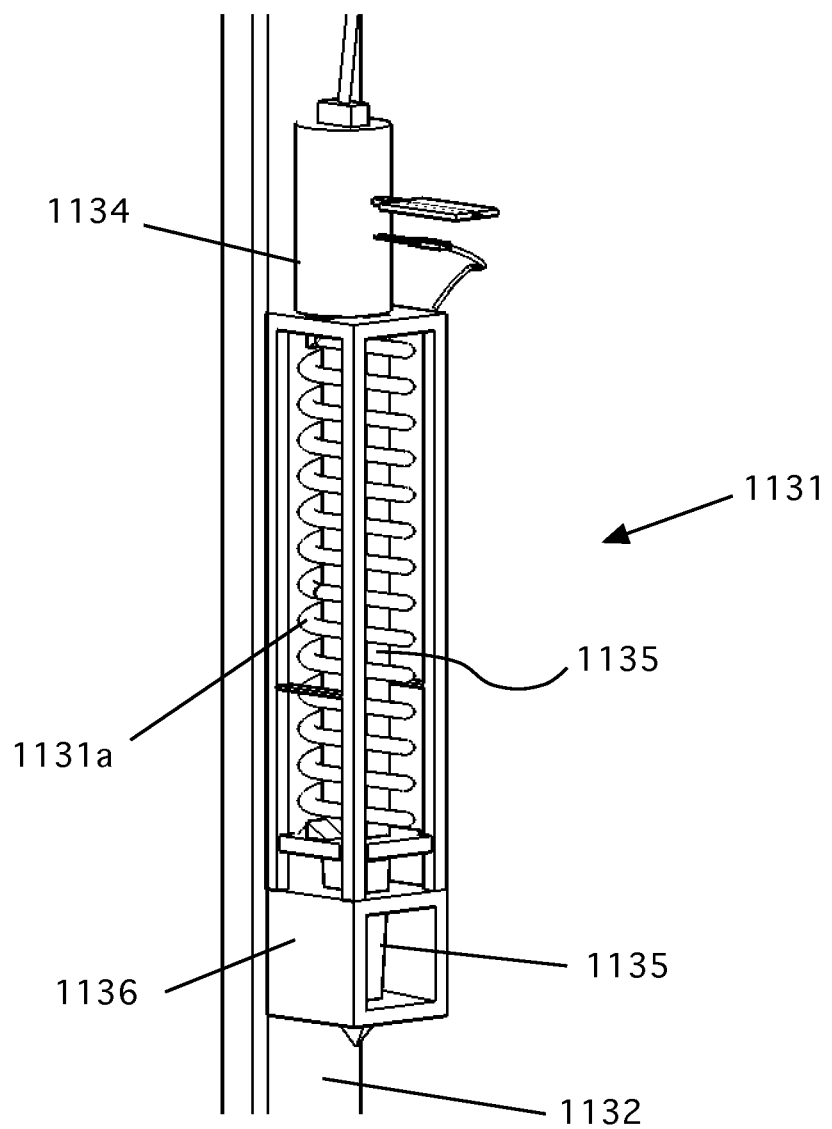

FIG. 31d is an enlarged detail view of a solenoid-operated spring lock as part of the Stationary Structural Wall (SSW).

Figure 32A:
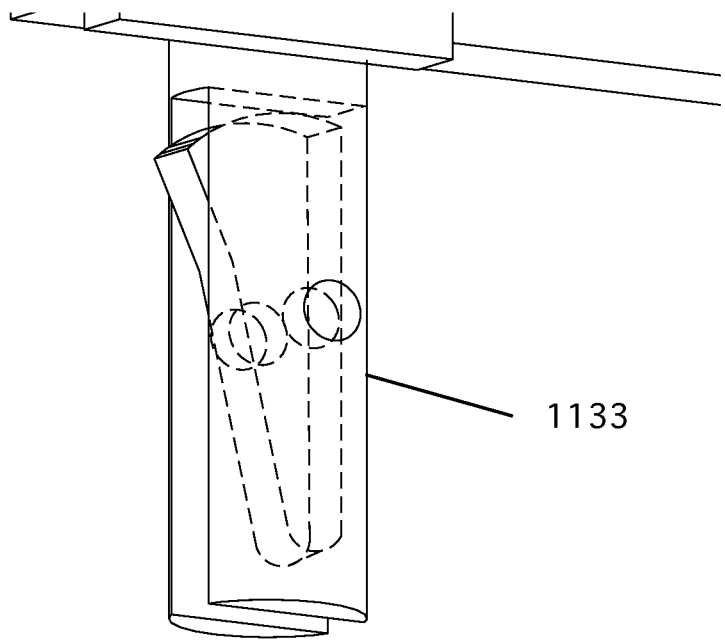

FIG. 32a is a perspective detail view of the bottom Gravity Locking Cam (GLC) as part of the Stationary Structural Wall (SSW).

Figure 32B:
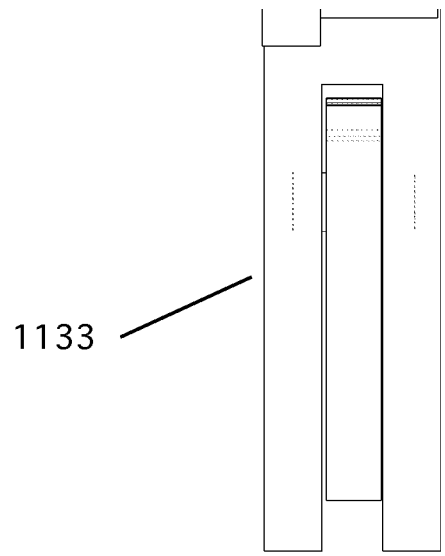

FIG. 32b is a front detail view of the bottom Gravity Locking Cam (GLC) as part of the Stationary Structural Wall (SSW).

Figure 33A:
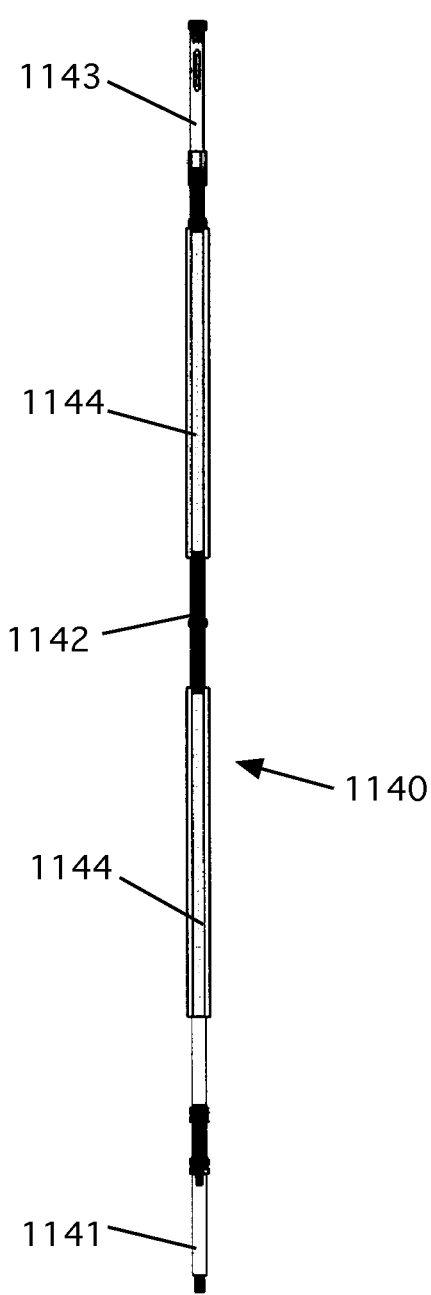

FIG. 33a is a front view of a Wall Tie Rod (WTR) assembly as part of the Stationary Structural Wall (SSW).

Figure 33B:
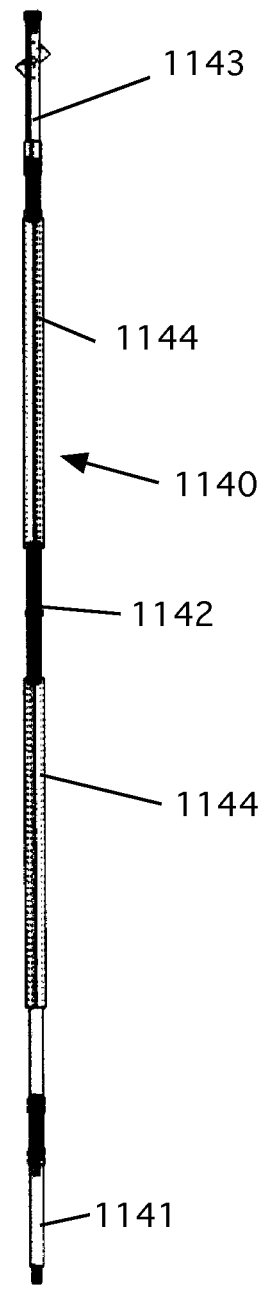

FIG. 33b is a side view of a Wall Tie Rod (WTR) assembly as part of the Stationary Structural Wall (SSW).

Figure 33C:
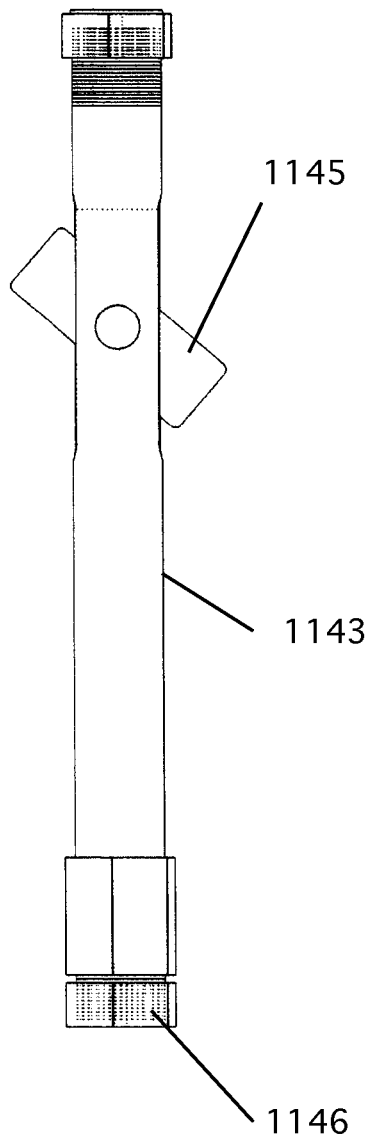

FIG. 33c is a front view of the Roof Locking Cam (RLC) portion, which is part of the Wall Tie Rod (WTR) assembly.

Figure 33D:
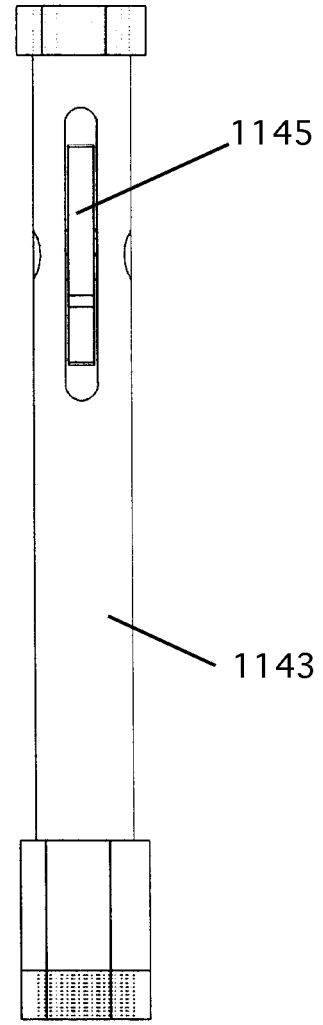

FIG. 33d is a side view of the Roof Locking Cam (RLC) portion, which is part of the Wall Tie Rod (WTR) assembly.

Figure 33E:

FIG. 33e is a front view of a Steel Extension Rod (SER) portion, which is part of the Wall Tie Rod (WTR) assembly.

Figure 33F:
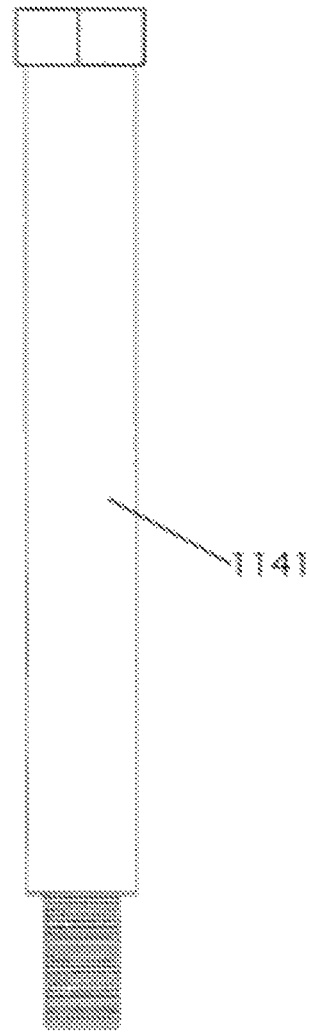

FIG. 33f is a side view of an Exterior Machined Shoulder Bolt (ESB) portion, which is part of the Wall Tie Rod (WTR) assembly.

Figure 33G:
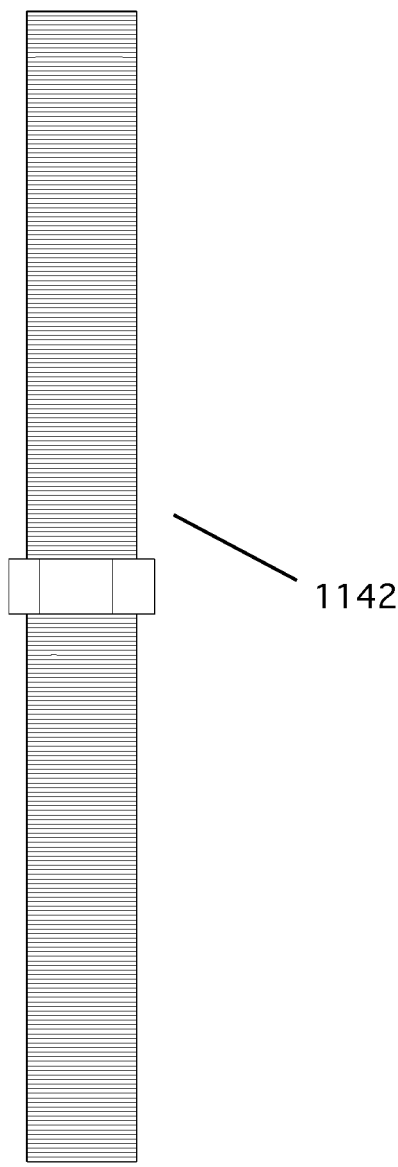

FIG. 33g is a side view of the Threaded Rod Turnbuckle (TRT) portion, which is part of the Wall Tie Rod (WTR) assembly.

Figure 34A:
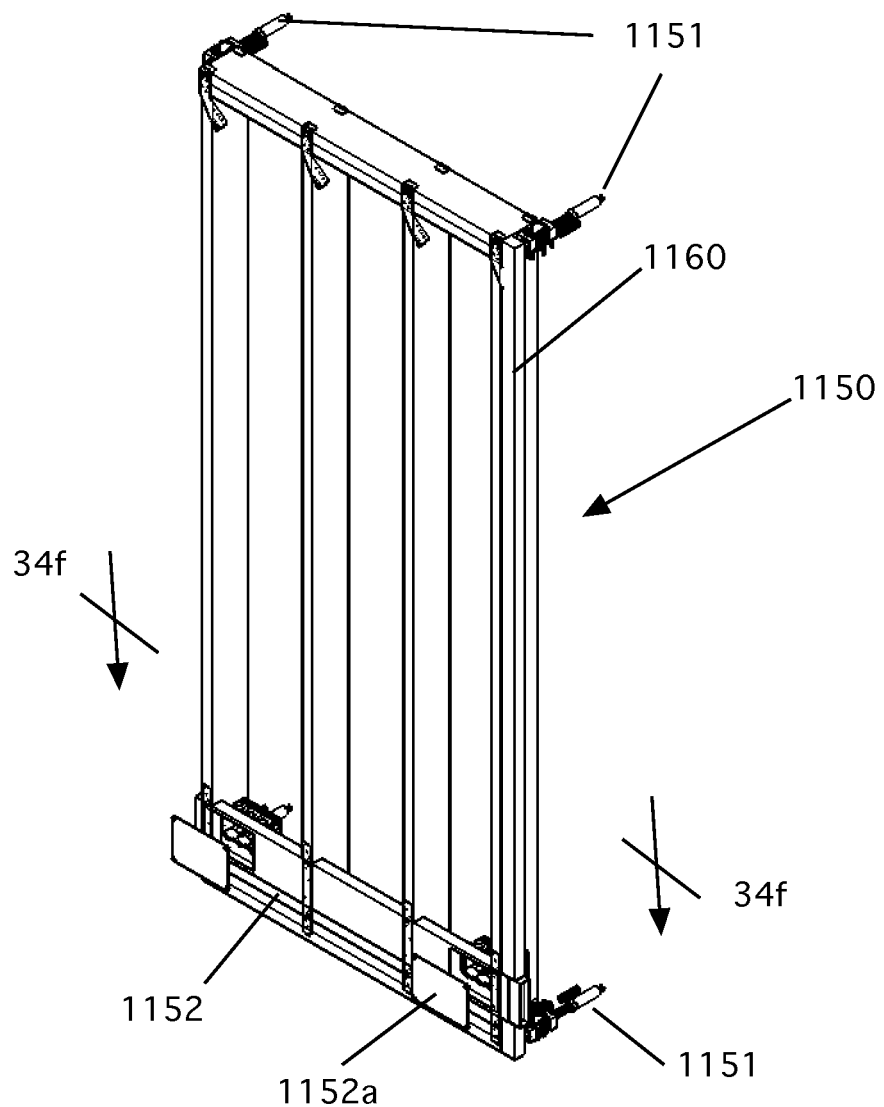

FIG. 34a is a rear perspective view of a section of a Structural Wood Frame (SWF) stud wall frame assembly with Bolting Clamp Strut (BCS) assemblies installed as part of the Stationary Structural Wall (SSW).

Figure 34B:
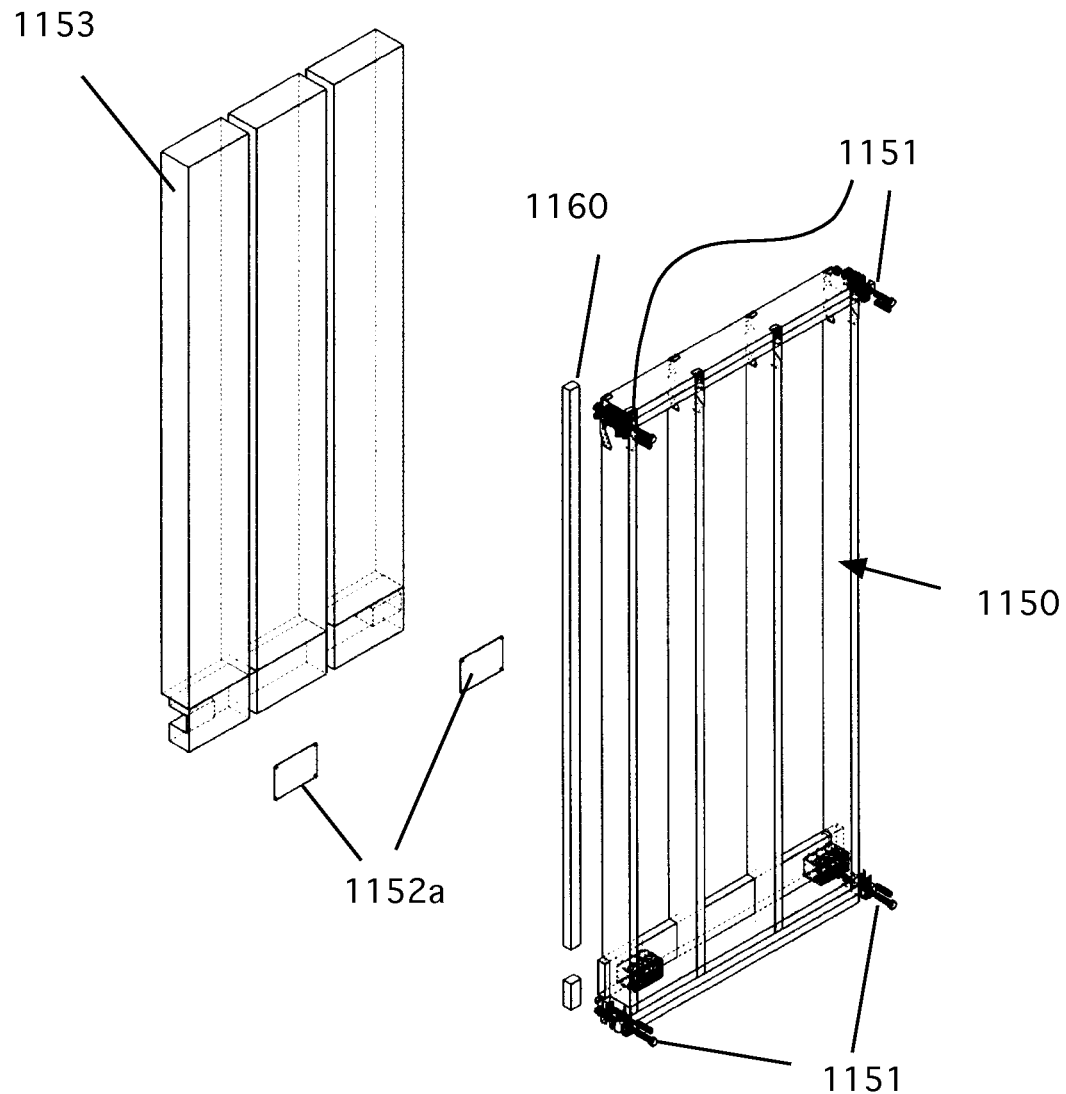

FIG. 34b is a front perspective view of a section of a wall stud assembly with a Bolting Clamp Strut (BCS) assemblies installed also including an exploded view of spray foam insulation that is sprayed into the frame structure, as part of the Stationary Structural Wall (SSW).

Figure 34C:
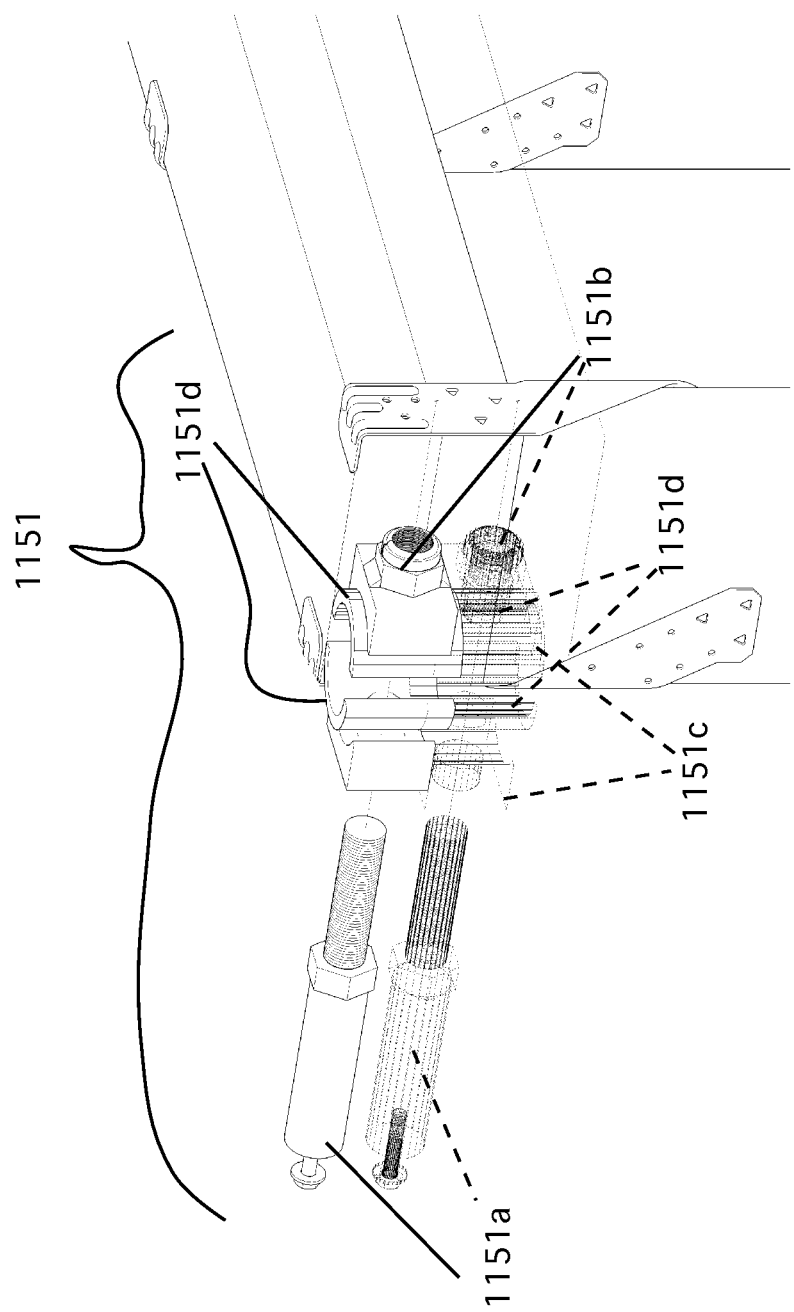

FIG. 34c is a detail view of one of the upper Boltable Clamp Strut (BCS) assemblies on the Structural Wood Frame (SWF) assembly.

Figure 34D:
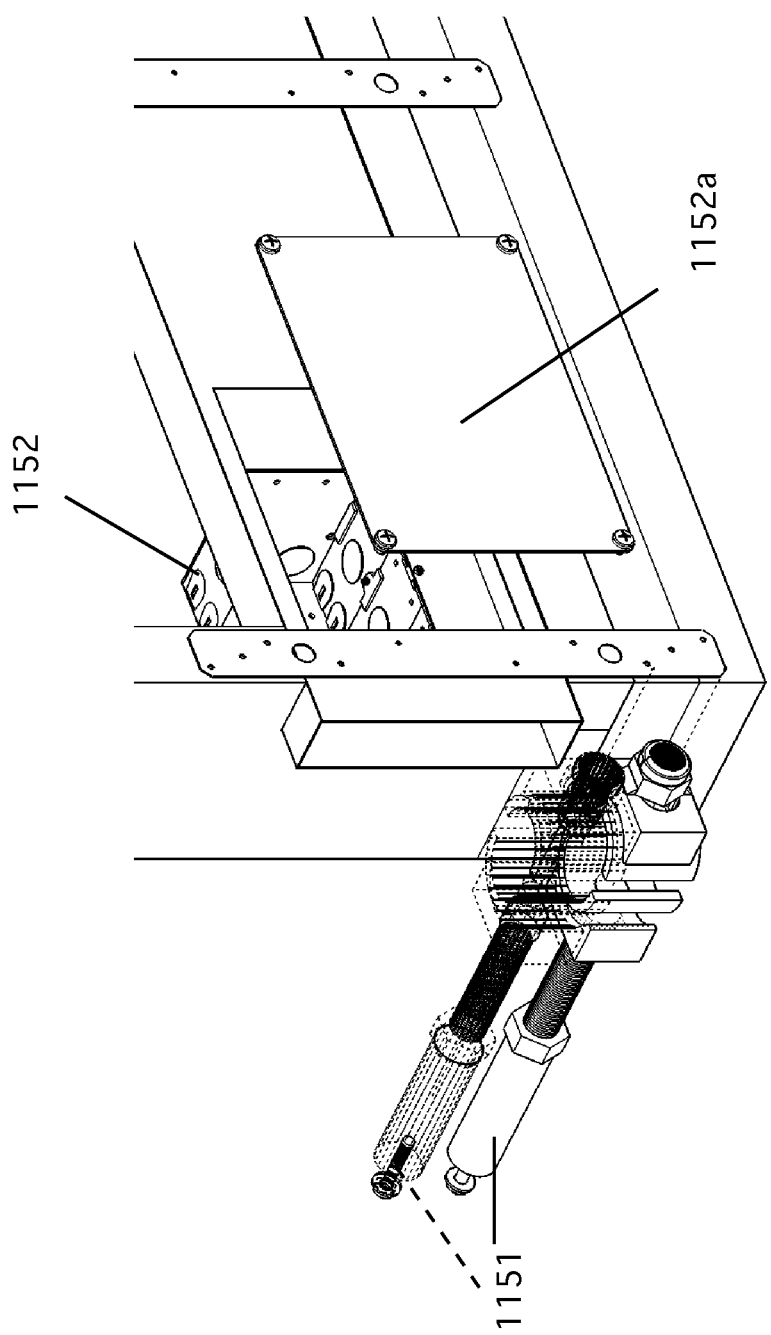

FIG. 34d is a detail view of one of the lower Bolting Clamp Strut (BCS) assemblies and Electrical Galvanize Raceway (EGR) on the Structural Wood Frame (SWF) assembly.

Figure 34E:
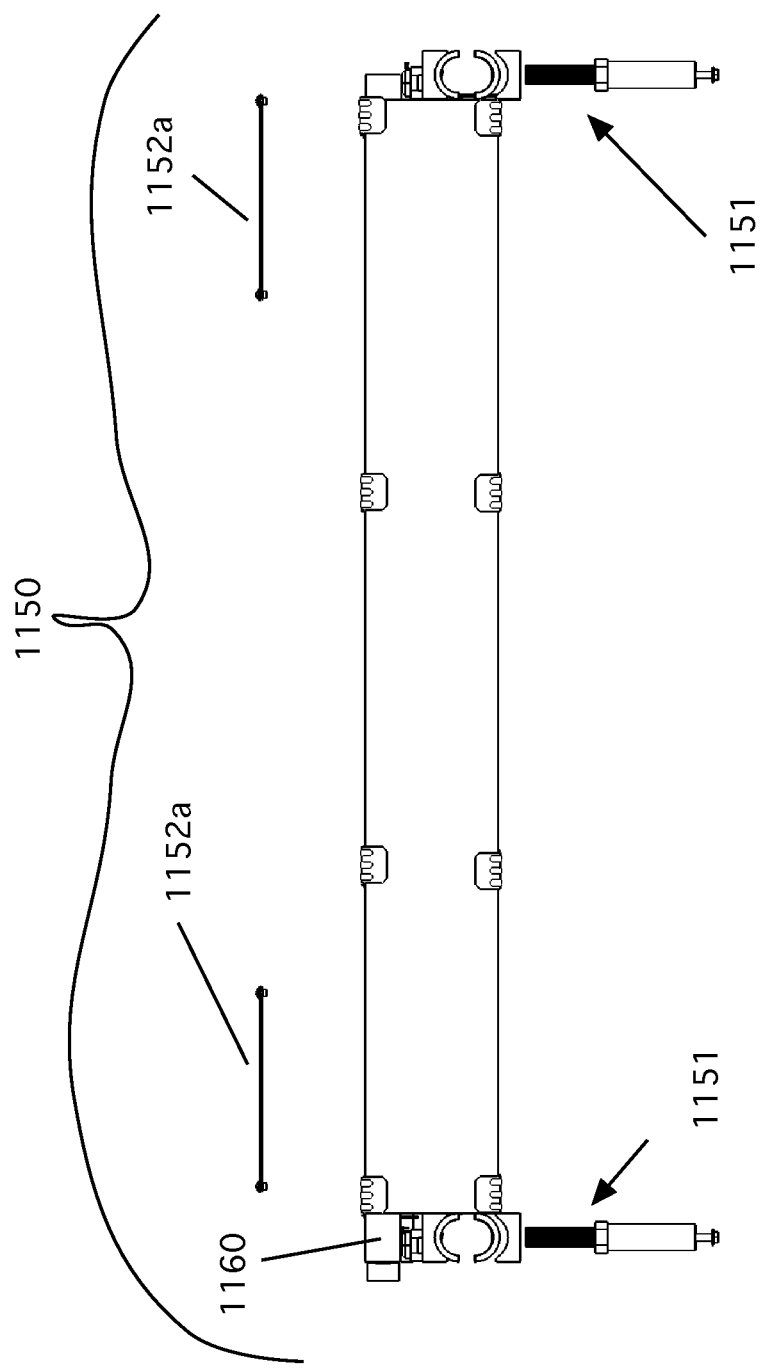

FIG. 34e is a top view of the Structural Wood Frame (SWF) assembly.

Figure 34F:
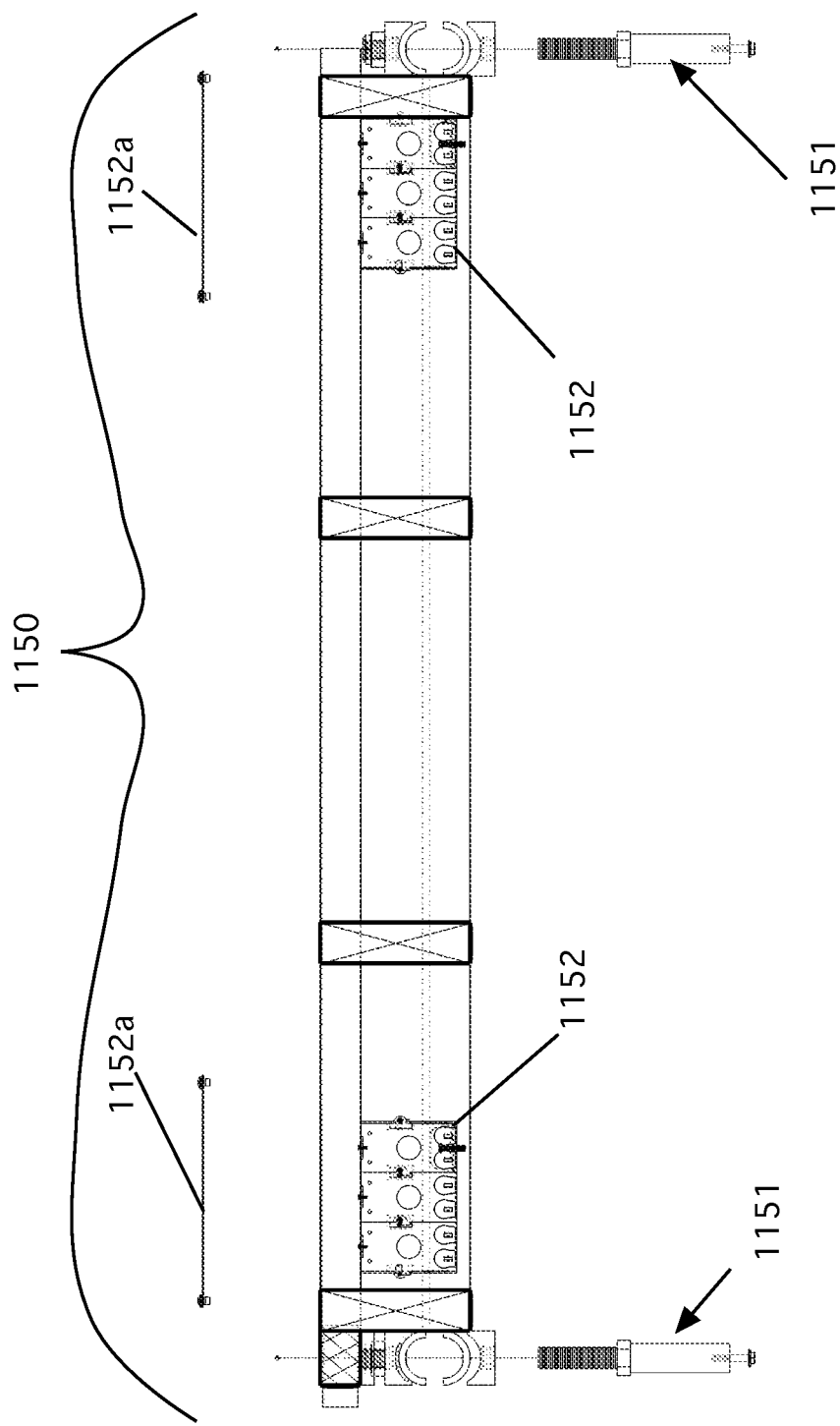

FIG. 34f is a cross-sectional view of Structural Wood Frame (SWF) assembly taken along the lines 34f-34f of FIG. 34a.

Figure 35A:
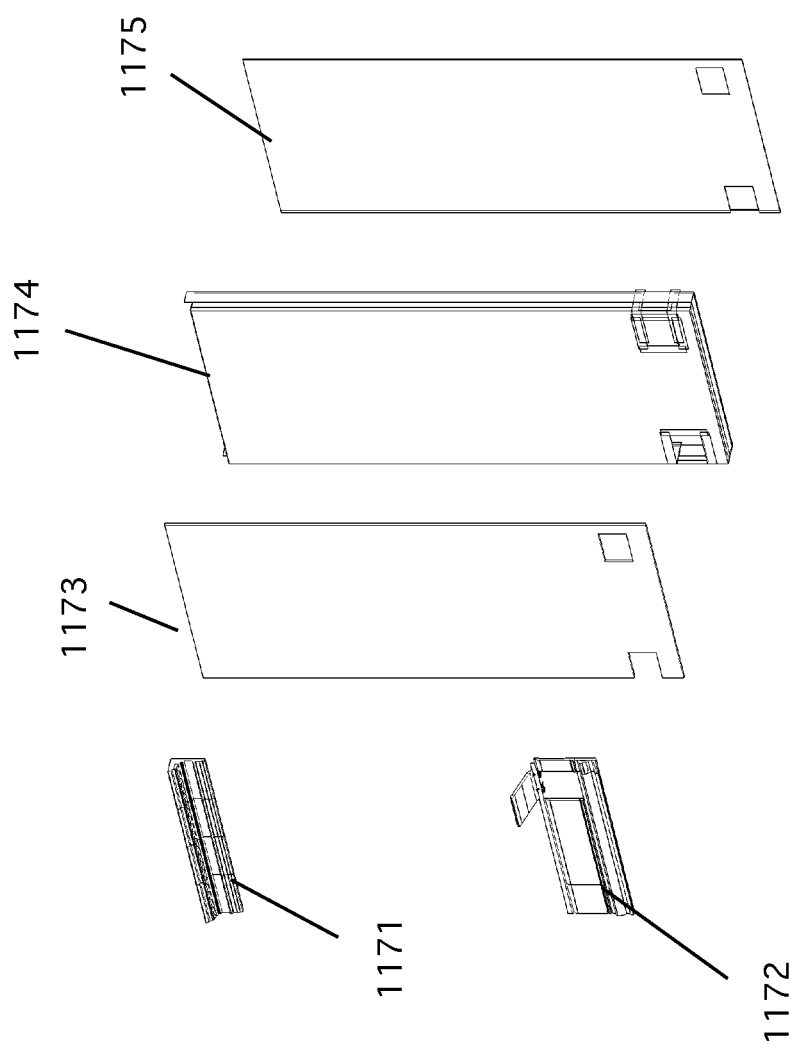

FIG. 35a is a rear right perspective view of the finishing assembly of the Stationary Structural Wall (SSW).

Figure 35B:
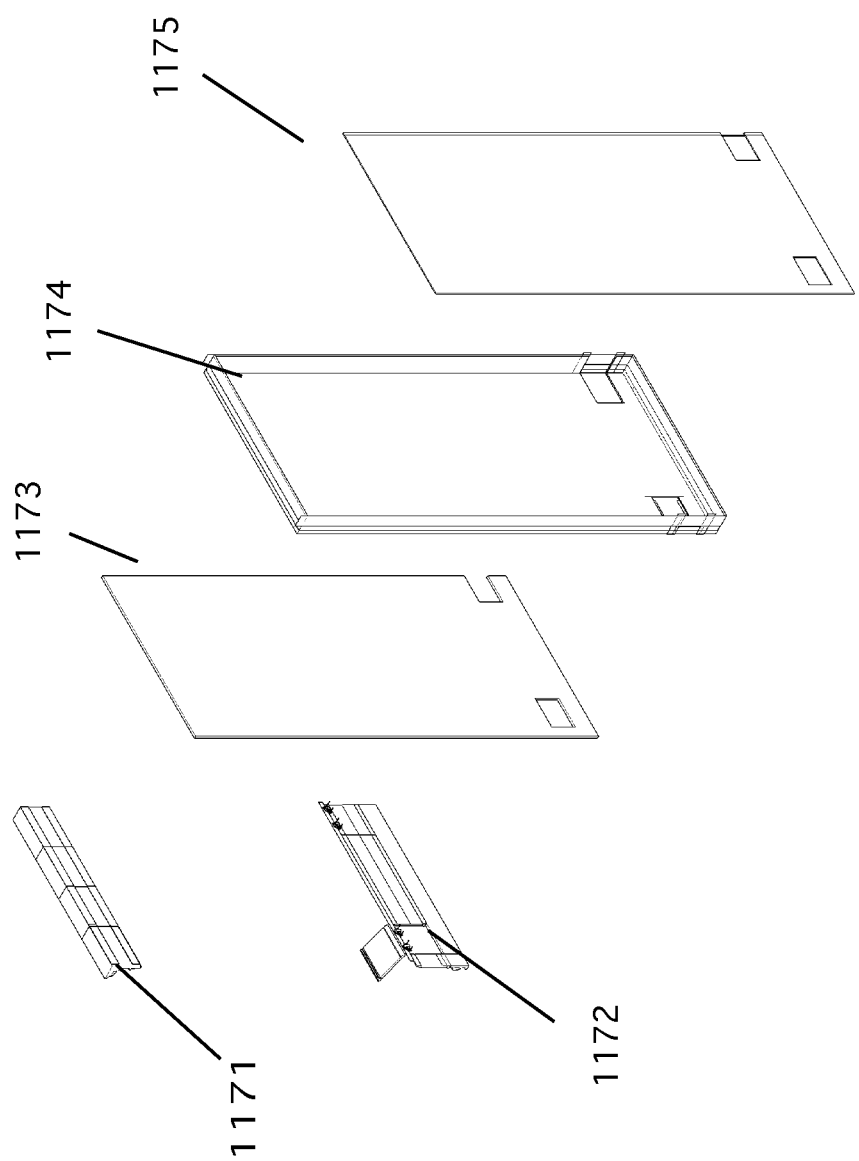

FIG. 35b is a rear left perspective view of the finishing assembly of the Stationary Structural Wall (SSW).

Figure 35C:
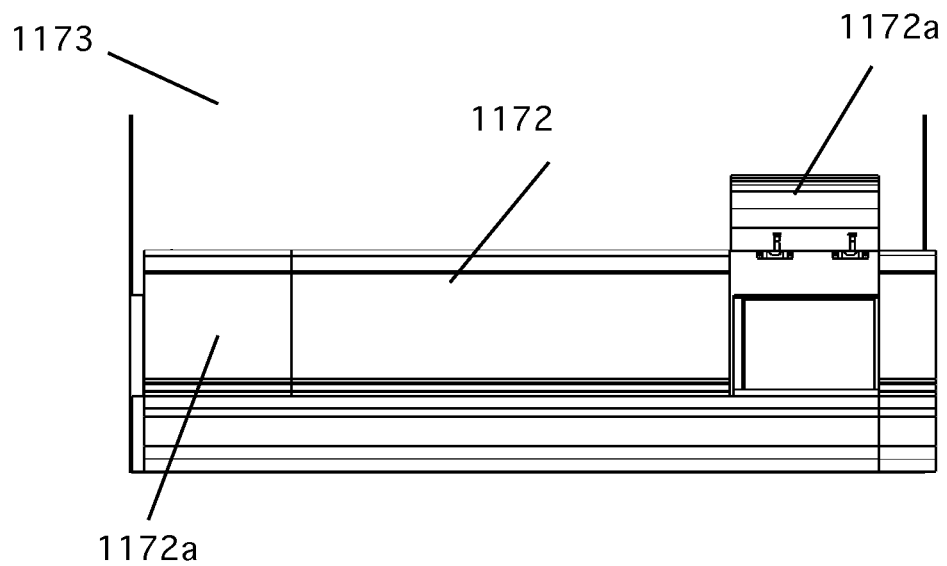

FIG. 35c is a front detail view of the Wall Base Trim (WBT) baseboard with one of the access doors open.

Figure 35D:
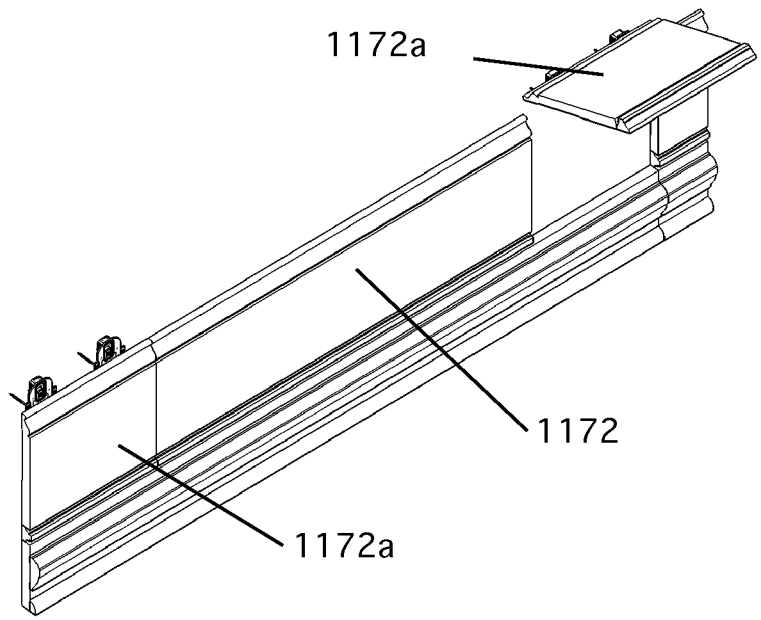

FIG. 35d is a perspective detail view of the Wall Base Trim (WBT) baseboard with one of the access doors open.

Figure 36:
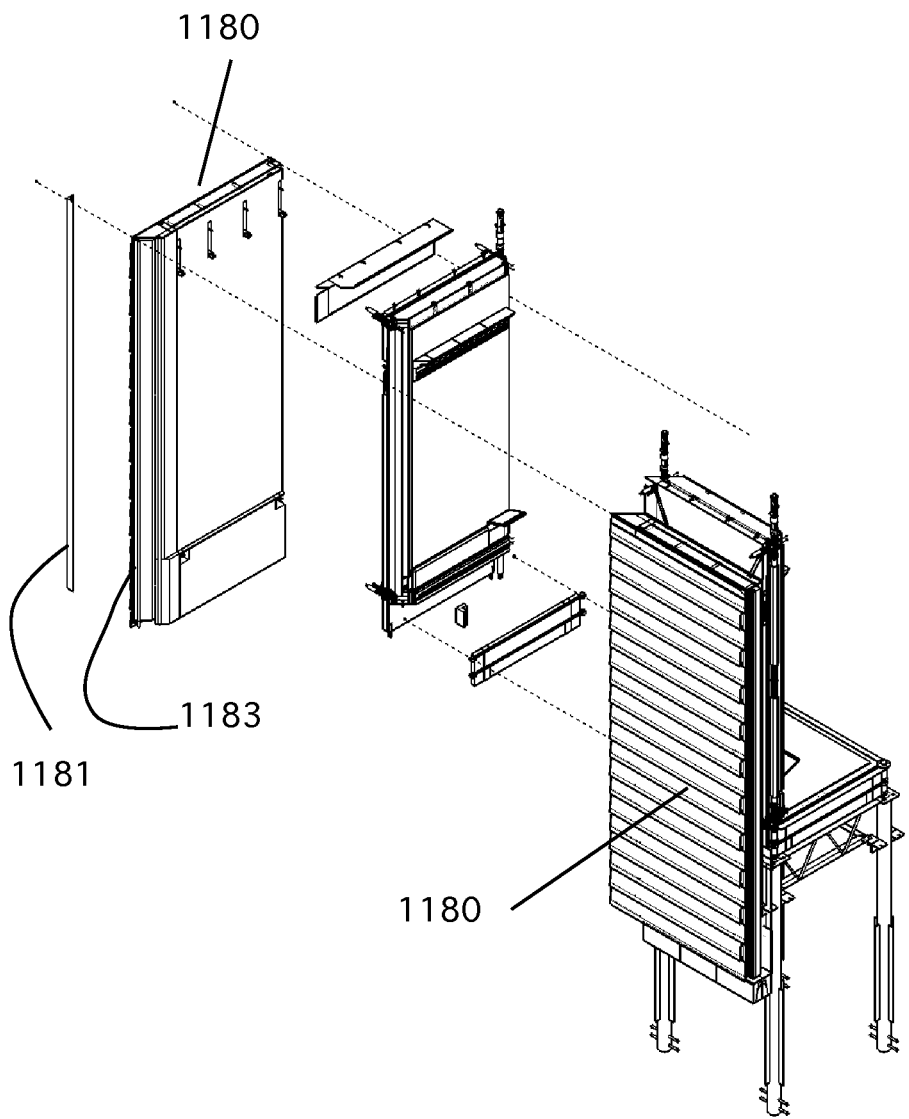

FIG. 36 is an exploded perspective view of a Smart Wall Panel Corner (SWPC) section of a wall unit.

Figure 37:
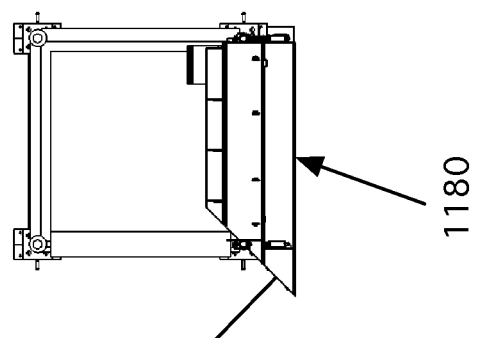
Figure 37:
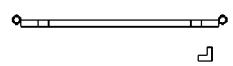
Figure 37:
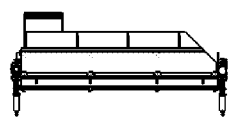
Figure 37:
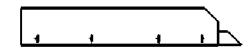

FIG. 37 is an exploded top view of a SSW Corners Assembly (SSWC).

Figure 38:
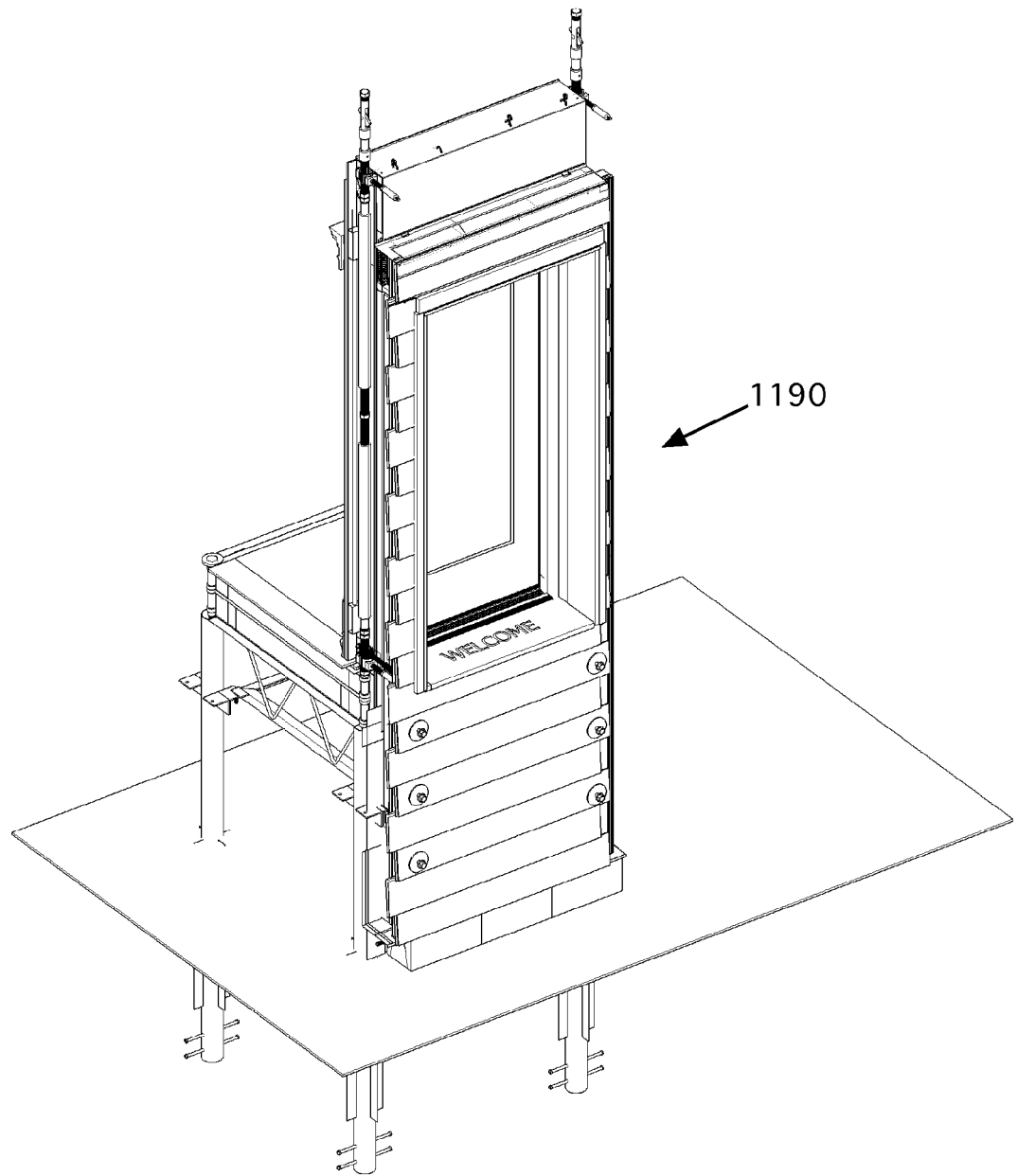

Special wall section with door:

FIG. 38 is a front perspective view of a Smart Wall Panel (SWP) Door assembly.

Figure 39:
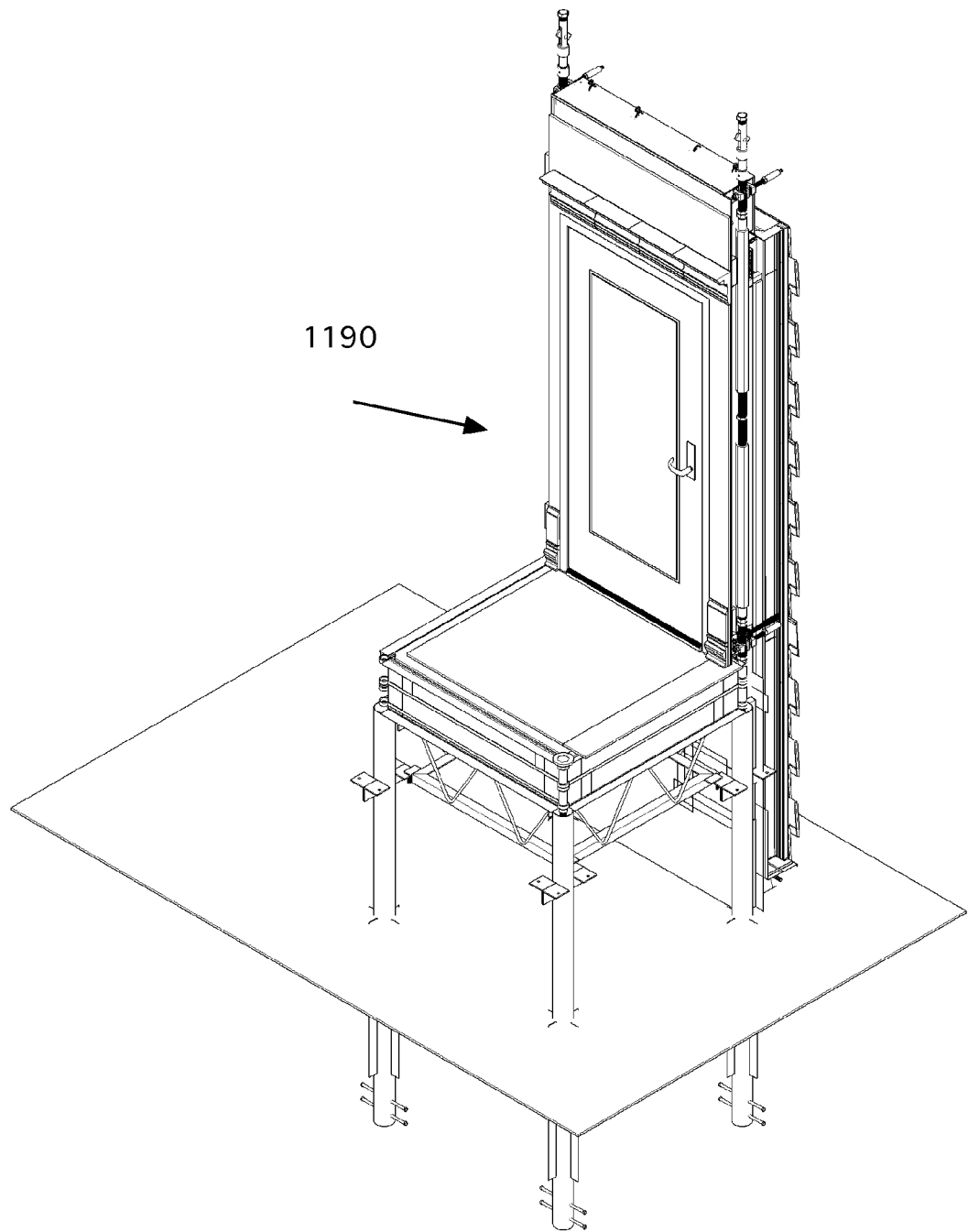

FIG. 39 is a rear perspective view of the Smart Wall Panel (SWP) Door assembly.

Figure 40:
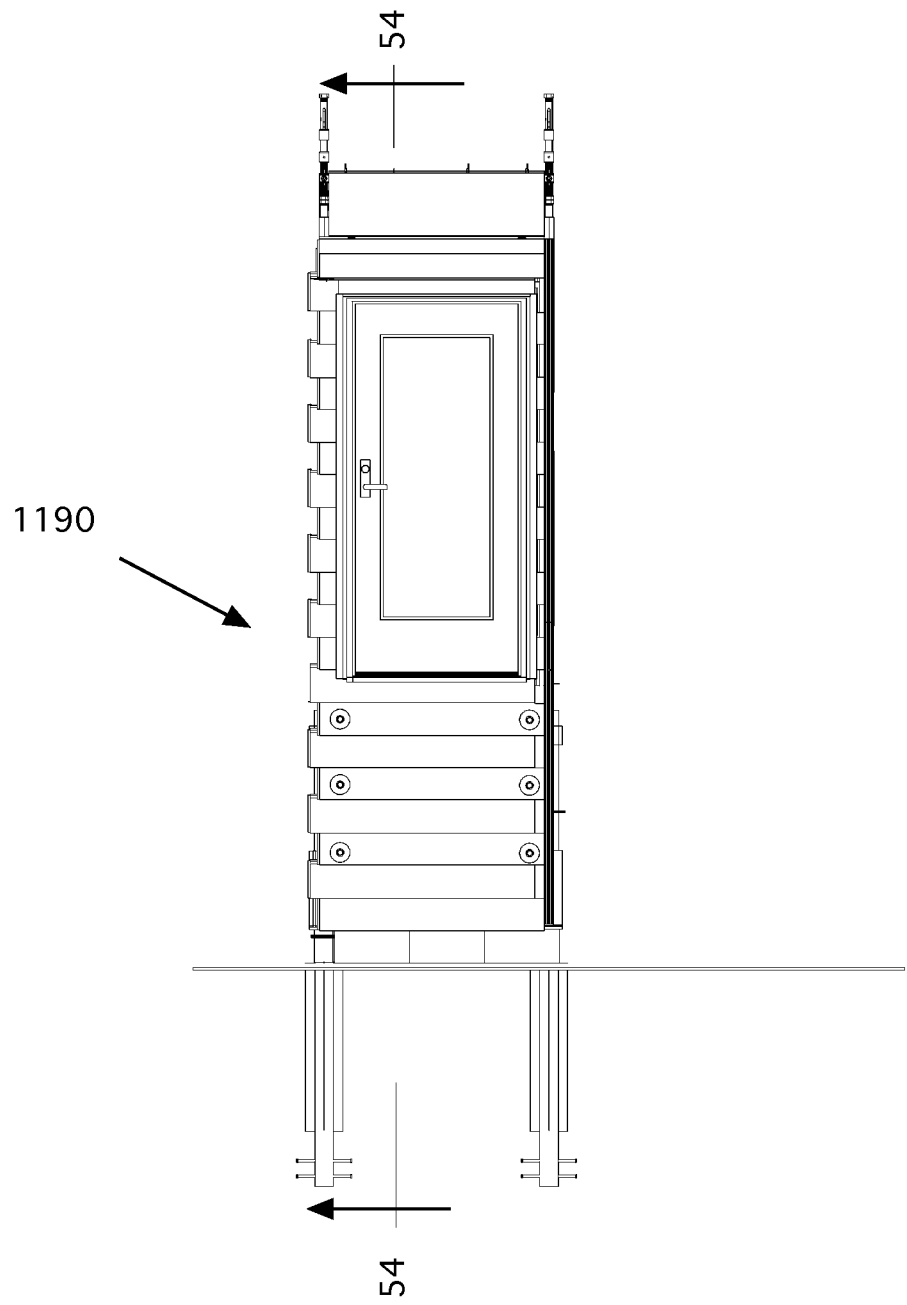

FIG. 40 is a front view of the Smart Wall Panel (SWP) Door assembly.

Figure 41:
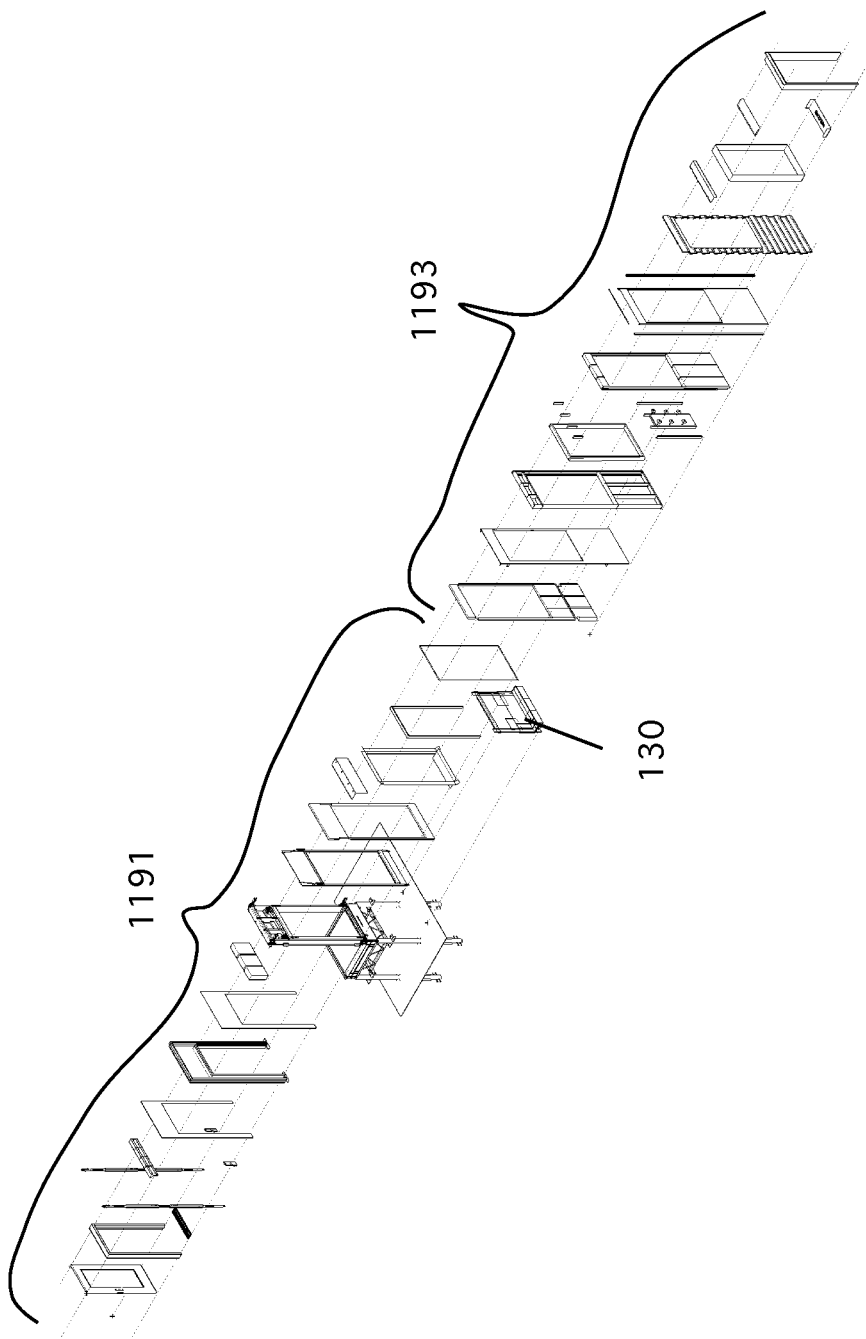

FIG. 41 is an exploded view of the SWP Door assembly.

Figure 42:
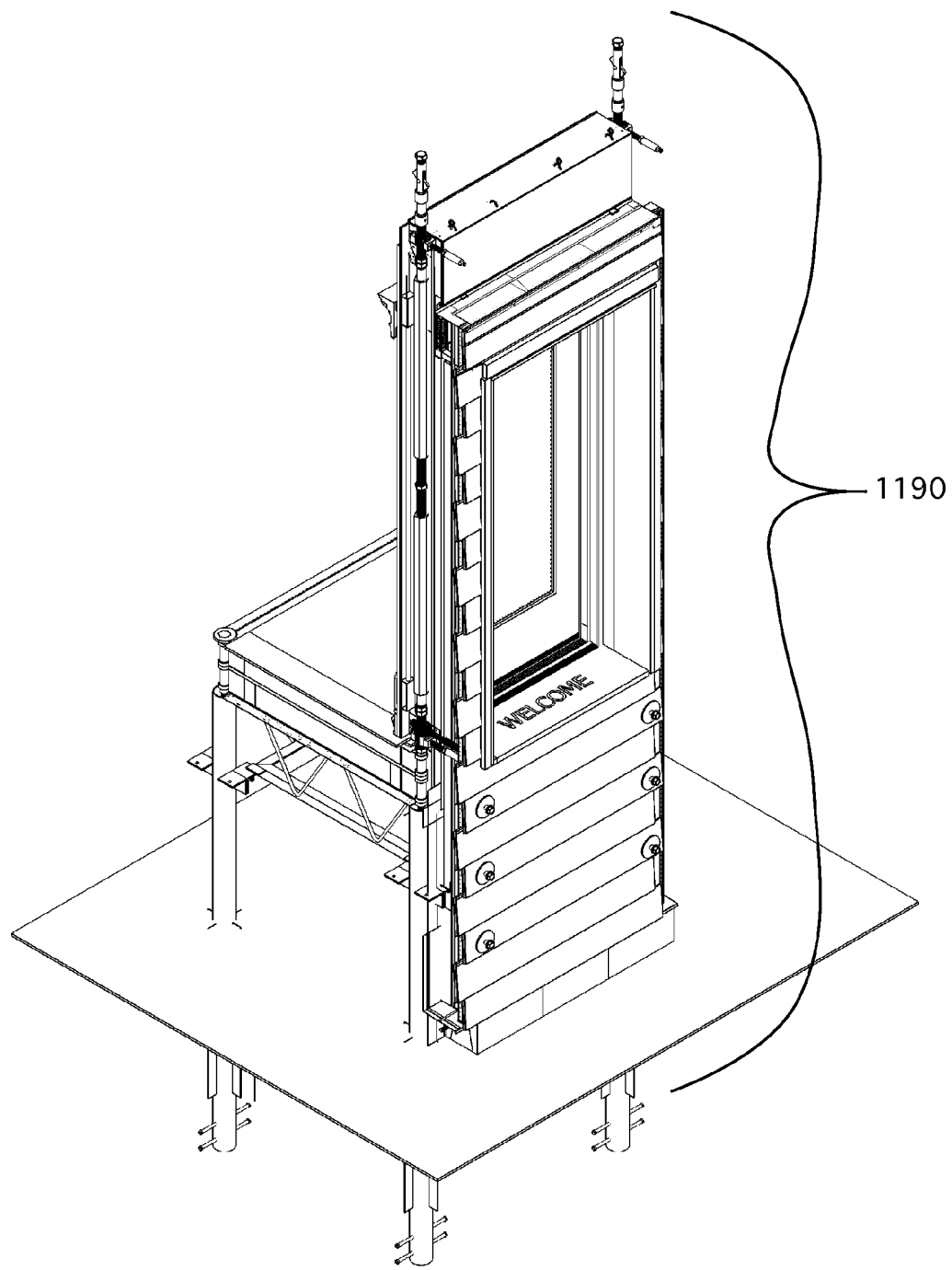

FIG. 42 is a perspective view of the Wall Opening Assembly Door (WOAD) and a modified Smart Wall Panel (SWP) for a door opening.

Figure 42A:
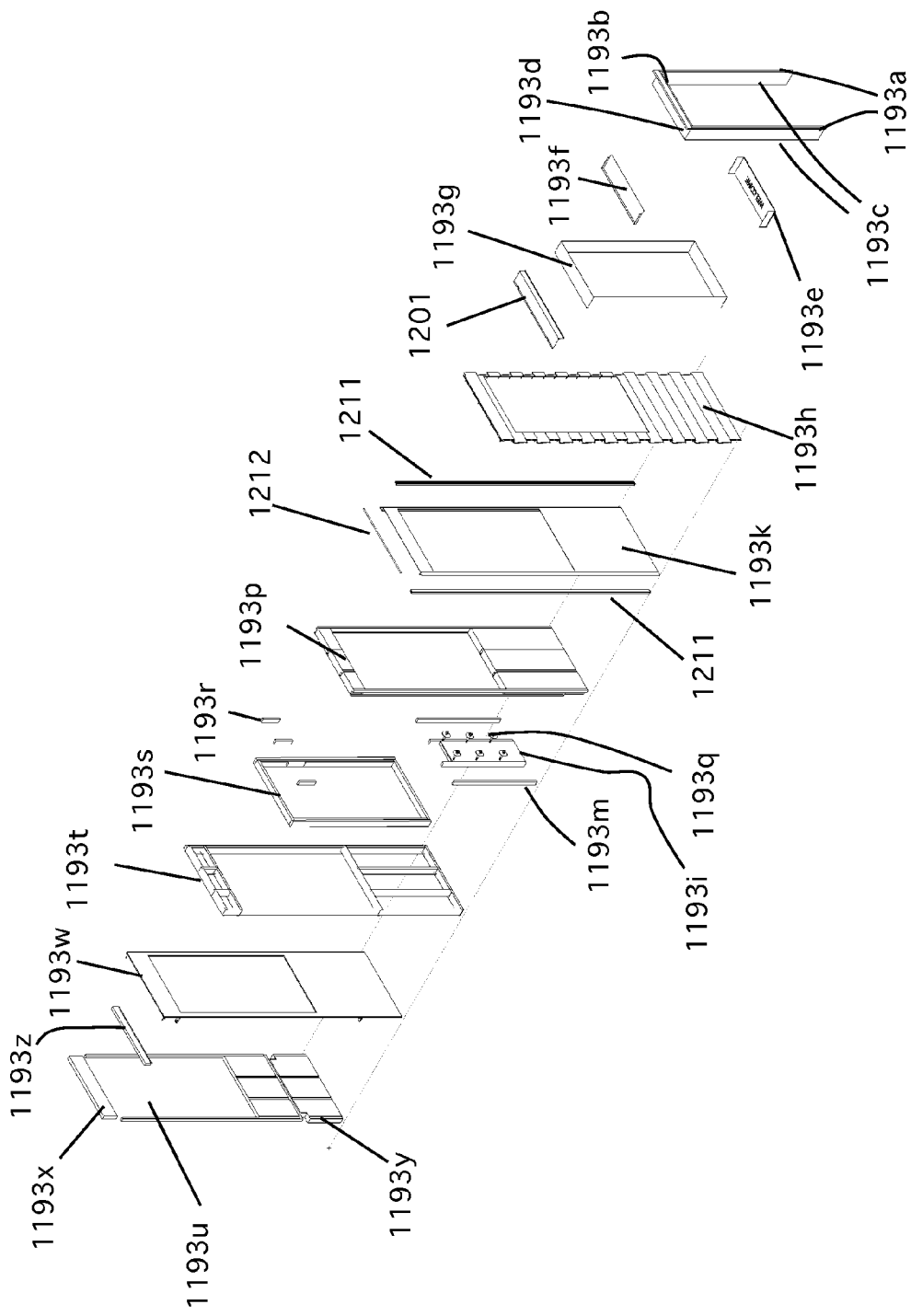

FIG. 42a is an exploded view of the exterior portion of the SWP Door assembly.

Figure 42B:
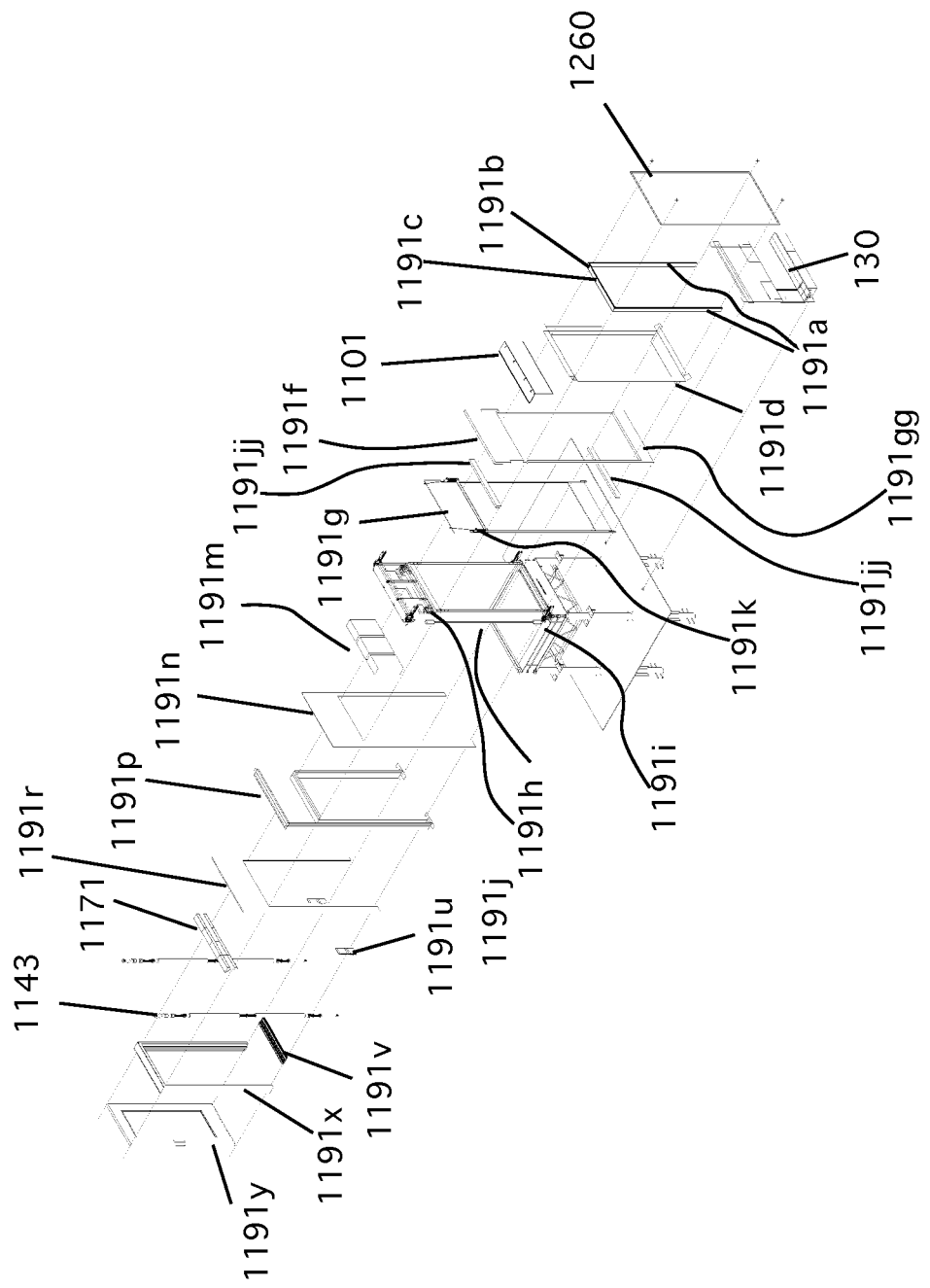

FIG. 42b is an exploded view of the inner portion of the SWP Door Assembly.

Figure 43:
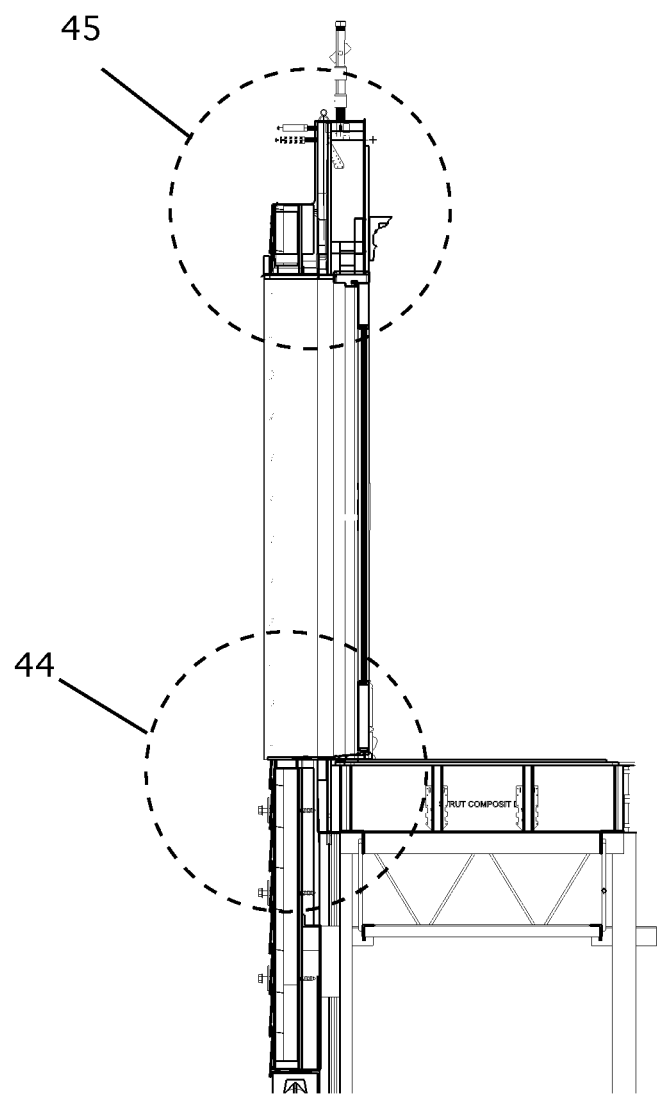

FIG. 43 is a side cross-sectional view of the SWP Door assembly taken along the lines 43-43 of FIG. 40.

Figure 44:
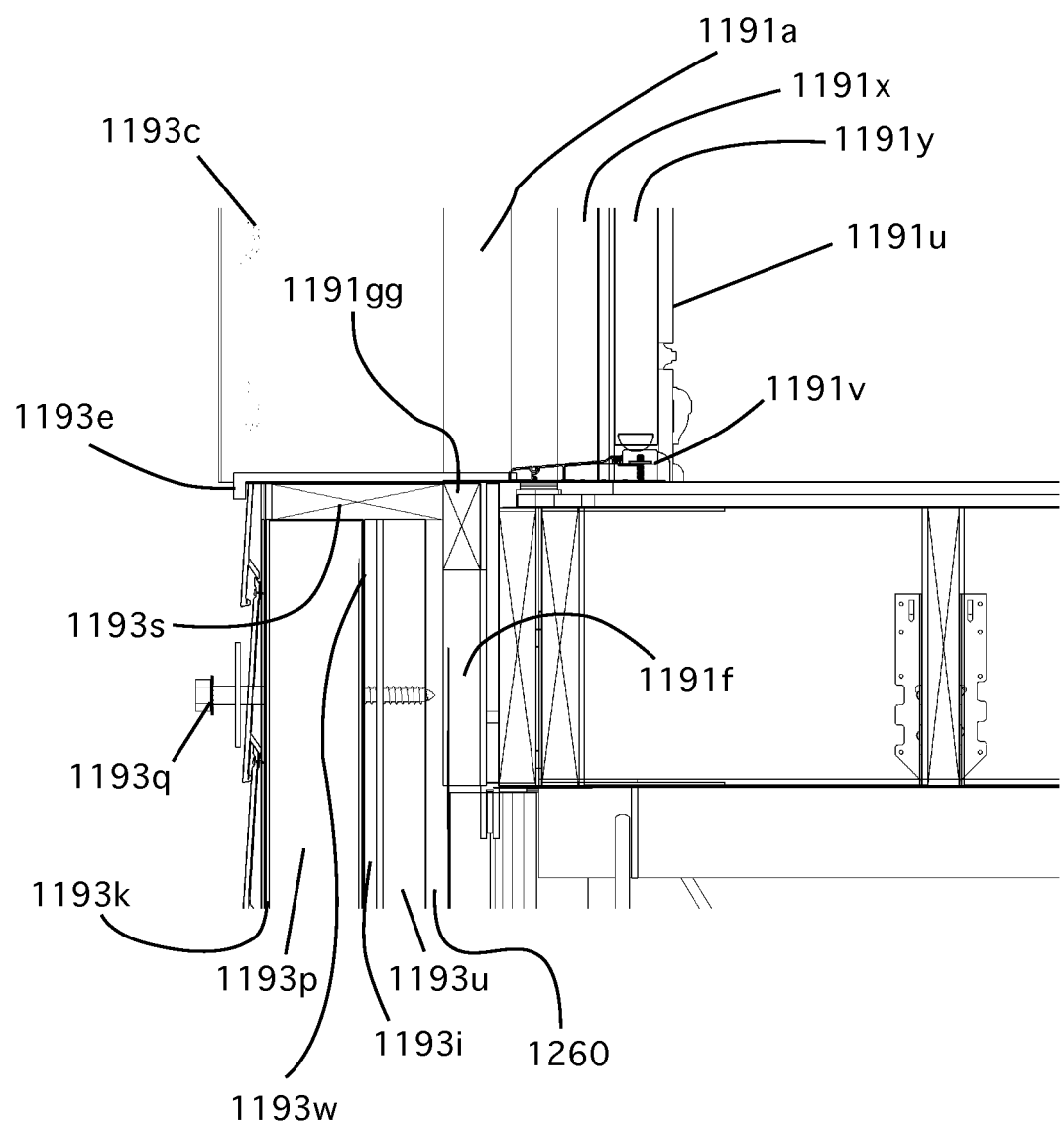

FIG. 44 is an enlarged detail of the lower portion of the sectional view shown in FIG. 43.

Figure 45:
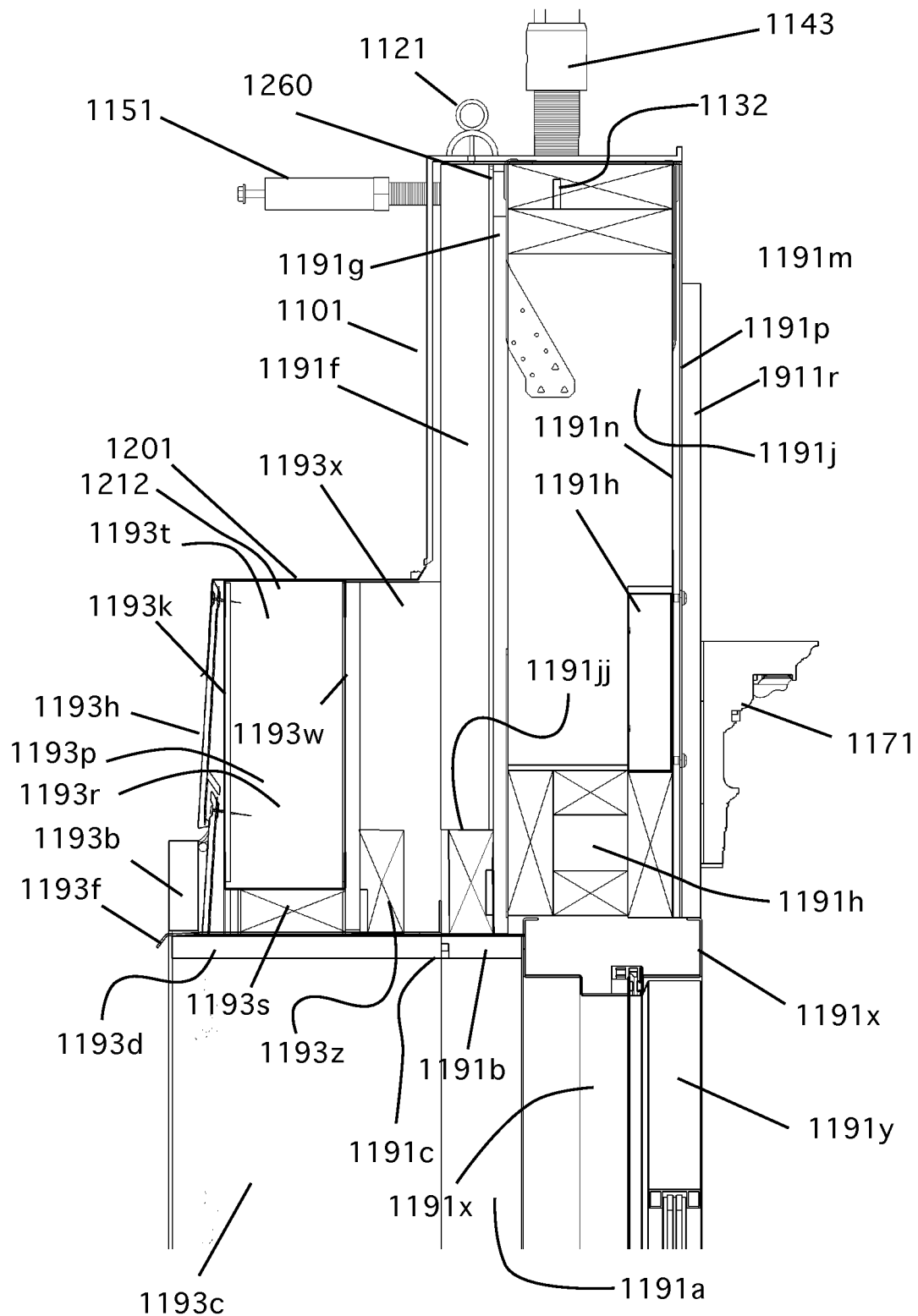

FIG. 45 is an enlarged detail of the upper portion of the sectional view shown in FIG. 43.

Figure 46:
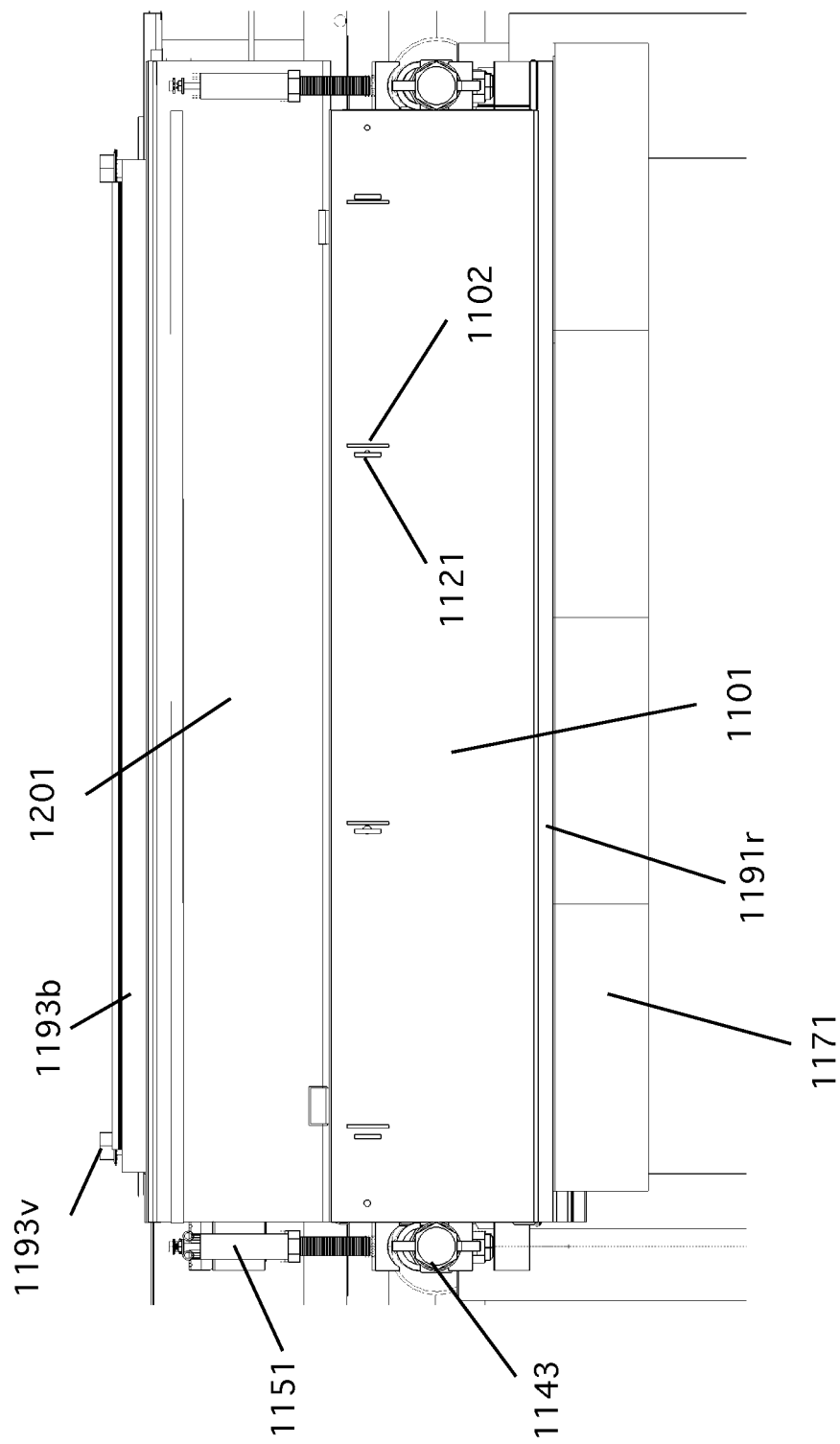

FIG. 46 is a top view of the SWP Door assembly.

Figure 47:
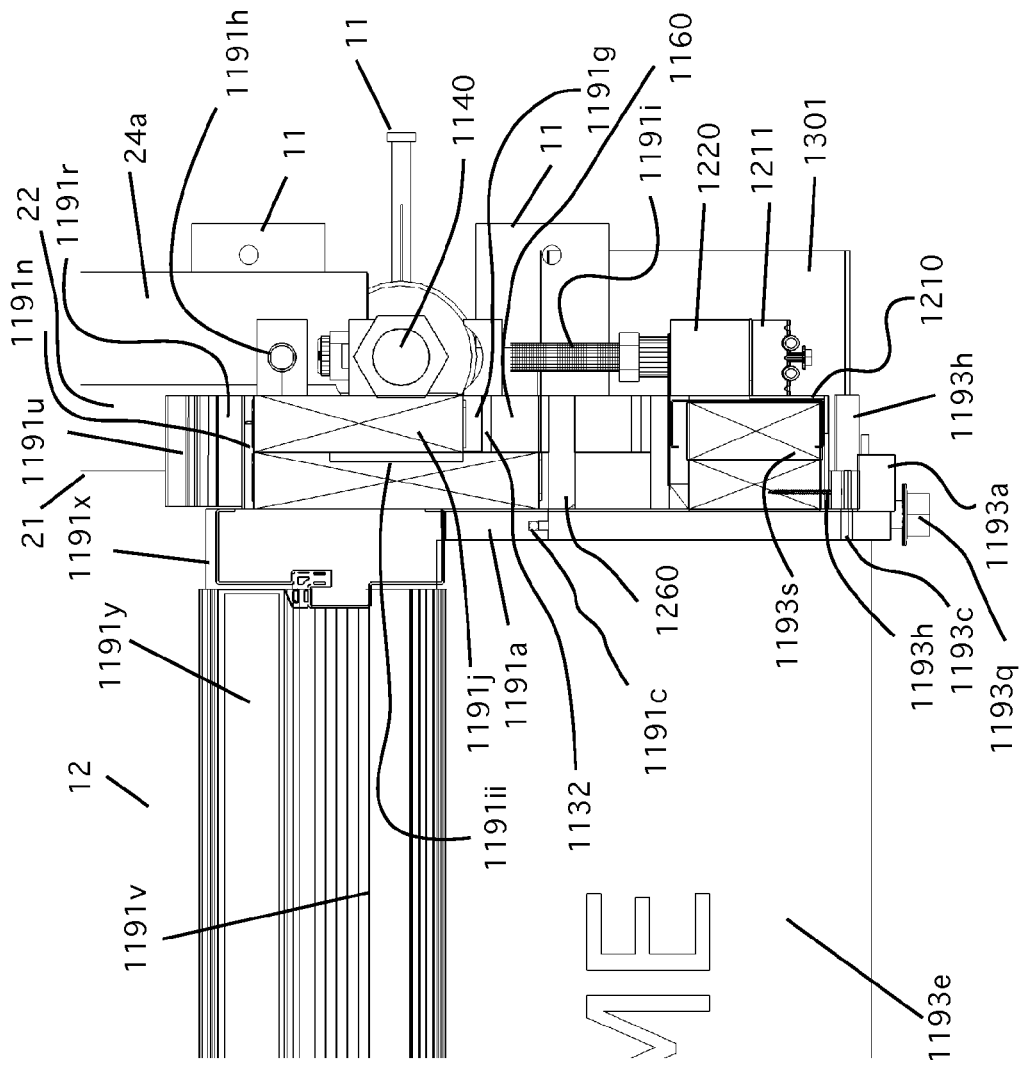

FIG. 47 is a cross-sectional detail view of the lower portion showing a portion of the threshold.

Figure 48:
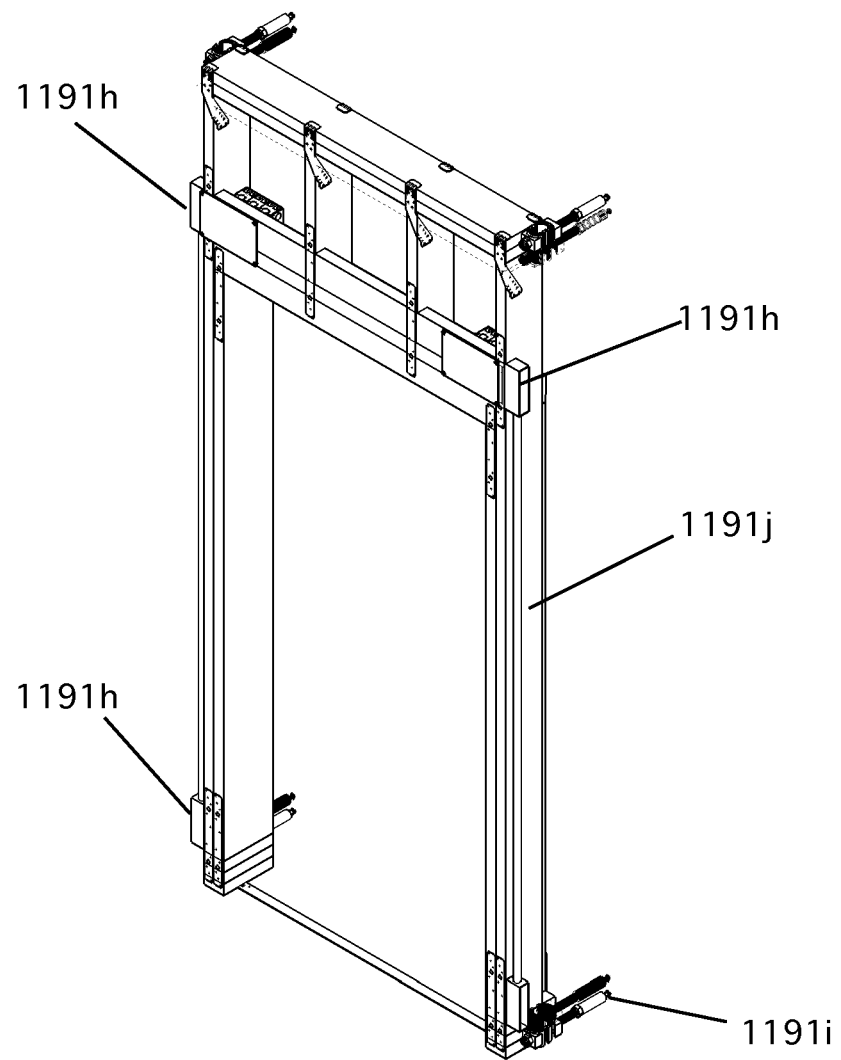

FIG. 48 is a perspective view of the outer side of the doorframe.

Figure 49:
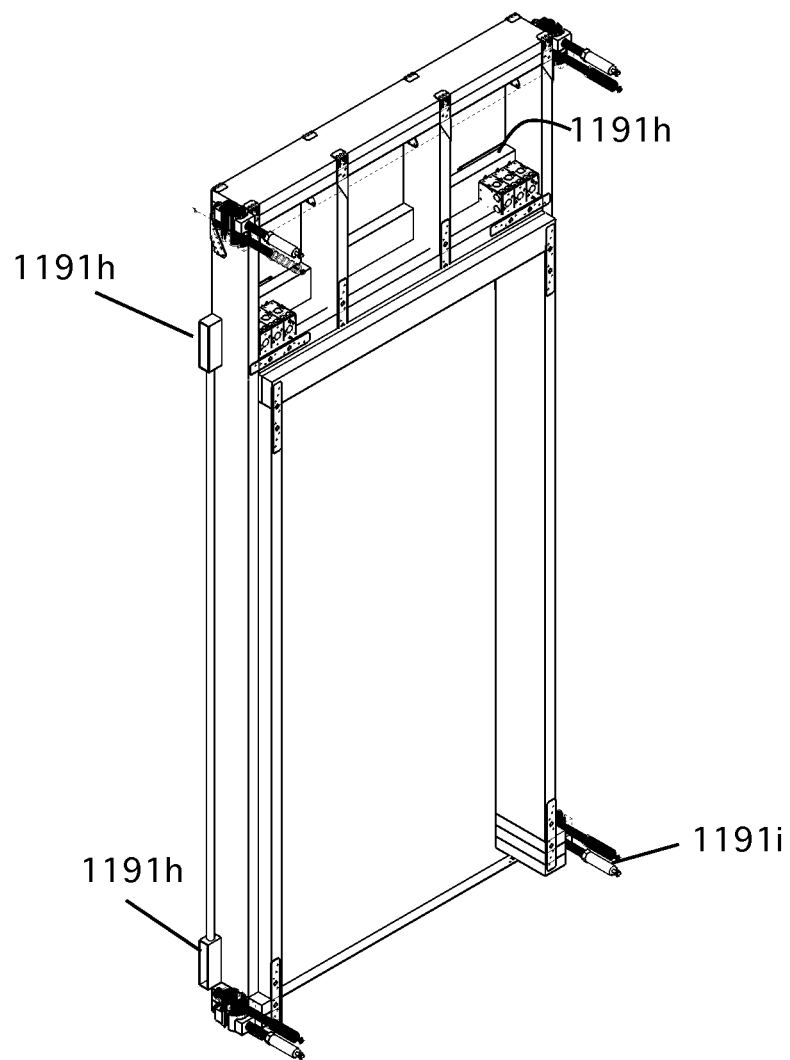

FIG. 49 is a perspective view of the inner side of the doorframe.

Figure 50:
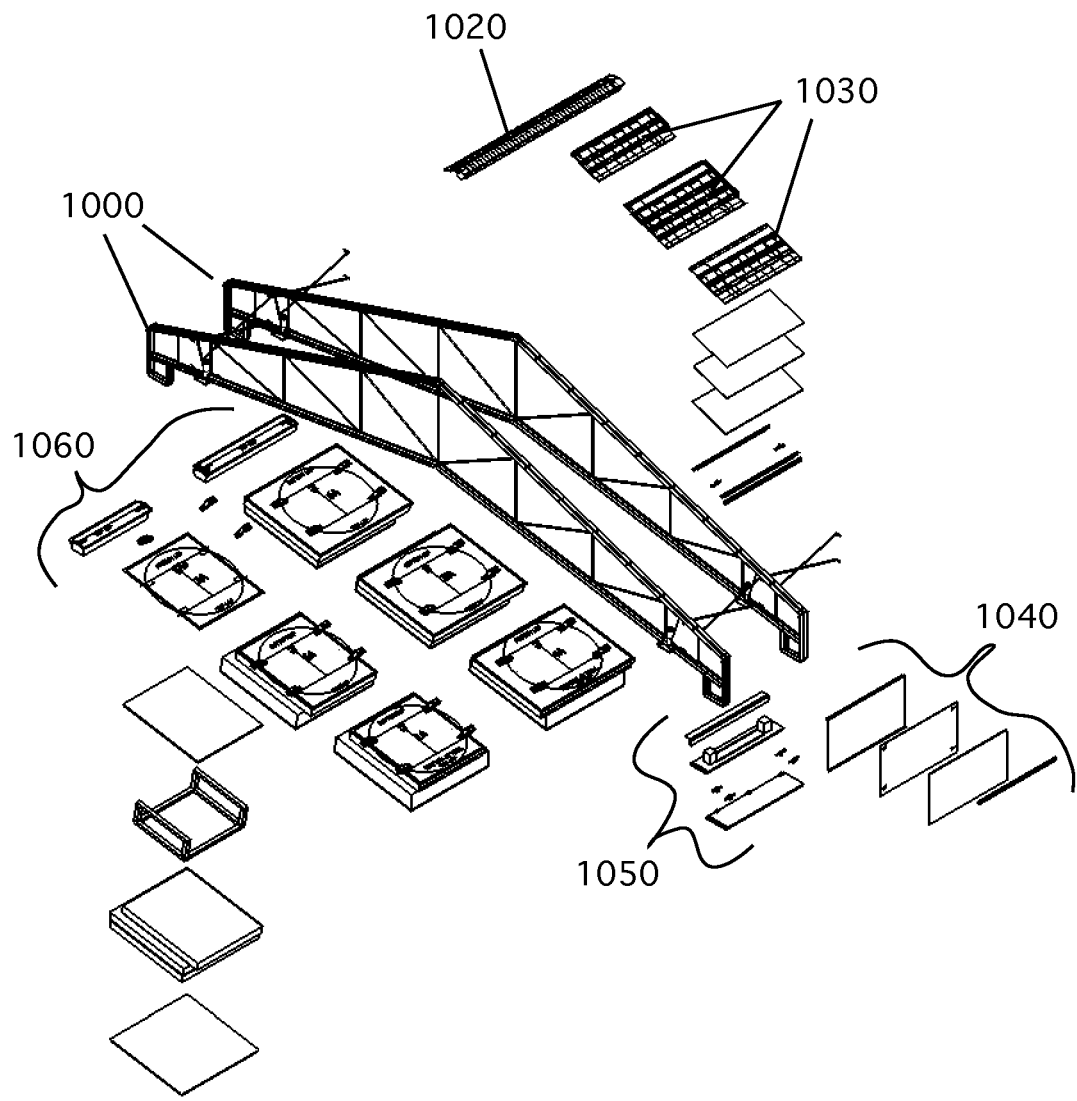

The Roof:

FIG. 50 is a perspective exploded view of the entire Roof Assembly Materials (RAM) system.

Figure 51:
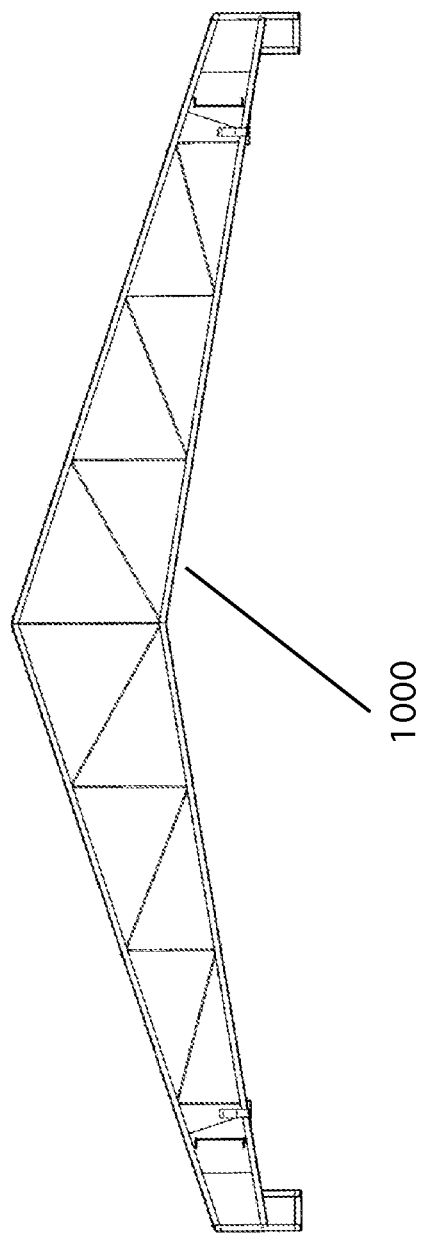

FIG. 51 is a front view of a Roof Truss Assembly (RTA).

Figure 52:
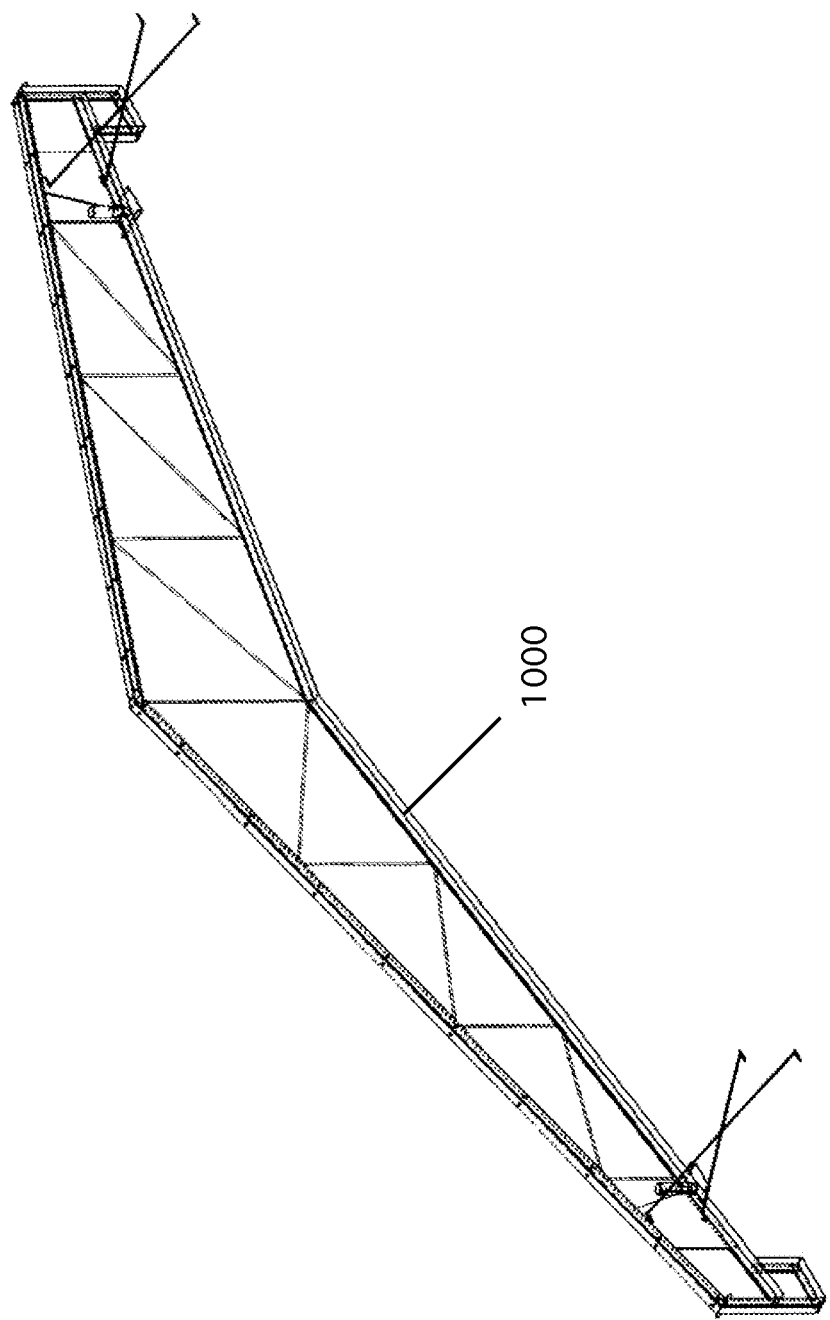

FIG. 52 is a perspective view of a Roof Truss Assembly (RTA).

Figure 53:
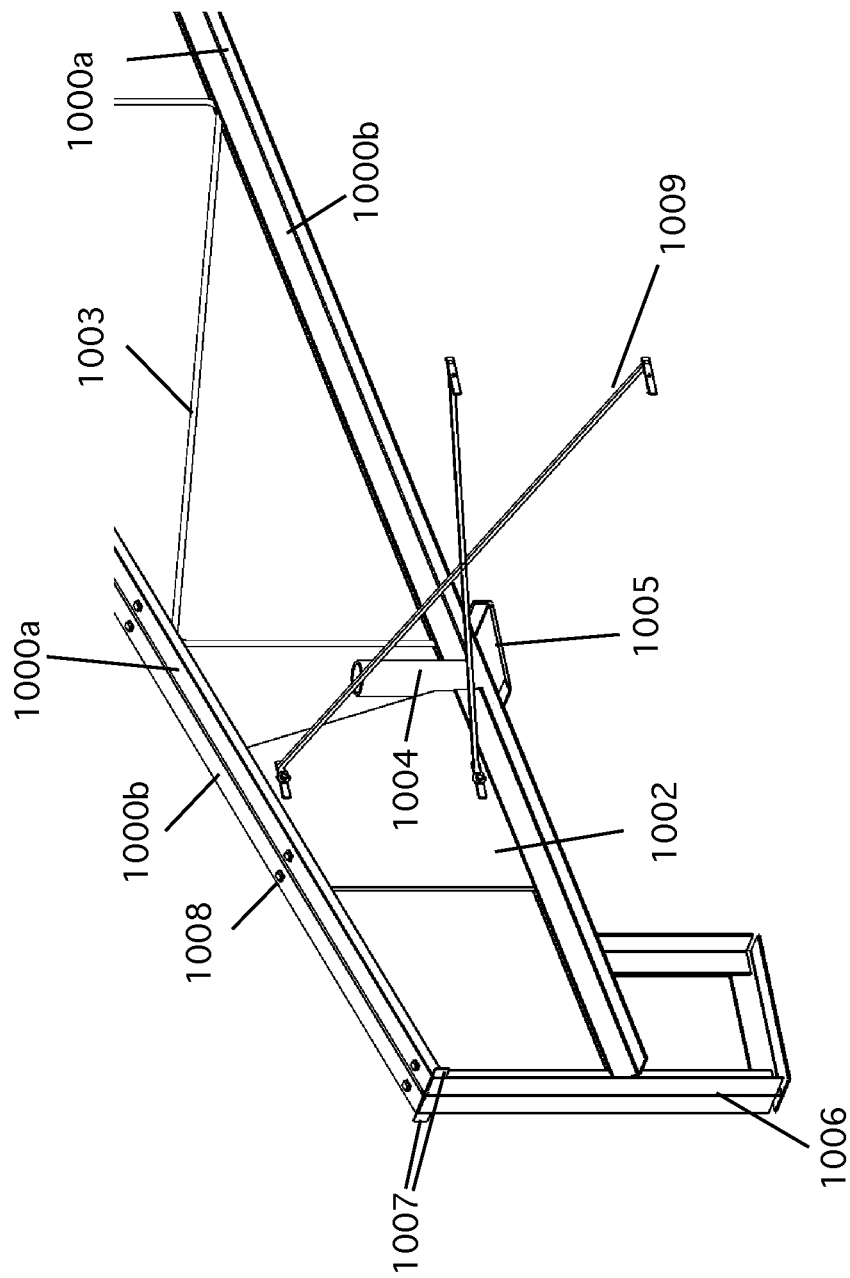

FIG. 53 is a detail of an end portion of a Roof Truss Assembly (RTA).

Figure 54:
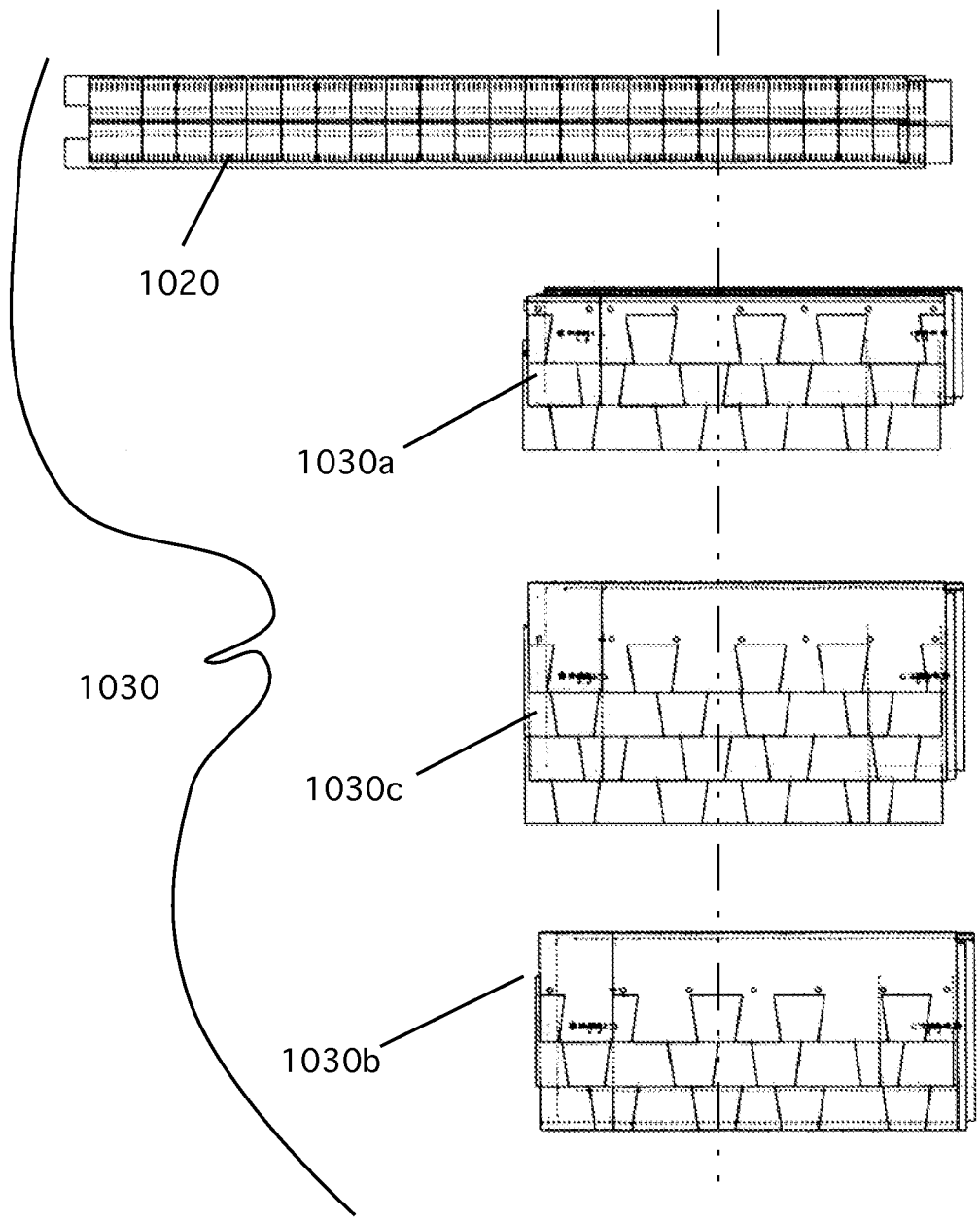

FIG. 54 is a detail view showing the Roof Ridge Vent (RRV) and Removable Roof Panels (RRPs).

Figure 55:
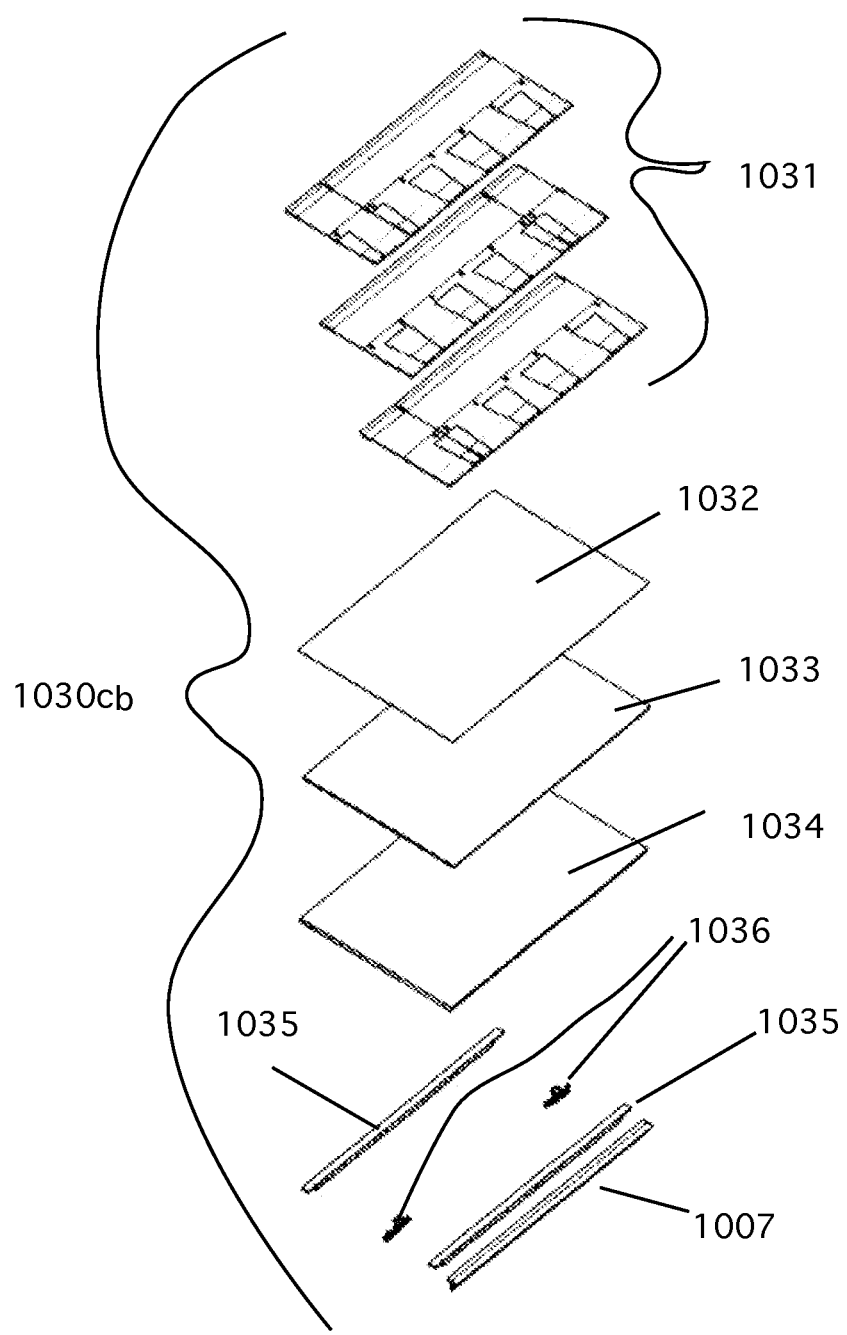

FIG. 55 is an exploded top view of the bottommost Removable Roof Panel RRP).

Figure 56:
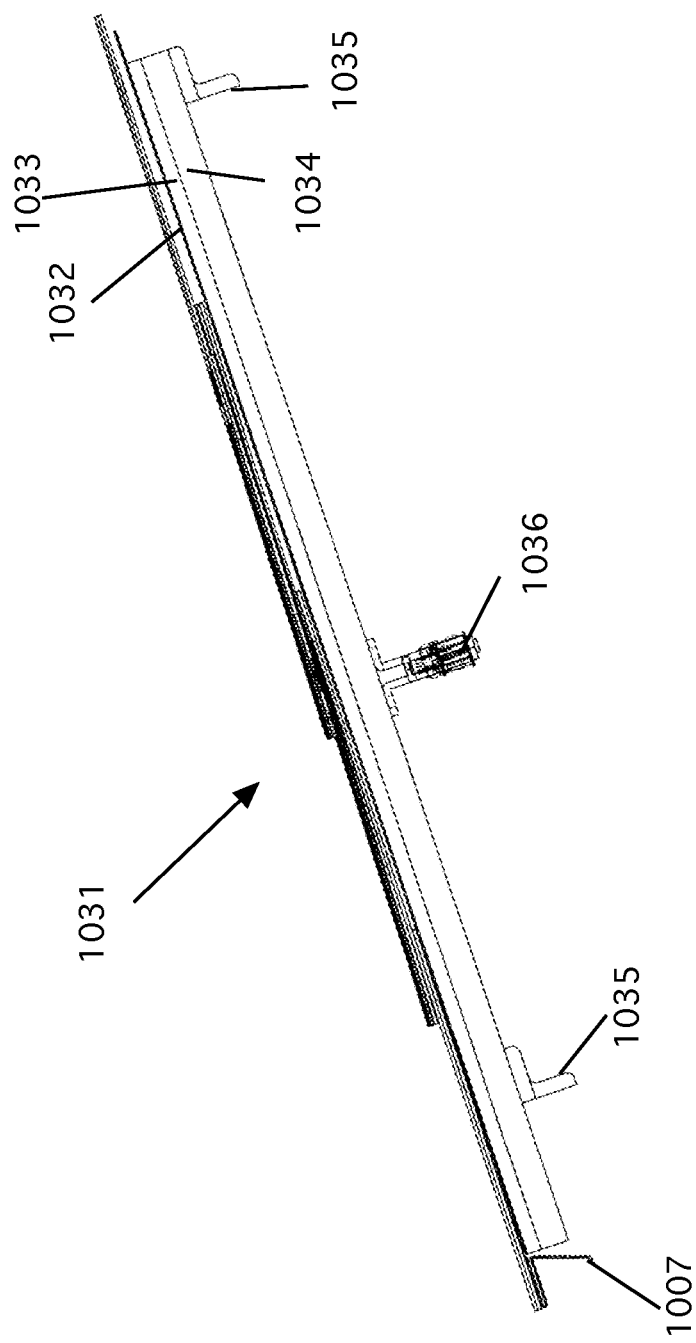

FIG. 56 is a side view of the bottommost Removable Roof Panel (RRP).

Figure 57:
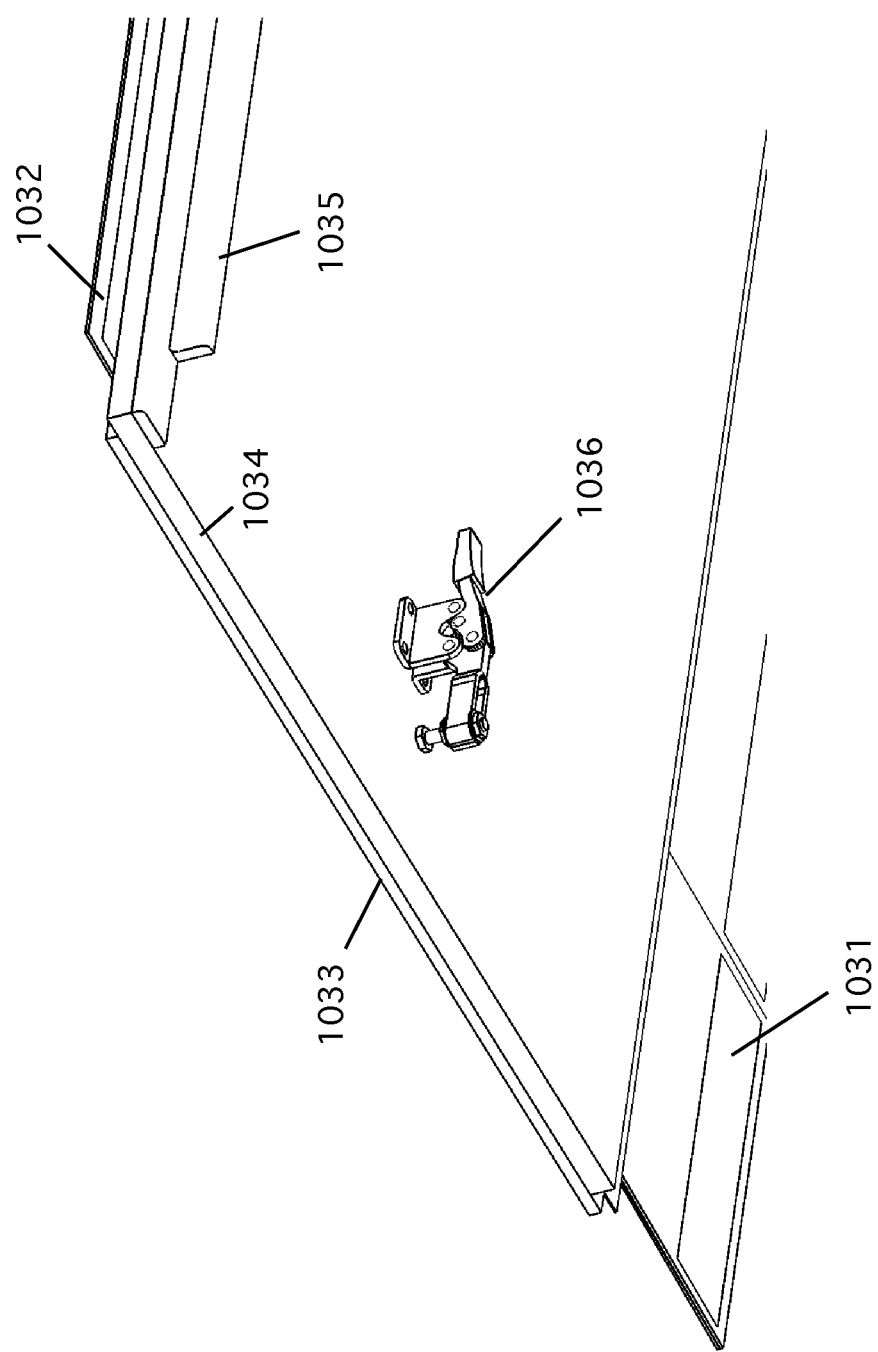

FIG. 57 is a bottom detail view of a removable roof panel clamp.

Figure 58:
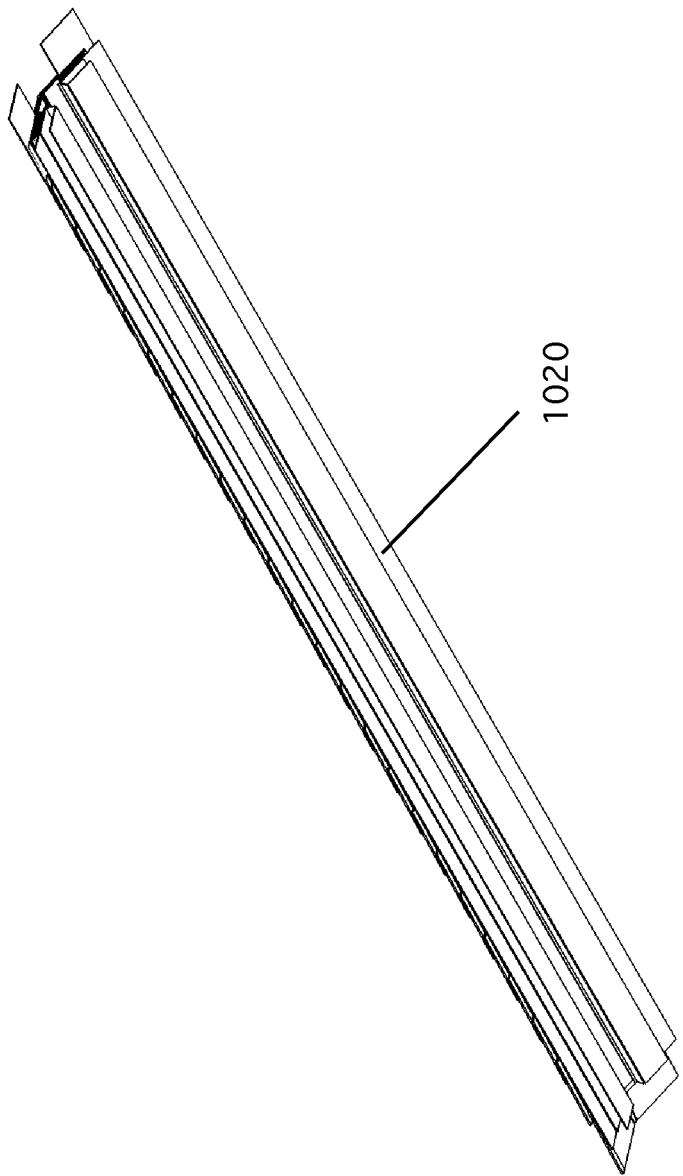

FIG. 58 is a perspective view of the underside of the Roof Ridge Vent (RRV).

Figure 59:
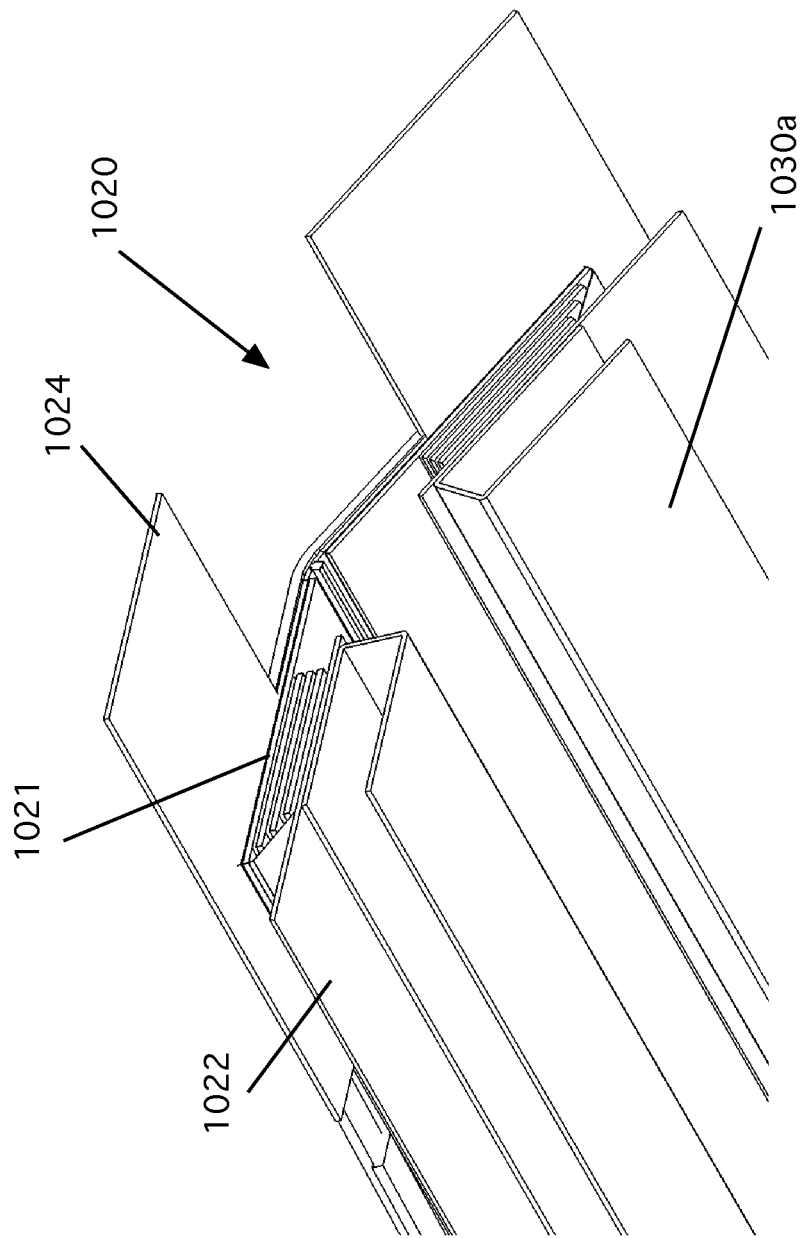

FIG. 59 is detail view of the end of the underside of the Roof Ridge Vent (RRV).

Figure 60:
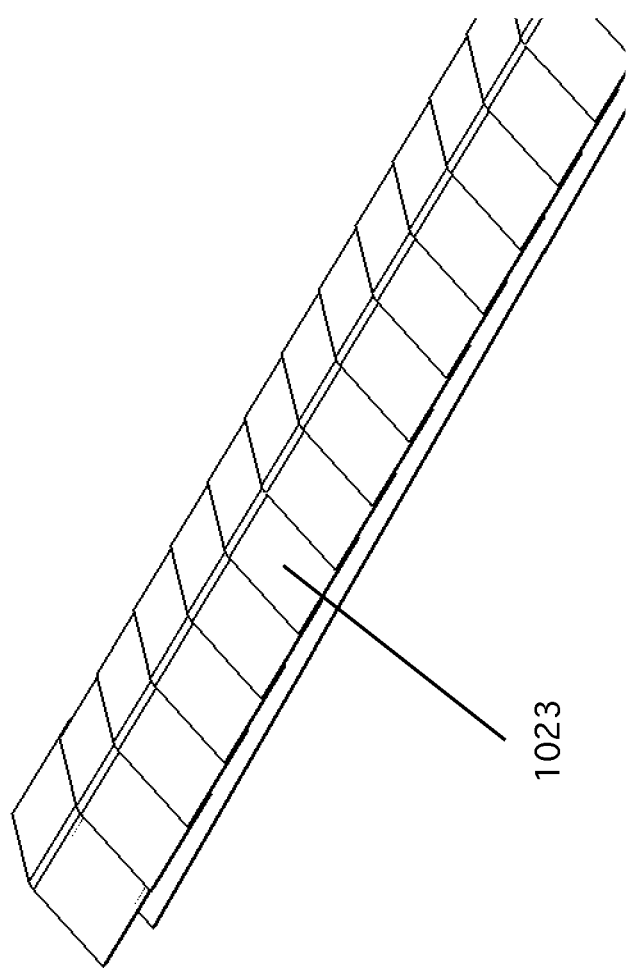

FIG. 60 is a detail view of a portion of the top of the Roof Ridge Vent (RRV).

Figure 61:
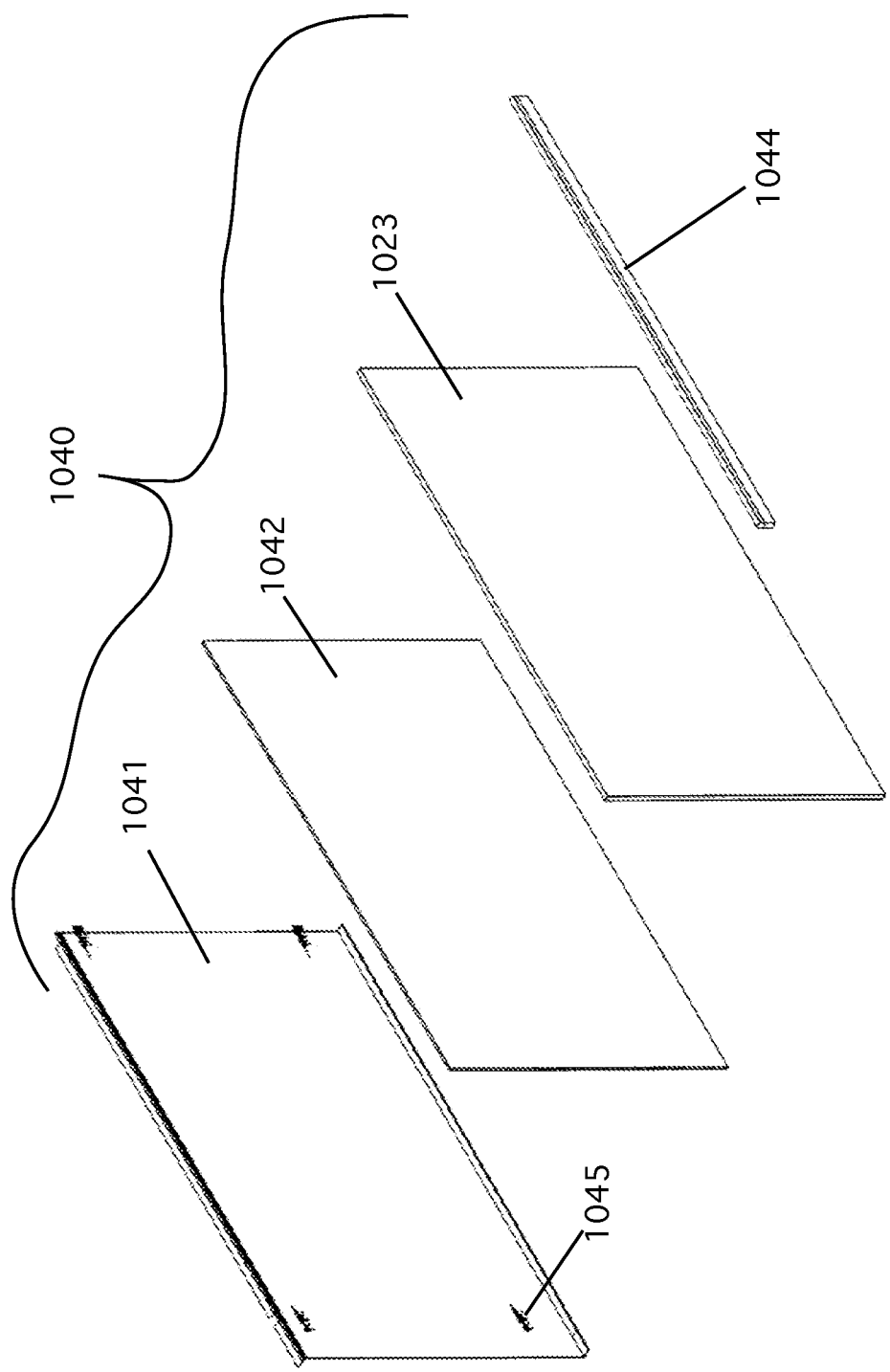

FIG. 61 is an exploded view of one of the Fascia Panel Assemblies (FPA).

Figure 62:
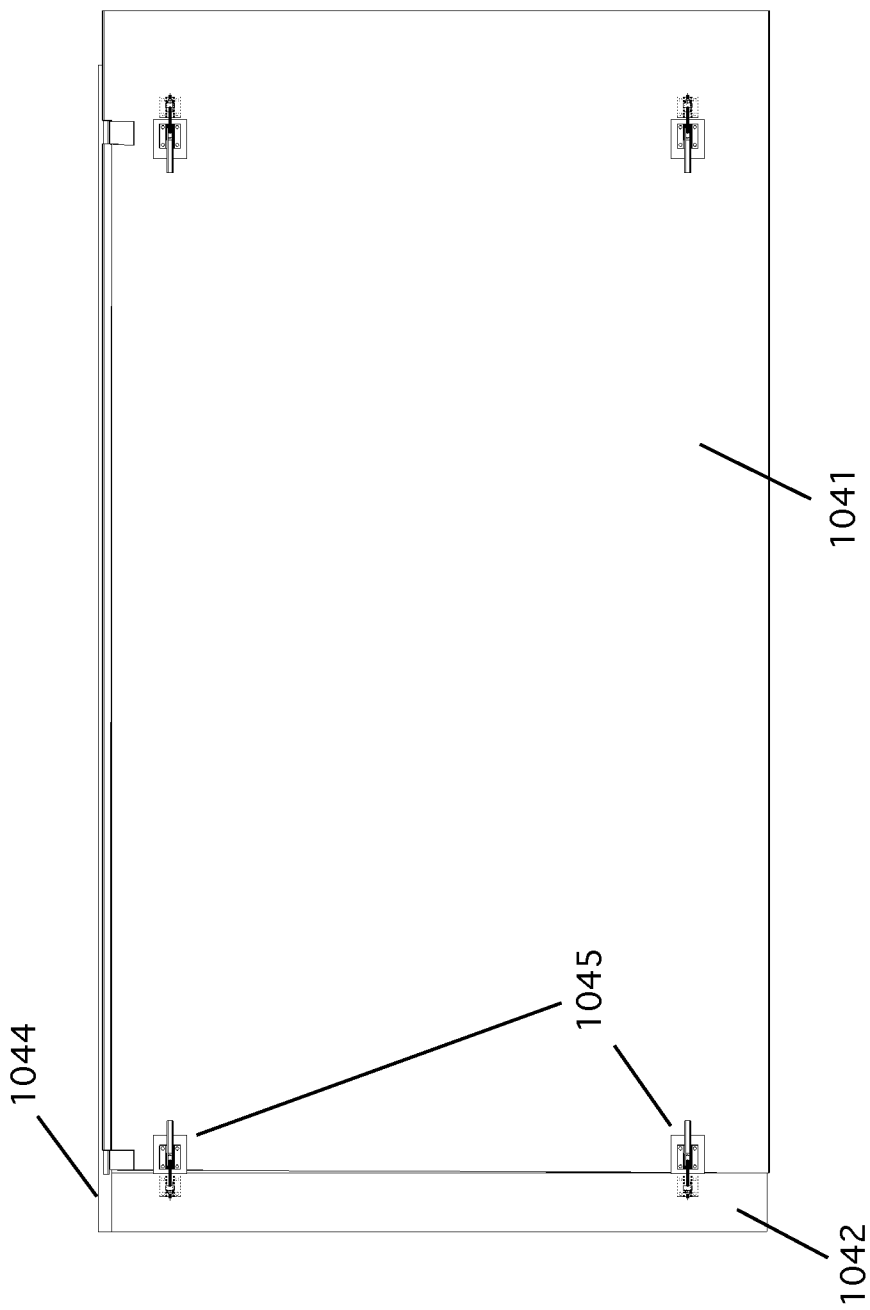

FIG. 62 is a back view of a Fascia Panel Assembly (FPA).

Figure 63:
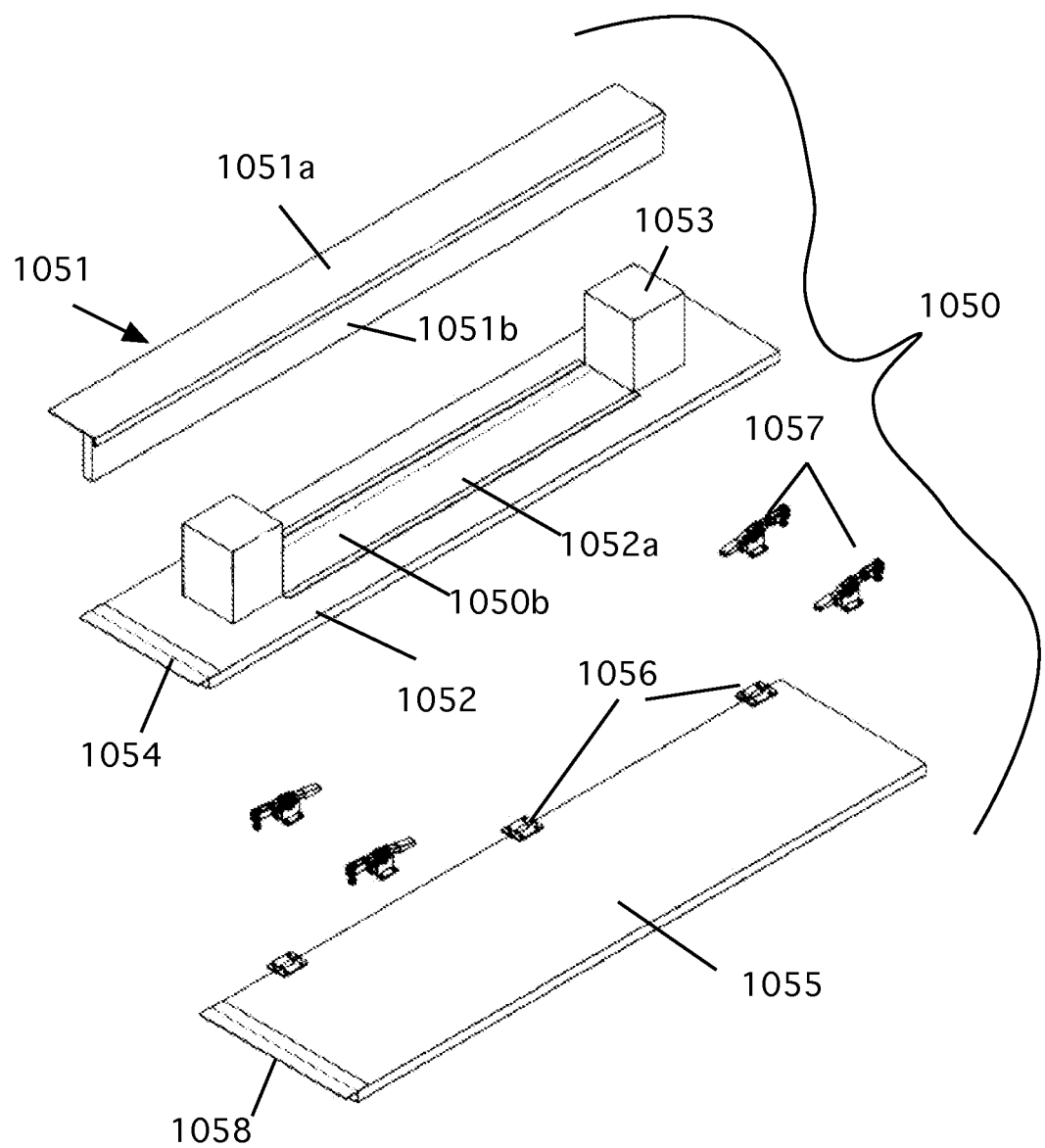

FIG. 63 is an exploded view of a Soffit Panel Assembly (SPA).

Figure 64:
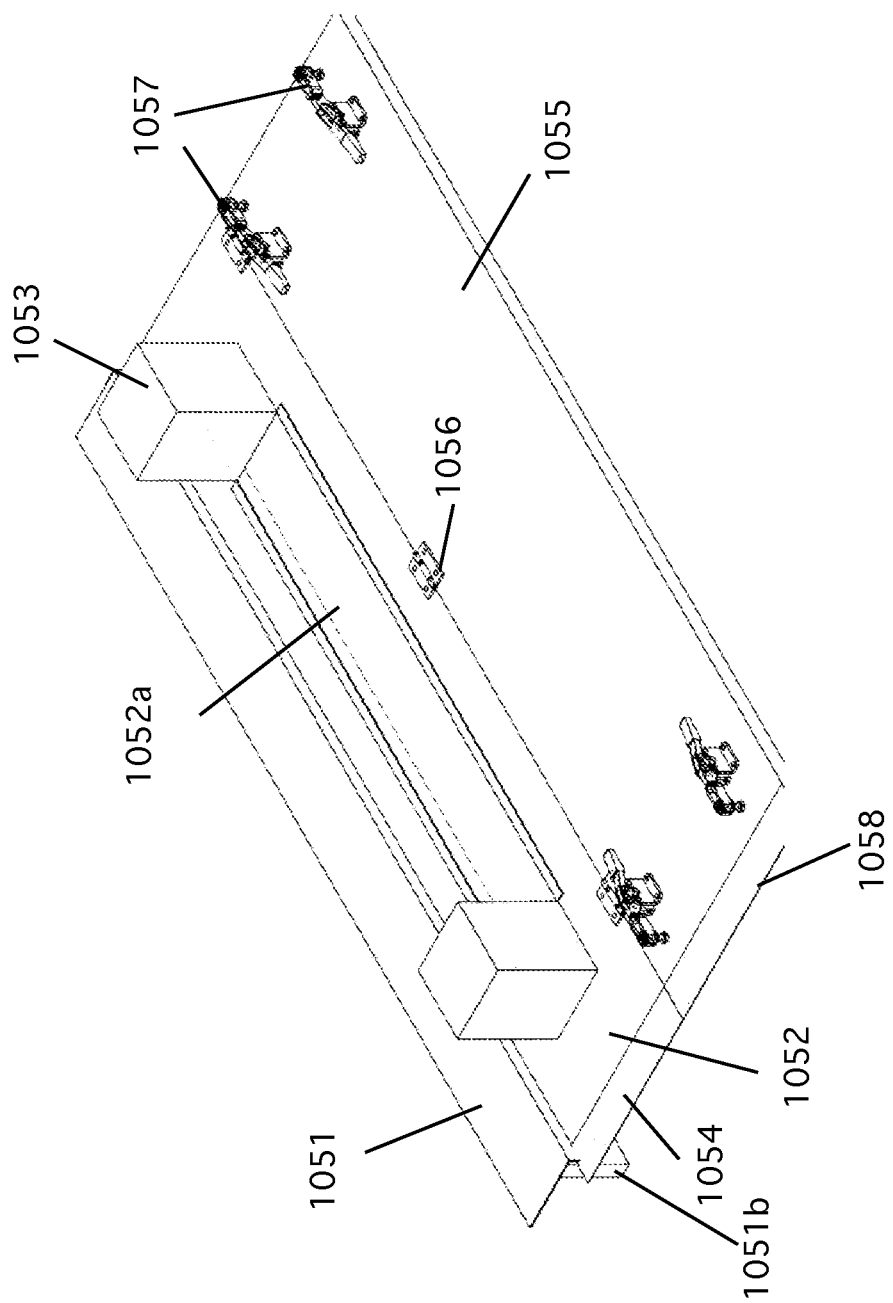

FIG. 64 is a top perspective view of a Soffit Panel Assembly (SPA).

Figure 65:
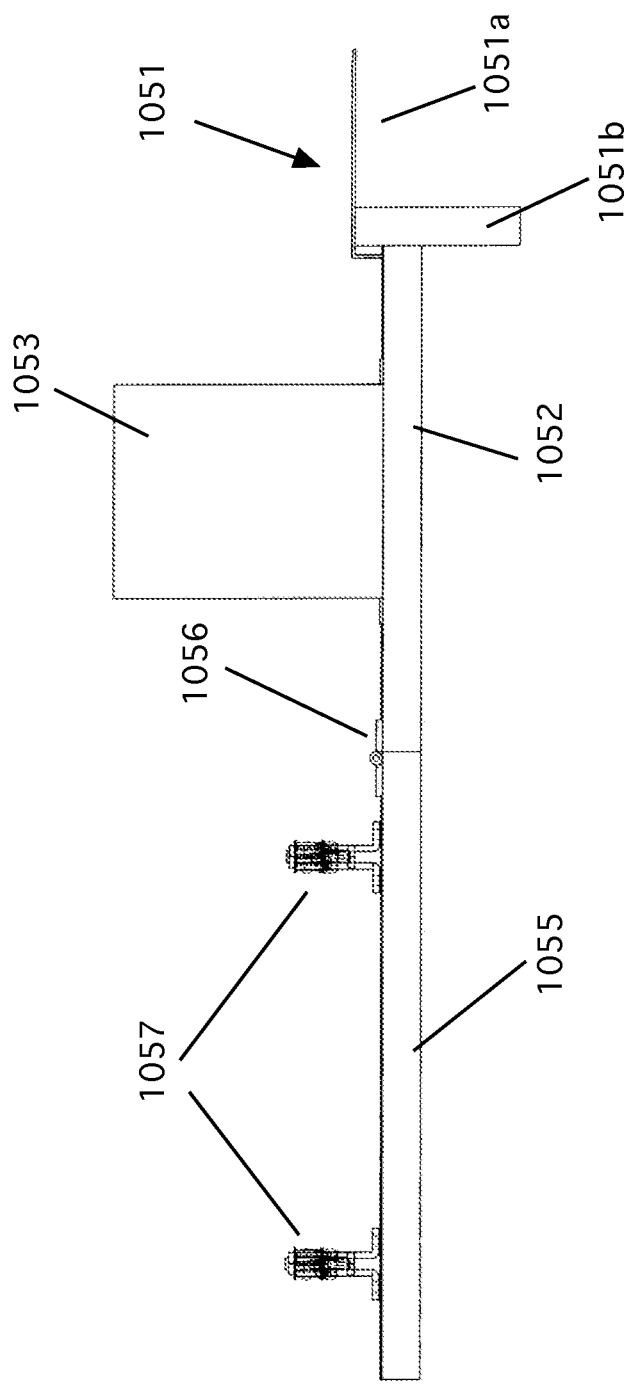

FIG. 65 is a side view of a Soffit Panel Assembly (SPA).

Figure 66:
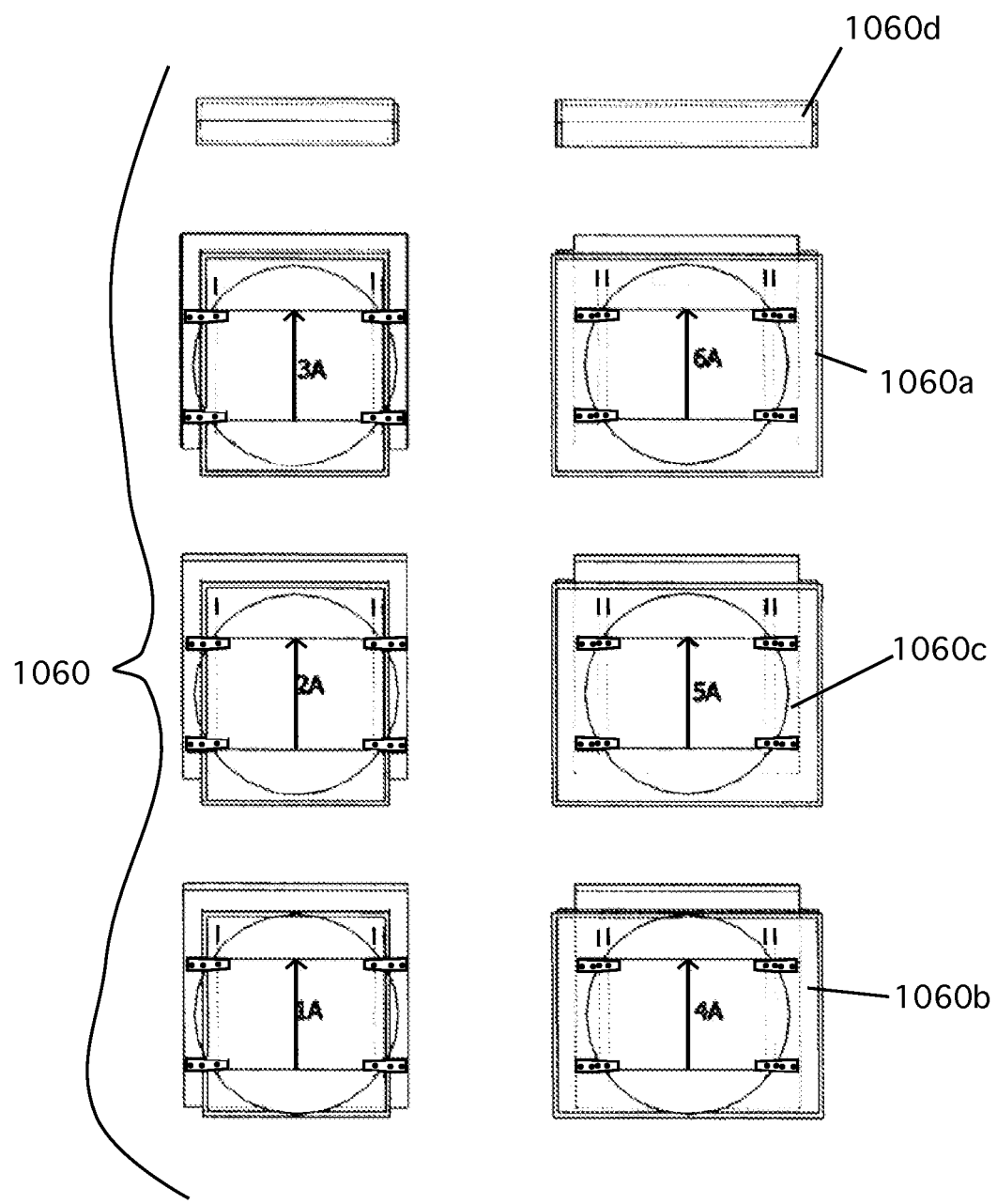

FIG. 66 is a diagrammatic view of the Ceiling Panel Assemblies (CPA).

Figure 67:
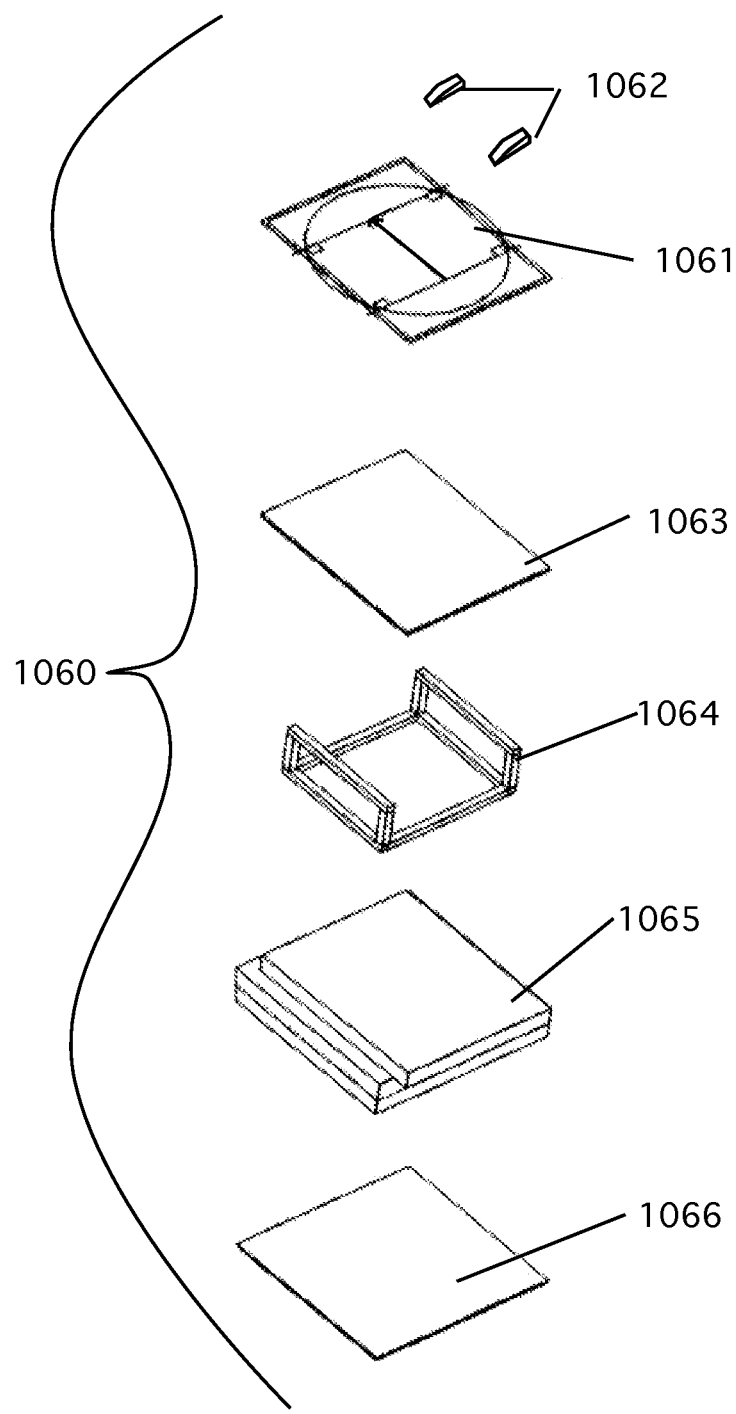

FIG. 67 is an exploded view of one of the Ceiling Panel Assemblies (CPA).

Figure 68A:
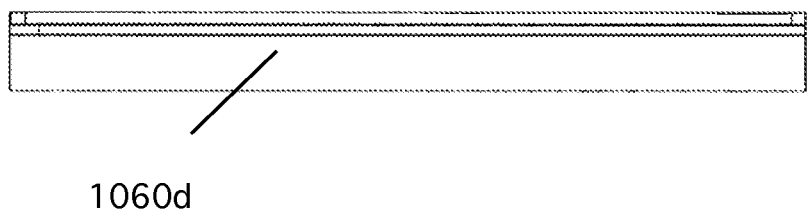

FIG. 68*a* is an end view of a wide Ceiling Panel Assembly (CPA) "4A" top piece.

Figure 68B:
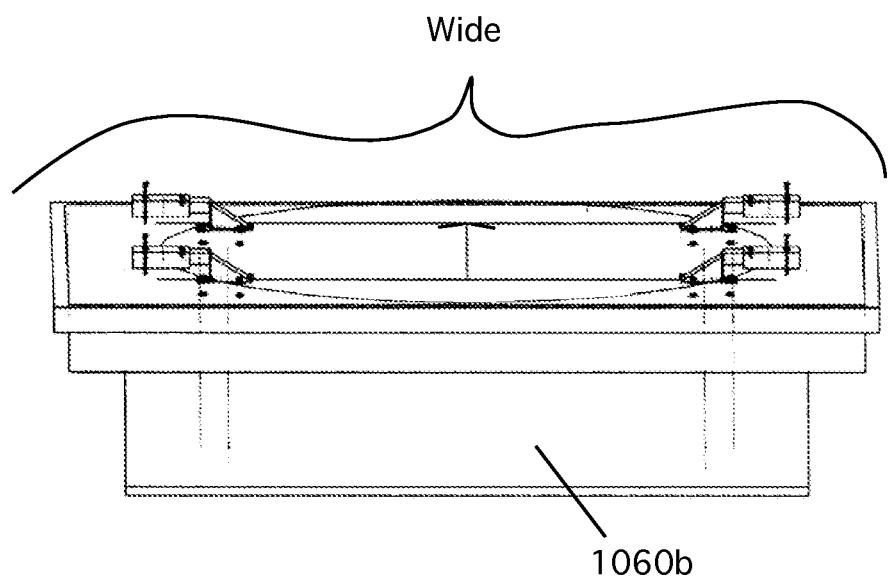

FIG. 68*b* is an end view of a wide top Ceiling Panel Assembly (CPA) "4A".

Figure 69A:
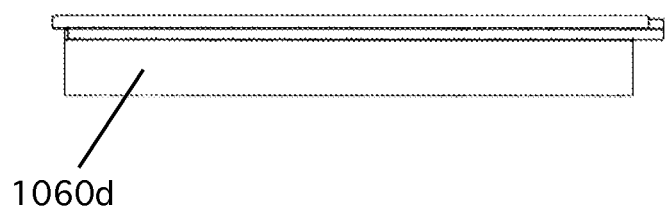

FIG. 69*a* is an end view of a narrow Ceiling Panel Assembly (CPA) "1A" top piece.

Figure 69B:
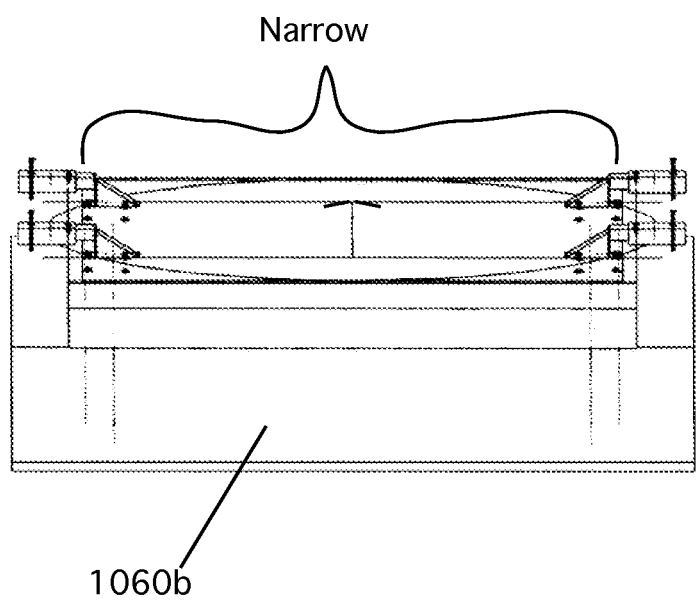

FIG. 69*b* is an end view of a narrow top Ceiling Panel Assembly (CPA) "1A".

Figure 70:
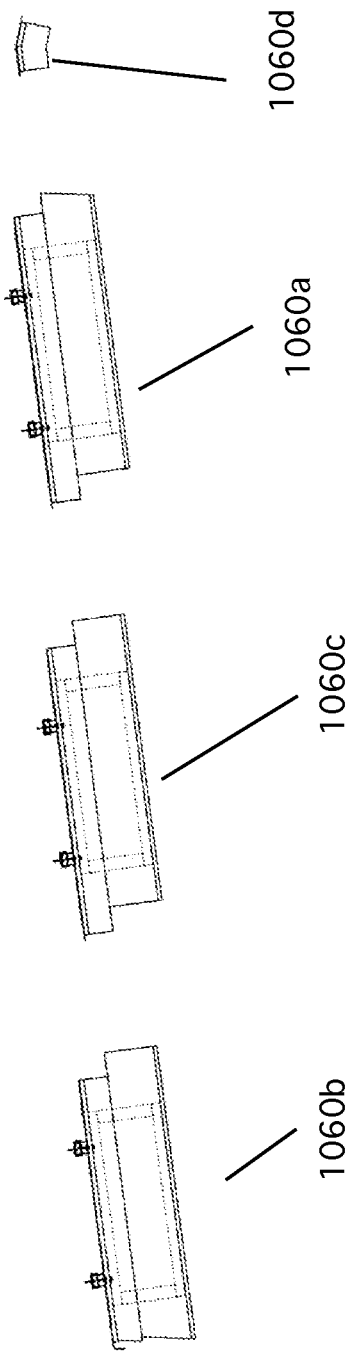

FIG. 70 is a side detail view of a set of Ceiling Panel Assemblies (CPA) with the Ceiling Cap Assembly (CCA).

Figure 71:
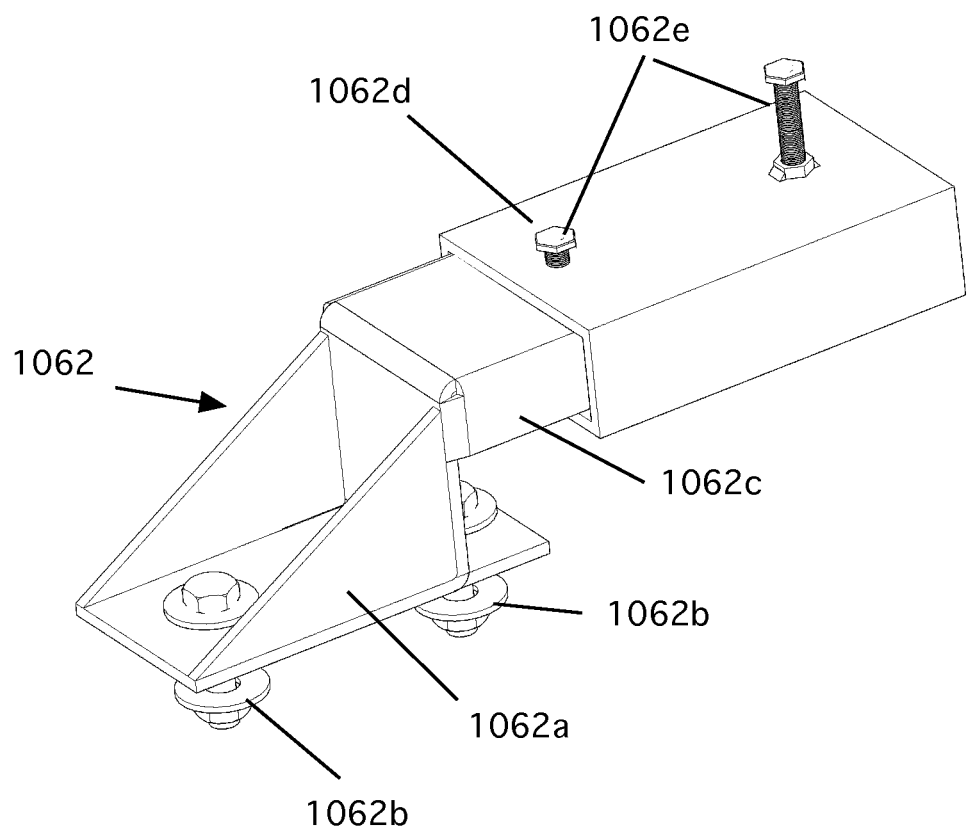

FIG. 71 is a detail view of one of the ceiling panel clamps.

DETAILED DESCRIPTION OF THE INVENTION

Figure 1:
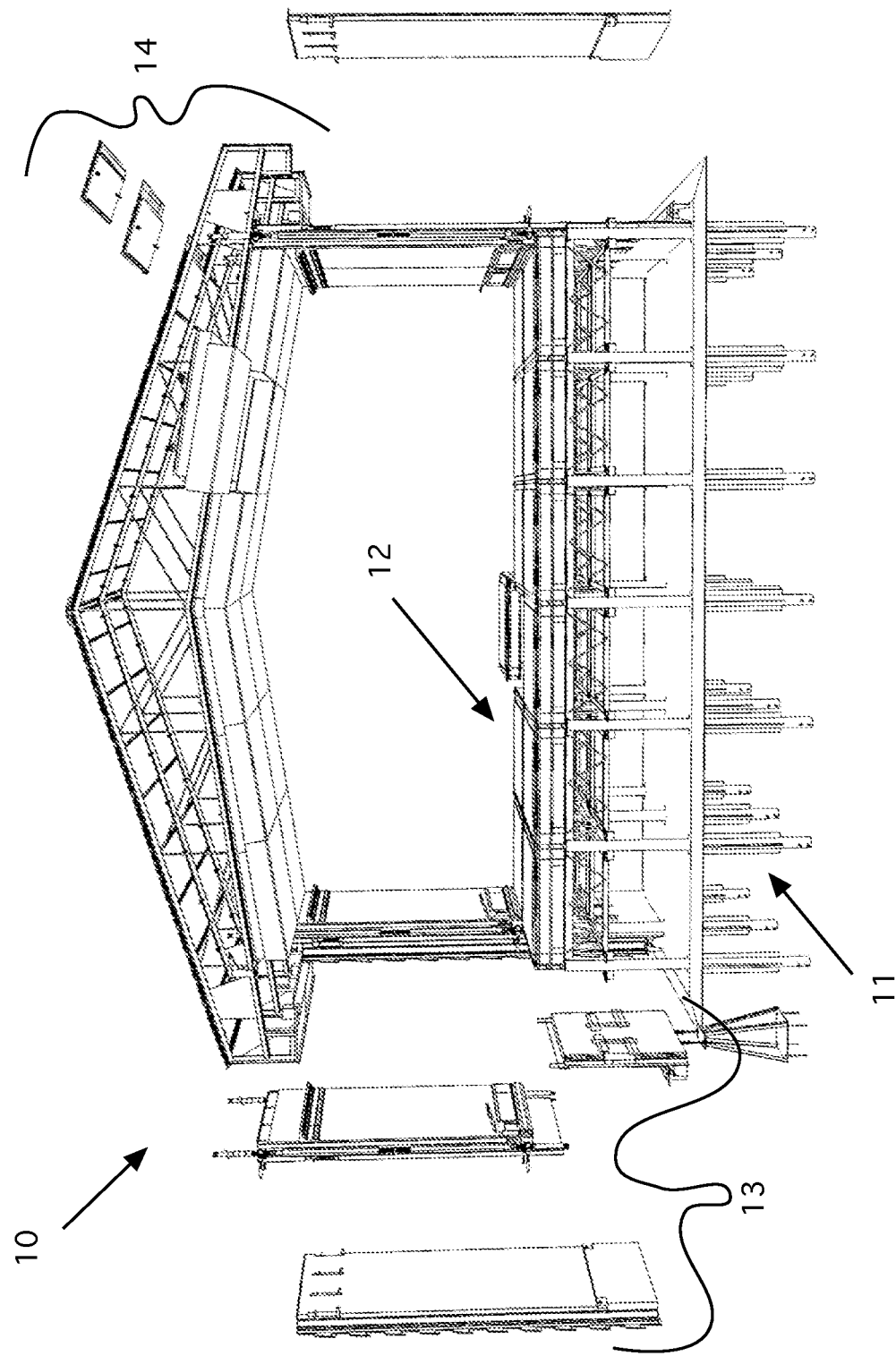
FIG. 1 is a cross-sectional detail drawing of the entire Panel Building.

FIG. 1 is a cross-sectional detail drawing of the entire structure 10. It consists of a foundation portion 11, which is disclosed in my copending application Ser. Nos. 13/561,817 and 13/531,886, which are incorporated herein by reference, and is beyond the scope of this application except for how it connects with the floors and walls, as detailed below. Above the foundation are the floor 12, the walls 13 and the roof 14. Each of these assemblies is discussed below.

The Floor

Description of the Floor Joist Assembly (FJA):

Above the foundation is a floor system, which is shown in FIGS. 2 through 13.

The floor is made up of a number of Floor Joist Assemblies (FJA) that are connected by a series of strut rings and bolts, 4'×4' square. FIG. 2 is a top perspective view of an assembled floor section 20. FIG. 3 is a bottom perspective view of an assembled floor section 20. These FIG. 3*a* show an 8' by 8' square made up of four FJA 25. Each FJA is made up of four Floor Strut Assemblies, discussed below, that are selected from struts lettered "A", "B", "C", "D", "E", "F", "G" and "H". The strut rings are different for each lettered strut so that they can be combined into blocks of four, one of which is shown in FIGS. 2 and 3. To assemble the four FJAs, as further discussed below, the connections made between them are "A to B", "C to D", "E to F" and "G to H". Thus, the four (4) Floor Joist Assemblies (FJAs) 25 are arranged as "ACED", "AHBG", "FCED" and "FHEG". Note that this figure also shows the abutting alignments with adjacent FJA's FIGS. 4 and 5 are top perspective exploded views showing the floor assembly 20 of FIGS. 2 and 3.

At the top of the assembly, a machine shoulder bolt 23 is shown. This bolt is used to connect the FJA to the foundation caps as discussed below.

The first major part of the floor assembly 20 is the finished floor 21. Each section of finished flooring 21 is 3'-6" square. Wood flooring is preferably ¾" thick although other configurations and materials can be used based on preferences. The finished flooring may be nailed, screwed or glued to the sub flooring 22 that is placed under the finished floor as shown. Note that filler strips 21*a*, 21*b* 21*c*, 21*d*, 22*a*, 22*b*, 22*c*, and 22*d* are used as needed to fill the gaps at the four-foot dimensions of the FJA and the 3'6" size of the finished flooring 21 and sub floor pieces 22. In the preferred embodiment, the subflooring 22, is pressure treated ¾" plywood or OSB with an intumescent paint and mold block. Subflooring is screwed and/or glued to the top of the sheet vapor retarder 24. In the preferred embodiment, the subflooring is placed on the FJA 25 and sized to fit in the center of the perimeter joists which is ¾" in from the edge.

The sheet vapor retarder 24 and tape 24*a* are glued to the top of the wood joists below (see FIG. 5). In the preferred embodiment, the sheet vapor retarder meets ASTM E 96-Standard Test Methods for Water Vapor Transmission of Materials. The material has a permeance of 1 perm or less when tested to ASTM E 86. The fire hazard classification meets ASTM E 84, which has a maximum flame spread index; 20 and a maximum smoke developed index of 55.

Under the sub flooring are four assembled FJAs 25. As discussed above, this assembly consists of four FJA 25 that are attached and bolted, as discussed below. As noted, the finished floor sub floor and vapor retarder are glued and screwed to the FJAs using standard techniques. The FJAs 25 are discussed in greater detail below.

Beneath the FJAs is a galvanized sheet metal under-floor protection 27 with adhesive backed rubberized asphalt flashing, joints 27*a* are glued to the bottom of the sheet metal. In the preferred embodiment, the sheet metal is 22 GA. (0.034 thick or similar) galvanized sheet metal sheets, one per 4'×4' FJA. The rubberized asphalt flashing tape is similar to Window Flashing, which has a flexible, rubberized asphalt backed, self-adhering 20-mil membrane or similar. The joints are 4" wide by 4' strips. There are 2 to 4 strips per FJA.

Between the joists of the FJAs are blocks of spray foam insulation 26. This foam has an R6 per inch minimum insulation value or similar and fills each joist cavity (i.e., 3-places in each FJA.

FIG. 6-13 show details of the FJAs 25. FIG. 6 is a top perspective view of a floor joist assembly 25. Each FJA 25 is made up of four Floor Strut Composites (FSCs) 30. A representative floor strut 30 is shown in FIGS. 7 and 8. There are two joists 31 that are installed in each FJA 25. Wood joists are pressure treated and painted with an intumescent coating/ mold blocking, and the center joists 31 are secured with optional galvanized joist hangers 32 and screws. FIG. 7 is a front perspective view of one of the Floor Strut Composites (FSCs) assemblies. FIG. 8 is a rear perspective view of one of the Floor Strut Composite (FSCs) assemblies. Each Floor Strut Composite (FSC) 30, in the preferred embodiment, is made of Douglas fir (or structural designed wood species). Each is also labeled with a letter from the list: "A", "B", "C", "D", "E", "F", "G" and "H". As noted above, these labeled struts are used to make up a FJA. For example, the strut in FIG. 6 is a, "ACED" FJA. The differentiation is made up by the placement of the strut rings 33. As shown in FIG. 8, the strut rings, 33 that are part of a structural steel plate system. The steel plate system is made using ASTM-A36 Steel, and is galvanized per industry standards. In addition to the 16 strut rings 33, there are, there are 8 corner brackets 34, 16 leg brackets 37, 4 steel plates 35 and 8 strut flat bars 36 for each FJA. The steel pieces and joists are connected by welding, screws and/or adhesives and can be routed into the floor struts to make a flush surface as necessary.

FIG. 9 is a side view of two assembled FJAs. The FJAs are connected by the machine shoulder bolts 23 that are passed through the strut rings 33. This is why the different letter codes are used on the FJAs-so that the strut rings overlap and interlock when the FJAs are properly aligned. Note that FIG. 9 shows that, when connected, the tops and bottoms of the interlocked FJAs are flush and even.

FIG. 10 is an inner detail view of the alignment for assembly of floor frames A to B and E to F. FIG. 11 is an outer detail view of the alignment for assembly of floor frames A to B and E to F. FIG. 12 is an inner detail view of the alignment for assembly of floor frames C to D and G to H. FIG. 13 is an outer detail view of the alignment for assembly of floor frames C to D and G to H. These figures illustrate how the strut rings 33 align for the different floor struts 30.

The Walls

Description of the Smart Wall Panel (SWP) System:

The second part of the building is the walls 13 (see FIG. 1). The walls are shown in FIGS. 14 through 37. Referring now to FIGS. 14-18, A 4'-0" wide smart wall panel (SWP) 100 consists of a three components;

1) A stationary structural wall (SSW) 110, delivered assembled;

2) A Removable Facade Wall (RFW) 120, delivered assembled; and

3) A crawlspace insulation assembly (CIA) 130 that is assembled on site.

A Smart Wall Panel (SWP) with opening consists of two components

4) A Stationary Structural Wall Opening (door) assembly (SSWD); delivered assembled;

5) A Removable Façade Wall Opening (door) assembly (RFWD) delivered assembled,

The panels with openings replace an equal number of (SWPs). All opening assemblies are installed in the same manner as typical Smart Wall Panel (SWP)

FIG. 14 is a partially exploded front perspective view of a pair of Smart Wall Panels (SWPs). Installed on the foundation 11 and floor 12 (see FIG. 1). The SSW attaches to the floor and foundation as discussed below. The Removable Façade Wall (RFW) attaches to the face of the Stationary Structural Wall (SSW) and is above and in front of the Crawlspace Insulation Assembly (CIA) and is adjacent to the foundation, also as described below.

FIG. 15 is a partially exploded rear perspective view of a wall section. In this view the back faces of the RFW 120 and SSW 110 are shown as well as their relation to the foundation and floor. FIG. 16 is a front view of a wall section. In this view, the RFW 120 is shown. The lower portion of the CIA 130 and the upper portion of the SSW 110 are also shown. At the bottom of the figure the posts used as part of the foundation 11 are also shown. FIG. 17 is a side view of a wall section and FIG. 18 is a top view of a wall section. These views also show the relationship of the floor 12, foundation 11 SSW, 110, RFW 120 and CIA 130.

As noted above, both the SSW 110 and RFW 120 are each preassembled off site. The CIA 130 is assembled on site. Each of these assemblies is made up of a number of components.

FIG. 19 is an exploded view of an entire SWP 100. FIG. 19*a* is an exploded view of the outer RFW 120. FIG. 19*b* is an exploded view of the SSW 110 and CIA 130.

Description of the Removable Facade Wall (RFW):

Beginning with FIG. 19*a*, details of the RFW 120 are shown in the following figures:

FIG. 20*a* is perspective view of the removable Façade Wall top Flashing (FWF) 1201. FIG. 20*b* is side view of the removable Façade Wall top Flashing (FWF) 1201. The top flashing has a drip lip 1202 and is sealed around all openings with sealant or rubber seals (not shown). The removable wall top flashing 1201 is placed on top of the Removable Wall Façade (RWF).

FIG. 21 is a front view of the removable wall Hurricane Exterior Siding (HES) 1205. FIG. 22 is a top view of the removable wall Hurricane Exterior Siding (HES). The Hurricane Exterior Siding (HES) is provided with a number of mastic strips 1207 and self-tapping screws 1206 (see FIG. 22) that are screwed into a steel Hurricane Protection Plate (HPP) (composite material Aluminum and Kevlar or similar) (see FIG. 23*a*, *b* and *c*). The removable wall Hurricane Exterior Siding (HES) 1205 can be made of wood, vinyl, clad masonry, and other finishes as desired.

FIG. 23*a* is a front exploded view of the Hurricane Protection Plate (HPP) 1210, seals 1211 and 1212 for the Removable Facade Wall (RFW). The Hurricane Protection Plate (HPP) is a composite plate of 4MM (or 3/16" galvanized steel) with exterior side bituminous coating optional.

FIG. 23*b* is an exploded top view of the Hurricane Protection Plate (HPP) 1210, seals 1211 and 1212 for the removable facade wall. Note that Hurricane Protection Plate (HPP) has Z & L or similar configuration angles 1210*a*, as shown, into which the Weather Seal Blocks (WSB) 1211 are placed.

FIG. 23*c* is a detail view of one of the Weather Seal Blocks (WSB) 1211 showing the rubber seals 1211*a* with foam inserts 1211*b* of the seals (or other waterstop type seals).

FIG. 24*a* is a detail view of the steel studs 1215 and wooden blocking 1216 and rigid insulation filler 1220 and 1220*a* tape and 1220*b* seal that form part of the Removable Facade Wall (RFW). The steel studs are 400s125 33 (0.329) 20 gauge Steel Studs (or structurally sized). The steel studs and associated top and bottom tracks are screwed to the Hurricane Protection Plate (HPP). The wooden blocking is 2×4 stock. The rigid insulation filler (with ringlet for seal) is 2"×2" with tape and adhesive.

FIG. 24*b* is a detail view of the spray foam insulation 1221 that is used with the steel studs 1215 and wooden blocking 1216 that form part of the removable facade wall. Note filler insulation 2"×2" 1220 is used between wall panels to fill the gap between assemblies and adhered and/or taped 1220*a* to the steel studs 1215. The spray foam 1221 is 4" thick, R-6.5/inch at R-26 (or similar) in steel stud cavities (3-places).

FIG. 25*a* is a rear view of the treated plywood 1230 with wall locking system as part of the Removable Facade Wall (RFW). FIG. 25*b* is a rear perspective view of the plywood. In the preferred embodiment, the plywood is ½" treated plywood or OSB with intumescent/mold block coating. It is used to support four steel galvanized plates 1231 that are part of a wall locking system using Wedge Locking Clamps (WLC) 1232. Near the base of the plywood is an angle shelf 1233 used in the assembly of the removable facade wall. The plates 1231 are screwed and/or glued plates to the plywood.

FIG. 25c is a top view of the treated plywood with wall locking system as part of the Removable Facade Wall (RFW). Here, the plywood 1230, the Wedge Locking Clamps (WLC) 1232, and the angle shelf 1233 are shown.

FIG. 25d is an upper perspective detail view of Wedge Locking Clamp 1232 (WLC) and terminal brush (1232a) contact for 120 or 24 V. wiring.

FIG. 25e is a lower perspective view of the treated plywood 1230 and angle shelf 1233. In this view, the plates 1231 are shown. Note that a threaded stud 1234, washer 1235 and nut 1236 are shown. These components are used in the assembly of the Removable Facade Wall (RFW) to the building as discussed below.

FIG. 26a is a perspective view of the (molded, routed or cutout) rigid insulation 1240 that is part of the Removable Facade Wall (RFW). FIG. 26b is a front view of the rigid insulation. This insulation is extruded Polystyrene insulation or Poly Iso (rigid insulation) 2" Tk. R-6.5/inch at R-13 (or similar) with all joints taped 1237 to the opposite side (not shown) of locking system.

Finally, a continuous backed backer rod 1260 (see FIG. 19a) is glued to the interior insulation between the SSW and RFW (next to the wall bracing straps 1110) sealing the air space between.

Description of the Crawlspace Insulation Assembly (CIA):

The SSW is discussed below. The next assembly is the Crawlspace Insulation Assembly (CIA) shown in FIGS. 27a and 27b.

FIG. 27a is a side view of the Crawlspace Insulation Assembly (CIA). FIG. 27b is a perspective view of the Crawlspace Insulation Assembly (CIA) 130. As shown in FIG. 27b, this assembly consists of several parts. First there is a Flashing with Drip Edge (FDE) 1301 made of copper or galvanized metal of 24 gauge with 7.5"×16" legs (or similar). Next are two pieces of butyl sealant 1302 for flashing placed at the ends. Then a shorter piece of flashing 1303 also made of copper or galvanized metal of 24 gauge with 7.5"×16" legs (or similar). Next are the concrete bond beam 1304 that are blocks 8"×8"×16" with epoxy grout and #5 galvanized rebar 1305 installed (see also FIG. 27b). The rebar is slid into adjacent block slots, which are filled with foam insulation. The blocks are set on compacted fill as part of the Crawlspace Insulation Assembly, discussed below.

Next is a pad of 4" thick rigid insulation 1306 48"×48" (+/−), cut to fit column clip angles and tape 1310. The insulation is fit snug to crawlspace exterior wall (see FIG. 27b). Holes 1307 and hatches 1308 are cut into the panel to provide access to the studs 1234 on the bottom angle 1233 of the wedge locking clamp panel 1230 when securing the removable panel to the structural wall, as discussed below. Once the washer 1235 and nut 1236 is tightened on the lug, the insulation 1308 is placed to cover the holes 1307 and taped 1309.

Description of the Stationary Structural Wall (SSW):

Referring now to FIG. 19b, details of the Stationary Structural Wall (SSW) 110 are shown.

Beginning at the outermost surface of the SSW, FIGS. 28a and 28b show the steel top protection plate 1101 for the stationary structural wall. The SSW Protection Plate (SPP) is a galvanized steel bent plate (or composite material) that covers the top of the SSW. See, e.g., FIGS. 14, 15 and 17. A number of rings 1102 are provided for the emergency release system, (discussed below).

Next are the Cross Bracing Straps (CBS) 1110 that are be galvanized and fit onto extended bolts from the Bolting Clamp Struts (BCS), (see below). These straps are shown in FIG. 29.

FIGS. 30a and 30b show the interior rigid insulation 1120 as part of the Stationary Structural Wall (SSW). The insulation is rigid board insulation and is installed with cut out areas 1121 for the Wedge Locking Clamps (WLC) and steel bars in the structural wall (see below). All joints of the insulation are weather proof taped on the interior side next to the plywood (forming a weather barrier, not shown on back side) (note extruded polystyrene insulation may be substituted). In the preferred embodiment this insulation is 2" thick, R-6.5/inch for a total value of R-13.

FIGS. 31a and 31b show the one-half inch plywood panel 1130 with solenoid operated spring locking system 1131 as part of the stationary structural wall. This panel is treated plywood with intumescent/mold block coating that supports four steel galvanized plates 1132 that are part of the wedge locking clamp system (discussed below). The plates 1132 are to be attached to the plywood. Note: the two outside-end plates have bottom Gravity Locking Cams (GLCs) 1133 (see FIGS. 31a, 32a and 32b) Note: the structural and removable wall panels each have steel fabricated wedge locking clamps welded to steel plates. FIGS. 25c and 25d (male end) show the clamps for the removable wall. These Wedge Locking Clamps (WLC) 1131 (see FIGS. 31c and 31d female end) automatically lock the two wall panels in place as the removable wall is tilted up into a vertical position. One Wedge Locking Clamp (WLC) 1131 is a receiver (on the structural wall) and the mating end (on the removable wall) inserts and locks into it by electrical, hydraulic or mechanical activation (a security access control pad (switch) located in the raceway of the structural wall (discussed below) unlocks the wedge by solenoid). An emergency mechanical unlocking system is located at the top of the structural frame through the SSW Protection Plate (SPP) 1011. The SSW Protection Plate (SPP) has a set of emergency pull rings 1121 above it to open the solenoid, which is normally closed by a spring. Locking lugs or rings are also fabricated next to the emergency pull rings. FIG. 31d is an enlarged detail view of a solenoid 1134, operated spring lock 1131a, machined wedge plunger 1135 and wedge locking clamps body 1136 as part of the Wedge Locking Clamp (WLC) system.

FIGS. 32a and 32b are detail views of the bottom Gravity Locking Cams (GLC) 1133. The Gravity Locking Cams (GLC) fit into predrilled holes in the steel tube column's top cap (see below) that automatically locks when the panel is lowered into place.

FIGS. 33a and 33b are views of a Wall Tie Rod (WTR) assembly 1140 as part of the Stationary Structural Wall (SSW). The Wall Tie Rods (WTR) 1140 are 1½" dia. threaded steel bar or tube that have Exterior Machined Shoulder Bolts (ESB) 1141 (see FIG. 33f) used to connect the FJA to the exterior foundation caps. Steel Extension Rods (SER) 1144 (see FIG. 33e) and Threaded Rod Turnbuckles (TRT) 1142 (see FIG. 33g) are used to connect to the Structural Wood Frames (see below) to the structure. The Roof Truss Cams (RTC) 1143 (see FIGS. 33c and 33d) are used to connect the Roof Truss Assembly (RTA) to the walls, as discussed below.

The next component is the wall stud frame assembly 1150. This component is the main structural body of the wall. The wall stud frame assembly is shown in FIGS. 34a-f.

FIG. 34a is a rear perspective view of a section of a wall stud frame assembly with the bolting clamp-strut assemblies 1151 installed as part of the stationary structural wall. FIG. 34b is a front perspective view of a section of a wall stud assembly with bolting clamp-strut assemblies installed also including an exploded view of ridged insulation 1160 that is glued/taped into the frame structure, and spray foam insulation 1153, as part of the Stationary Structural Wall (SSW). The Structural Wood Frames (SWF) 1150 are pressure treated and painted with an intumescent/mold blocking coating, all studs are secured with top and bottom plate galvanized ties. Double & triple (alternating) top plates and double & triple (alternating) bottom plates each with the bolting clamp-struts" 1151 routed between the plates. Note: every other structural wood frame top plates and bottom plates (alternating) shall have clamp-struts placed 1½" towards the center (up & down) with a third top plate (see, e.g., FIG. 34*c-d*). Sheet metal Electrical Galvanized Raceways (EGR) 1152 and galvanized cover plate 1152*a* are placed above the bottom plates, and can be added to walls, ceilings and through floors (not shown). All electrical devices are backed with waterproof liners or vapor proof boxes and gaskets.

The insulation 1153 (see FIG. 34*b*) is spray foam insulation closed cell R6.5/inch (or similar) used to fill each stud cavity (3-places between wood studs) and rigid insulation filler 2"×2" 1160 taped and/or glued onto the stud.

FIG. 34*c* is a detail view of one of the upper bolting clamp-strut assemblies on the wall stud frame assembly. Each of the assemblies 1151 has two bolts (right and left sides) 1151*a* and nuts 1151*b* that are passed through clamp blocks 1151*c* and rings 1151*d*. The use of these clamps is described in the assembly section below.

FIG. 34*d* is a detail view of one of the lower bolting clamp-strut assemblies on the wall stud frame assembly. Here, the clamp 1151 is shown with the electrical box 1152. This figure also shows a cover 1152*a* for the box 1152.

FIG. 34*e* is a top view of the wall stud frame assembly. FIG. 34*f* is a cross-sectional view of wall stud frame assembly taken along the lines 34*f*-34*f* of FIG. 34*a*.

FIG. 35*a* is a front perspective view of the finishing assembly 1170 of the stationary structural wall. FIG. 35*b* is a rear perspective view of the finishing assembly of the Stationary Structural Wall (SSW). The components for this assembly (from left to right) are: Crown Mold Trim (CMT) 1171 and Wall Base Trim (WBT) 1172, which are selected by the end user with configurations and materials applicable to the user's requests. The trim may be nailed, screwed, glued or have optional slide on and lock configuration (bolt and hole) for replacement. Baseboard hatches 1172*a* (see FIGS. 35*c* and 35*d*) are used for electrical box/raceway access. Baseboard hatches have spring hinges with a hold open/close feature. The base and crown are secured to ⅝" Drywall 1173 (fire rated drywall per building code) or VCG, field-finish as specified, optional materials available. Next, a Vapor Retarder and Tape (VRT) 1174 is "taped" in place to seal all openings, electrical boxes, etc. Openings are to be sealed per industry standards. Next is a ¼" treated plywood panel 1175 with intumescent/mold block coating on both sides, which is screwed and glued to stud frame 1150.

Description of the Corner Walls (SSWC and RFWC):

All of the wall sections have this same construction. There are two exceptions. The first is at the corners. A special wall assembly is shown in shown in FIGS. 36 and 37.

FIG. 36 is an exploded perspective view of a corner section of a wall unit.

FIG. 37 is an exploded top view of a corners assembly.

Inside and outside corner have removable façade corners 1180 are made of the components described above and are modified by cutting the structural wall and extending the façade items. The cut and extension are made at a 45-degree line starting from the center of the Wall Tie Rod (WTR). FIG. 37 shows these cuts (e.g., 1182). Rubber seals 1183 are set in the cuts made in each of the insulation panels. Depending on location requirements two seals may be used instead of one per insulation panel. An added "L" siding Corner Trim Board (CTB) 1181 with sealant is placed at each exterior corner.

The second special type of wall unit is a wall-opening unit. Openings can be added to the building using specially modified wall units called Wall Opening Assemblies (WOA). A door (opening) (WOAD) assembly is shown in FIGS. 38 through 49.

Description of the Wall Opening Assembly (WOA):

Referring now to FIG. 38, details of the Wall Opening Assembly (WOA) 1190 are shown.

Beginning at the outermost surface of the WOA, FIG. 38 shows the front perspective and FIG. 29 shows the back or inside door, and FIG. 40 shows the front view of the Wall Opening Assembly Door (WOAD) 1190.

FIG. 41 is an exploded front perspective view of a Wall Opening Assembly Door (WOAD). The assembly components have the same materials and overall dimensions of a typical structural wall and facade wall except that a framed opening surrounds a hole with flashing and trim that finishes the opening. The Structural Wall Door (SWD) 1191 and The Façade Wall Door (FWD) 1193 is shown with the Crawlspace Insulation Assembly (CIA) 130 that has not changed for this application.

FIG. 42 shows a perspective of the Wall Opening Assembly Door (WOAD) 1190, a modified Smart Wall Panel (SWP) for a door opening. The structural wall 1191 and the façade wall 1193 are reconfigured with an opening cut in them to accommodate a door in this case but a window, etc. could also be completed with this embodiment.

Description of the Façade Wall Door (FWD):

The outermost façade wall in FIG. 42*a* shows an opening displayed in each of the following materials for the door: Exterior siding 1193*h*, protection plate 1193*k*, spray foam insulation 1193*p*, Steel studs have a framed opening in accordance with the Steel Stud Manufactures Association (SSMA) recommendations 1193*t* with wood blocking 1191*r* and wood frame 1191*s*, treated plywood 1193*w*, blocking 1193*z*, rigid insulation header 1193*x* and rigid insulation bottom 1193*y* bottom and 1193*u* middle.

The following changes are made to the façade assembly beyond cutting the opening: A steel or plywood plate 1193*i* is attached to steel studs 1193*m* below the opening and lag bolts 1193*q* installed to accommodate a stair assembly (stair assembly not drawn).

The following components are added new to the door facade: two door jambs 1"×2" wood trim 1193*a* and head wood trim 1193*b*, a 9"×¾" wood jamb finish casing 1193*c* and head 9"×¾" finish casing 1193*d*, with tongue at one end, a rubber mat adhesive backed with side tabs glued to framing and drip edge at the front that extends over the siding 1193*e*, a metal header Flashing with Drip Edge (FDE3) 3 sides up/dammed 1193*f* and a surround rubber weather barrier adhesive backed 8" wide 1193*g*.

The following components do not change for the door façade: flashing 1201, seals 1211 and seal 1212.

Description of Structural Wall Door (SWD):

The inner structural wall in FIG. 42*b* shows an opening displayed in a typical Stationary Structural Wall (SSW) materials for the door showing an exploded view of a Structural Wall Door (SWD): rigid wall insulation 1191*f* top, treated plywood with locking system 1191*g* with attached 2×4 T&B blocking 1191*jj* and attached rigid insulation 1911*gg*, structural wood stud wall assembly 1191*h*, spray foam insulation 1191*m*, plywood stiffener 1191*n*, vapor retarder with tape 1191*p*, typical finish material (drywall) 1191*r*, and two wall base trims flanking the opening. 1191*u*.

The following changes are made to the wall structural opening beyond cutting the opening: the structural frame wall 1191J rerouted the Electrical Galvanize Raceway (EGR) 1191*h* around the doorframe, which connects to the adjacent raceways when installed. The Bolting Clamp Struts (BCS) (top and bottom) 1191*i* have the centers cut out for the opening and are secured to the shorter plates. The center two wall plates and locking system on 1191*j* are removed and replaced with a horizontal bar between the remaining two (outer) locking system bars, the outer two locking system bars 1191*k* are shortened because of the opening and positioned ⅝" higher than the header opening cut on the treated plywood.

The following new components are added to the door facade: Finish jamb entry trim at two places 3"×¾"1191*a* and head 1191*b* with grooves for (T&G) slot, which may be routed to add rubber seal 1191*c* into groove (not drawn), door interior wall rubber weather barrier adhesive backed 1191*d* with back tabs adhered to steel door frame and with peel and stick front tabs, lap applied, on site, over the removable wall assembly, door entry threshold with weather seal and set in sealant 1191*v*, hurricane resistant door frame with frame insulation infill and bitumen coating to manufacturing recommendation for frame reinforcing 1191*x*, hurricane resistant door (size 3'-0"×7'-0" max. wider doors to incorporate two 4'-0"panels for an 8'-0" width), insulated, mfg., recommendations for hardware and glass 1191*y*.

The following component does not change for the door façade: backer rod seal 1260, top protection plate 1101, cornice trim 1171 and Wall Tie Rods (WTRs) 1143, FIG. 43 is a side cross-sectional view of the door assembly taken along the lines 54-54 of FIG. 40.

FIG. 44 is an enlarged detail of the lower portion of the sectional view shown in FIG. 43. The adhesive backed rubber mat 1193*e* is shown with adhesive backed tabs behind the finish trim 1193*c* and adhered to the wood frame blocking 1193*s*. The two walls are joined with tongue and groove trim 1193*c* and 1191*a* with an optional rubber seal 1191*c* (not shown) located in the T&G slot. The removable walls 4" 400s125 33 (0.329) 20 gauge steel studs and associated tracks (structural) with wood stud blocking, side rigid insulation and stair plywood support (all at) 1193*p* the plywood supports 1193*i* (not shown), lag bots 1193*q* (shown) for stair, stoop or porch attachment (not shown). The wall hurricane protection plate with opening 1193*k* is located in front of the steel studs and behind the finish material (siding). The following items are attached behind the steel studs: treated plywood 1193*w*, rigid insulation 1193*u* middle and rigid insulation bottom 1193*y* (not shown), and seal backer rod space 1260. Attached to the structural wall's treated plywood is 2×4 blocking placed vertically 1911*gg*. At the interior door is the wall base trim's 1191*u* and threshold set in sealant 1191*v* and door 1191*y* with doorframe 1191*x* as described above as part of new materials for the structural wall.

FIG. 45 is an enlarged detail of the upper portion of the sectional view shown in FIG. 43. The wall section shows the revised finish head trim 1193*d* and 1191*b* with tongue and groove joint and jamb trim 1193*c* and 1191*a* beyond with an optional rubber seal 1191*c* (not drawn). The section is capped by Flashing with Drip Edge and dams on 3 sides and head trim 1193*f* (FDE3) attached though the siding to blocking 1193*s*, the Exterior siding is 1193*h* and finish head trim 1193*b*. Flashing continues with 1201, and protection plate 1101. The protection plate is as describe in FIG. 44 with the following materials; steel stud assembly 1193*t*, wood blocking frame 1191*s*, blocking 1193*r*, spray foam insulation 1193*p*, seal 1212 (not shown) and seals 1211 (not shown—beyond). In front of the steel stud assembly is the protection plate 1193*k*; behind the steel stud assembly is treated plywood 1193*w*, blocking 1193*z*, the rigid insulation 1193*x*. The structural wall is anchored by the wood frame assembly 1191*j*, which includes a bolting strut 1151 (note the bolting strut is located in the alternating top position) and spray foam insulation 1191*m*. Treated plywood with locking system 1191*g* is attached to 1191*j* and the emergency solenoid release 1121 and Wall Tie Rod (WTR) 1143 are shown beyond. Also shown are the finish material (drywall) 1191*r*, vapor retarder 1191*p*, treated plywood 1191*n*, and the Electrical Galvanized Raceway (EGR) 1191*h*, which also continues along the jambs and connects to the adjacent Smart Wall Panel (SWP). The cornice 1171 is shown with box header filled with insulation 1191*h*, a vertical 2×4 nailer 1191*jj* is routed into the steel bar that is welded to the wedge locking clamps bars 1132 (partially hidden), and rigid wall insulation 1191*f* top. The door 1191*y* and doorframe 1191*x* are discussed above in FIG. 44.

FIG. 46 is a top view of the door assembly. This view is similar to a typical smart wall panel with the addition of the opening materials: Drywall 1191*r*, finish head trim 1193*b*, Façade Wall top Flashing (FWF) 1201 and steel top protection plate 1101.

FIG. 47 is a top detail view of the lower portion showing a portion of the threshold. This detail shows the construction as described in FIG. 44 and FIG. 45 with the structural wall and façade wall assembled. Here the Bolting Clamp Struts (BCS) 1191*i* show the plate bent up 1191*ii*, which attaches between the king and jack stud, which are part of the wood frame 1191*j*. Also the Electrical Galvanized Raceway (EGR) is shown connected to a 1" dia. Conduit 1191*h* which travels along the king stud down to the bottom sill plates where it connect into a rectangular 6"×1.5"raceway and will adjoin to the adjacent smart panel Electrical Galvanized Raceway (EGR) 1152 wall when installed.

FIG. 48 is a perspective view of the outer side of the doorframe. This view shows the Electrical Galvanized Raceway (EGR) 1191*h* constructed around the opening, all joints are fire caulked and sealed. The bolting clamp strut 1191*i*, which is shortened due to the frame opening, has the steel strut plate cut and bent up 1191*ii* along and secured to the king stud as described in FIG. 47. (Note both the primary and alternate positions for the assembly are shown. The assembly is shipped with a steel bar spacer at the bottom of the assembly. The inner side materials are the same as the inner view in FIG. 49.

FIG. 49 is a perspective view of the inner side of the doorframe.

The Roof

The final system of the building is the roof. The roof system is shown on FIGS. 50-71 and is described as follows:

FIG. 50 is an exploded view of the entire roof system.

Description of the Roof Assembly Materials (RAM):

The heart of the roof system is the Roof Truss Assembly (RTA) 1000. Atop the RTAs are the roof ridge vent (RRV) 1020 and Removable Roof Panels (RRP) 1030. A fascia panel assembly (FPA) 1040 and a soffit panel assembly (SPA) 1050 complete the outer structure of the roof. Inside, the roof is finished with a number of ceiling panel assemblies (CPA) 1060. Each of these components is shown in the figures and described in detail below. Note that the roof system is designed, in the preferred embodiment, to be 4'-0" wide. Each of the roof system components, i.e. RTAs the RRV, the RRPs, the FPAs, the SPAs, and the CPAs, are delivered to the site assembled as subassemblies.

Description of the Roof Truss Assembly (RTA):

The Roof Truss Assembly (RTA) 1000 is shown in FIGS. 51-53 and is comprised of truss made up of a pair of galvanized steel angles 1000l*a* and 1001*b* (see FIGS. 52 and 53) (all steel structural sized to accommodate loads and may be other than angles) that are welded back to back to a web member bar 1003. A galvanized gusset plate 1002 is located at the ends of the truss and is positioned to lie above the stationary structural walls. Roof Cross Bracing (RCB) bars 1009 are formed of galvanized steel bars (structurally sized) and are positioned between the gusset plates at the ends of the truss to the gusset plate. Additional cross bracing is added as structurally designed and connected to the top and bottom chords. The truss webbing 1003 is formed of a continuous or segmented galvanized steel bar or rebar web members, Two galvanized Round Anchor Tubes (RAT) 1004, to hold anchors that attach to the foundation and walls, are installed on both ends of the truss as shown. A galvanized steel Bent Setting Plate (BSP) 1005, for seating the truss on the Stationary Structural Walls (SSW), is formed on both sides of the truss as shown (see e.g., FIG. 53). Two overhanging galvanized steel angle support assemblies 1006 are formed at the ends of each truss as shown. Two fascia panel assemblies galvanized steel tab supports 1007 are formed on the ends of each truss. Finally, a number of galvanized steel square Single Stop Blocks (SSB) 1008 are welded to the top chord at spacing intervals adapted to receive Removable Roof Panels (RRP), as described below. Truss members will vary in shape per structural design i.e. angles may be steel bars.

FIG. 54-57 show details of the Removable Roof Panels (RRP) system 1030. The panels interconnect and are locked at the top into the ridge roof vent 1020, as discussed below. As shown in FIG. 54, the system 1030 consists of a top panel 1030*a*, a bottom panel 1030*b* and one or more center panel(s) 1030*c*.

Description of the Removable Roof Panel (RRP):

FIG. 55 is an exploded view of a bottom RRP 1030*b* Note all RRPs are constructed in the same manner. Each RRP is comprised of a finish material 1031 such as asphalt shingles (three layers shown here or other finish material), an adhesive backed weather barrier 1032, an optional Hurricane Protection Plate of (¼" galvanized steel plate or 4MM composite panel of aluminum and Kevlar) 1033 (may be omitted at construction—as determined by owner), an optional ¾ inch piece of treated plywood panel 1034 (may be omitted at construction—as determined by composite panel use and loads), treated with intumescent and mold block. Roof panel support angles 1035, galvanized and structural (covered at the top with a strip of adhesive backed rubber weather barrier), sized for live and dead loads and are attached at the top and bottom of each panel (e.g., see, FIGS. 56 and 57). Two horizontal quick release hold down clamps 1036 are attached at the center of the outer edges. Note that the bottom RRP has a galvanized drip edge 1007 as shown. Note: the sheet metal panel is extended from the composite material to form lap joints with adjacent panels with a minimum of one (1) inch exposed weather barrier being placed at the lap joints on the neighboring weather barrier.

Description of the Roof Ridge Vent (RRV):

FIG. 58-60 show details of the Roof Ridge Vent (RRV) 1020, with the optional snow seal 1021 and sheet metal lap joint 1024. A "C" shape top and bottom flange at both down sides giving the top Removable Roof Panel (RRP) the ability to slide into it. Standard Roof Ridge Vents (RRV) may also be used and must lap over the top of the top Removable Roof Panel (RRP) 1030*a* (not shown). Referring now to FIG. 59, the vent 1021 is attached to 6" legs×¾" high×6" leg "C" channels 1022 on both sides of the vent. The "C" channels form slots for the top RRP panels 1030*a* to fit into. The top flange of the C channels is secured to the ridge vent. The top of the ridge vent is finished using the same finishing materials for the roof—e.g., asphalt ridge shingles 1023 as shown in FIG. 60, Description of the Fascia Panel Assembly (FPA):

Referring now to FIGS. 61 and 62, the Fascia Panel Assembly (FPA) 1040 is comprised of a galvanized sheet metal flashing 1041 offset from a fascia panel of composite material 1042 by one (1) inch (see FIG. 62). Next is a ¾ inch treated plywood panel 1043 with intumescent and mold block (or fascia material). Finally, a fascia board 1044 with seal completes the assembly. Hold down clamps 1045, attached to the fascia assembly 1040 are used to hold the FPA to the outriggers, as described below. There is an option to use composite panel or treated plywood or both depending on design requirements.

Description of the Soffit Panel Assembly (SPA):

FIGS. 63-65 show details of the soffit panel assembly (SPA) 1050. The SPA is comprised of a soffit lock down assembly 1051 of sheet metal 1051*a* and wooden finish trim 1051*b*. The soffit lock down assembly 1051 is screwed to moveable finish panel 1052 that has a slot 1052*a* for air flow venting, the slot has a screen 1050*b* placed in it that is secured with a galvanized steel bar and clips (not shown). Two boxes 1053 for electrical lighting may be placed at the sides of the vented slot∫1052*a*. Note: the moveable finish panel 1052 also has a 1" sheet metal lap joint 1054 at one end of the panel. Next, a fixed finish panel 1055 with three spring hinges 1056 that have a lock up and down feature are installed as shown. The hinges allow the moveable finish panel 1052 to move with respect to the fixed finish panel 1055 as described below.

Four horizontal quick release hold down clamps 1057 are positioned at the corners of the fixed finish panel 1055. As before, there is a one (1)" sheet metal lap joint 1058 at one end of the panel that is aligned with the lap joint sheet metal lap joint 1054 in the moveable finish panel 1052.

Description of the Ceiling Panel Assembly (CPA):

Referring now to FIGS. 66-71, the ceiling panel assembly (CPA) is shown.

FIG. 66 is a diagrammatic top view of the Ceiling Panel Assemblies (CPA) 1060 and the Ceiling Cap Assembly (CCA) 1060*d*. In the preferred embodiment, there are 6 separate CPAs for each side of the roof. Referring to FIG. 50, the roof trusses have an apex that divides the truss into a left side and a right side. In the preferred embodiment, there are 6 separate CPAs for each side of the roof, which are numbered 1-6 ("A" for one roof slop side and "B" for the other roof slope). Each CPA has topside and a bottom side as shown. Moreover, as in the case of the RRPs, the CPAs have a top section 1060*a*, a bottom section 1060*b* and one or more middle section(s) 1060*c*; the sections are segmented into narrow and wide rows. As shown in FIG. 66, there are also the Ceiling Cap Assemblies (CCA) 1060*d*, into which the top section of the CPAs is fit. These are discussed below. Each CPA is made of the same components, the only difference being the shape and size. FIG. 67 is an exploded view of one of the narrow center Ceiling Panel Assemblies (CPA) 1060*c*.

The uppermost layer of the CPA is comprised of a sheet metal ceiling panel 1061 that has four fabricated ceiling anchor clamps 1062 (or similar clamping system) attached. Details of the clamping system are shown below.

Beneath the sheet metal panel 1061 is a piece of ¾ inch perimeter strip of asphalt emulsion (or similar weather proof material). Next is the ceiling treated plywood platform 1063 with an intumescent/mold blocking coating. Beneath that is a 2"×2" wood (or similar) insulation support 1064 that is also used to hold the finish material. A pad of molded spray foam insulation or rigid insulation 1065 is configured with offsets to form lap joints with adjacent CPAs is installed in the support frame 1064. A finish, such as drywall 1066 or other finish material, is attached to the bottom of the support frame to complete the CPA.

FIGS. 68*a* and 68*b* show end views of a Ceiling Cap Assembly (CCA) 1060*d* and a CPA 1060*b*. Note that this CPA is a "wide" CPA. Note that the Ceiling Cap Assembly (CCA) is the same width for the "wide" CPAS. FIGS. 69*a* and 69*b* show a "Narrow" CPA 1060*b* and a "Narrow" Ceiling Cap Assembly (CCA) 1060*d*. Note how the clamps are positioned differently on the two CPAs narrow and wide, and are the same distance attaching to the bottom chord of the truss(s).

FIG. 70 shows a side view of three Ceiling Panel Assemblies (CPA) and a Ceiling Cap Assembly (CCA). Note how the insulation blocks are cut to fit against the ceiling cap assembly at the top. And how they are cut to overlap each other. Note also that the lowest CPA has the bottom edge of the insulation 1060*b* is cut vertical to match the walls with a notch for the drywall and protrusion to rest against the SWP insulation.

FIG. 71 is a detail of the fabricated ceiling anchor clamp 1062. The clamps have a bracket 1062*a* that has fasteners 1062*b* to attach the bracket to the sheet metal ceiling panel 1061. The bracket 1062*a* has an arm 1062*c* onto which a locking clamp sleeve 1062*d* is placed. The locking clamp sleeve is designed to slide on the arm to allow the ceiling panel to be installed, as discussed below. Two bolts 1062*e* are installed in the locking clamp sleeve, as shown. The inner bolt is used to lock the sleeve to the arm, once it is in place. The outer bolt is used to attach the ceiling panel to the lower cord of the roof truss. As shown, there are four clamps on each ceiling panel. Of course, other clamp can be used, such as the hold down clamps discussed above on other roof components.

Finally, the system can be adjusted as desired. For example, non-structural elements of each assembly (floor, wall and roof) may be omitted in fabrication if requested by the owner. This will reduce some of the cost of fabrication for items the owner doesn't want to pay for such as reducing the 12 inches of insulation to 6 inches or omitting the solenoids and access control panels are not used to unlock the exterior walls where the owner wants to only use the emergency pulls to unlock and remove the exterior panels. Similarly, all the rubber seals can be interchangeable with various other materials for water/air blocking and roof trusses my take various shapes beyond the one shown. Another example of modifications is where the exterior and interior shoulder bolts may be regular bolts with sleeves. The wall tie rods shall not be limited to the drawn assembly and may be comprised of various configurations and turnbuckles. The effect is to achieve the structural tie down of the roofing to the foundation. The plywood and composite panels are interchangeable as one or both may be installed depending on structural loads and design. Seals can be the materials drawn, or replaced with other industry seals. There are only a few examples of modifications that may be made to adjust the building to the desires and needs of any particular client.

For the components described above, for installation of the Floor Joist Assembly (FJA), Smart Wall Panels (SWPs), Fascia Panel Assembly (FPA), Soffit Panel Assembly (SPA), Roof Assembly Materials (RAM) and Ceiling Panel Assembly (CPA) the following procedures are used:

By assembling groups of FJAs, with the accompanying flooring parts, a complete floor can be easily assembled, as described below.

Verify Site Conditions for the installation of the Floor Joist Assembly (FJA):

Once the foundation is installed, the Floor Joist Assemblies (FJA) may be installed using the following procedure.

First, ensure that the previously constructed Foundation Assembly is level with no high points or protruding metal.

If the construction option for Aligning Bar Connectors (ABC) (were used they are to be removed. (Crawlspace Leveling Lifts (CLL) shall be in place a minimum of seven (7) days after the last day of concrete pour). See copending application Ser. No. 13/561,817, for details.

Installation of the Floor Joist Assemblies (FJA):

Start by installing the first Floor Joist Assembly (FJA) at square 1 (Note: square 1 is the first grid square where the first Box Bar Joist (BBJ) was installed). Place the Floor Joist Assembly (FJA) atop the Box Bar Joist (BBJ).

Insure the orientation matches the manufacturers construction documents; such as A (pink) facing perimeter north or B (pink) facing perimeter east at square 1, etc., when placing interior floor joists assemblies they connect such that D (red) connects to C (red); G (green) connects to H (green), etc., as explained above.

A connection verification system is employed on large projects where the Floor Struts 30 have a series of raised dots and holes (code) (see e.g., FIG. 11), in sequence to receive the adjacent assembly's dots and holes. This ensures proper installation.

Place the adjacent FJA per letter/color matching code and insure interlocking Floor Strut Composite (FSC) assembly rings line up ready to insert the machined shoulder bolt (MSB) or Exterior Machined Shoulder Bolt (ESB) at the perimeter.

Once two FJA are place next to each other hand tighten the machined shoulder bolt 23 into the foundation cap through the struts rings 33. Once the threads engage into the foundation cap about ½" a wrench may be used to tighten the bolt.

Placing—Vapor Retarder 24, Vapor Retarder Tape 24*a*, Subfloor 22, Strips 22*a*, 22*b*, and plugs 22*c* 22*d*, Finished Floor 21, Strips 21*a*, 21*b*, and 21*c* 21*d*:

Once two or more FJAs are bolted to the Foundation install the vapor retarder then tape between the FJA vapor retarders ensuring an airtight seal.

Install the subflooring interior strips and plugs loose-laid between the assemblies. Fasten the subflooring with adhesive or screws as detailed in manufactures assembly instructions. Perimeter subfloor strips and plugs are to be glued, nailed or screwed tight to the FJA subflooring.

Install the finished flooring strips per manufacturers recommended suggestions. For example—glue, screw, or nail the sides of the flooring strips onto the main subflooring but not to the subflooring strips; thus bridging over the subflooring strips.

Continue placing the Floor Joist Assemblies and installing the vapor retarder and tape (VRT), subflooring, strips and plugs, finished flooring strips and plugs for installation of all FJAs as described above.

Once the FJAs are installed, The Wall Assembly Installation may begin. However, do not remove the FJAs protective finished floor film until the building is completed and fully assembled.

Once the foundation and floor have been installed as discussed above, the Smart Wall Panels (SWP) may be installed. (Note the Smart Wall Panels (SWP) for doors and corners are installed the same).

First, dig a trench 10 inches out from the foundation columns, 4 inches deep. Place an erosion control mat and compacted fill at the line of the exterior façade. Insure the site grade slopes away from the building perimeter.

Proceed to square number 1 to start installation.

It is important to install the first SWP at the corner of square 1 (note: square 1 is the first grid square where the first Box Bar Joist (BBJ) was installed for the foundation). Next, add a Rim joist (Strut Composite Assembly, SCA) to the face of the FJA so that the Wall Tie Rod (WTR) is installed at the exterior corner of square 1. To install the next wall panel proceed to the right when facing the structure.

Starting at the corner, ensure an Exterior Machine Shoulder Bolt (ESB) is present with the FJAs and install the right and left (corner sides) rim joists; then screw in the Exterior Shoulder Bolts (ESB); securing the FJA assembly into the column caps.

Install the Stationary Structural Wall Corner (SSWC):

Lay one SSWC Corner frames (drywall down) in front of the corner of square 1 on the FJA. Do not remove the temporary protective weather barrier sheet covering over the SSWC Corner; insure that the protective plywood layer is laid over the floor.

Install the Steel Extension Rods (SER), Threaded Rod Turnbuckle (TRT) and Roof Truss locking Cam (RTC) into the Exterior Shoulder Bolt (ESB) 3-places: corner square 1 and adjacent slots.

Center the SSW Corner (SSWC) panel on the FJA; apply a line of sealant across the bottom plate (matching the area of vapor retarder on the wall panel), tilt the SSW Corner to a vertical position and lower it so that the two Gravity Locking Cams (GLC) slide into the predrilled holes in the column cap. When the bottom plates are resting on the FJA the GLC will slide into locking position. Note: the pre-attached rigid insulation filler is to be a tight fit at each panel engaging the rubber seals.

Next, secure the top and bottom Bolting Clamp Struts (BCS) to the Wall Tie Rods (WTR). The bolt shall be inserted through BCS tube clamp and WTR slot, and then secured only hand tight. Repeat this at all structural wall panel Bolting Clamp Struts (BCS).

Ensure the Threaded Rod Turnbuckle (TRT) has the factory set six (6) inches of tightening travel to the center nut (6 inches on both sides of center nut, or 12 inches total). Open the turnbuckle by turning the center nut. Note the WTR should be free to slide through the BCS.

Install the SSWs Cross Bracing Straps (CBS) on to the extended bolts, first hand tight and then wrench tight.

Note that the SSW Corner (SSWC) assemblies are factory mitered at the buildings (90 degree intersecting) corners. Rubber seals are set in the insulation layers to seal the wall. A Corner Trim Board (CTB) is to be set in sealant and attached to the corner.

Using the above procedures install the rest of the SSWs, SSWDs and SSWCs. Insure construction documents are followed with doors and window (opening) panel's located in their proper grid, as discussed below.

The preferred method of installation shall be such that one four foot row of SSW FJA is set at a time with the Roof Truss Assembly (RTA) and Removable Roof Panels (RRP) installed forming a sheltered area, with the possibility of covering the openings with a tarp for inclement weather.

Install the Roof Truss Assemblies (RTA):

Place a continuous line of sealant across the SSWs top plates vapor retarder.

Raise the End Truss Assembly (ETA) and lower onto the top plates of the Stationary Structural Wall (SSW). Ensure the bottom flange of the End Wall Truss (EWT) is seated atop the stud walls. Insure the truss slides into each of the Roof Truss Cams (RTC) of the Wall Tie Rods (WTR). End Wall Truss (EWT is fabricated the same as the Roof Truss Assemblies (RTA) except that the Round Anchor Tubes (RAT) shall be welded to the bottom chord to receive each (several) of the Roof Truss Cams (RTC) forming the end walls.

Once the End Truss Assembly (ETA) is setting on the top plate of the Stationary Structural Walls (SSW) tighten the turnbuckles and lock the truss and wall panels down.

Install the next Roof Truss Assembly (RTA) by lifting it over to the next Wall Tie Rods (WTR) that is four (4) feet from the end wall. Place the Roof Truss Assembly (RTA) Round Anchor Tube (RAT) through the Roof Truss Cam (RTC) and lock down by turning the turnbuckle. Tighten the turnbuckle wrench tight, and then wrench tighten the Bolts on the Bolting Clamp Struts (BCS) and tighten down the rod nuts above the Bolting Clamp Struts (BCS) wrench tight.

Install the Roof Cross Bracing (RCB) to the truss as noted on drawings (bracing placed at third (or more) points shall be anchored to predrilled holes in the vertical legs of the top and bottom chords per structural design.

Continue this procedure for the remaining roof trusses ending at the adjacent end wall.

Install the Removable Roof Panels (RRP):

Place the First Removable Roof Panel (bottom/corner with drip edge flashing on two sides and the other two sides with room for shingle overlap) in the corner of the roof plan per installation instructions (panel marked #1 Red). Slide the panel down until the drip edge is at the edge of the soffit panel location (should be a ¾" gap between the drip edge and truss edge, the panel will be properly placed as it stops at the stop block welded to the top chord of the truss. Reach underneath the panel and lock the hold down clamps. Install the next panel above this one.

Place the next Removable Roof Panel (center, with water barrier overlap on one side and side with room for shingle overlap) (marked #2 Blue) above panel #1. Slide into the stop blocks and lock the hold down bolts in place. Insure the lower edge of the asphalt shingles lap "top over bottom" for proper water drainage. Weave the sides of the asphalt shingles RRP into the adjacent shingles to form a uniform lap joint across the roof. Precede placing center panels until only one panel spot is left at the top of the roof near the roof peak.

Place the vent assembly at the roof peak (Marked #3 Green), place with drip edge aligned with panels 1 & 2.

Install the Removable Roof Panel (top) (Marked #4 Yellow) over the Roof Ridge Vent (RRV) bottom leg but under the vent top leg that protrude out of the vent assembly. Slide the top panel until it stops at the stop blocks and lock the hold down bolts in place.

Complete the steps above to install the roof panel on the other side of the roof and then to the next row. Note the bottom panels have drip edges only at the bottom in the center parts of the roof; the ends have two drip edge sides. Note the water barrier on the panels shall overlap by one (1) inch with top panel over the bottom panel with a peel and stick attachment; such that the adhesive bonds to the top of the lower panel, the shingles shall be woven into each other as they overlap by ½" and form a uniform lapping joint across the roof.

Install the Fascia Panel Assembly (FPA):

Place the Fascia Panel Assembly (FPA) on the truss galvanized steel tab supports (start at the right end to the building fascia overhangs, as viewed from outside) and lock into place on the overhang steel angles with the adjustable latch/draw latch/padlock hold down clamp center fastener.

Install the next panel to the left of the installed panel by placing on the Fascia Panel Assembly (FPA) galvanized steel tab supports and lock into place with the noted above hold down clamps. Continue installing the trapezoidal fascia panels on the gable end of the End Wall Truss (not shown) in the same way as to the overhang.

Continue until all fascias are installed on the overhang angles (outriggers) and gable ends.

Install the Soffit Panel Assembly (SPA):

Place the fixed end of the Soffit Panel Assembly (SPA) on the bottom of the truss overhang angles (start at the right side to the building soffit area), align with the Fascia Panel Assembly (FPA) and lock into place with hold down clamps to the underside of the overhang angles. Rotate the spring-loaded hurricane moveable panel down to the horizontal (flat) position against the wall.

Continue until all soffits are installed moving to the left insuring the panel overlaps the sheet metal tabs.

Install the Crawlspace Insulation Assembly (CIA):

The Crawlspace Insulation Assembly (CIA) includes foundation blocks, insulation and flashing.

Place the foundation blocks on a layer of 4" compacted fill over a puncture proof erosion control fabric.

Side each concrete block and rebar into the adjacent blocks slot. The blocks are located ½" from the face of the columns (a ½" piece of plywood may be used as a guide spacer). Continue placing the block all around the building perimeter. Ensure the blocks ends are centered on the columns. Note: Corner blocks are mitered to fit (not drawn). If the grade is sloped greater than 4 four inches (per side of building) a second layer of block is to be laid below the main/top course in a stepping configuration below grade. The top of the block is always 4'-5" to the top of the finished floor (or as specified by the construction documents).

Place the crawlspace wall rigid insulation onto the column angles; tape the joints with vapor retarder tape from the outside and tape the top of the insulation to the stationary structural wall Rigid Board insulation forming a vapor retarder at the crawl space. Place sealant between the exposed column steel angles and the Rigid Board. Leave the 12"×14" access hole open for access to the Removable Façade Wall (RFW) at this time. Near the end of wall installation, Install and tape the 12"×14" access hole insulation filler once the Removable Façade Wall (RFW) is installed.

Place a bead of sealant on the top of the concrete blocks

Install the small drip edge flashing (centered at columns) into the sealant and against the crawl space rigid insulation.

Place a bead of sealant on the small flashing in line the bead already placed on the concrete blocks.

Retrieve the long drip edge flashings and peel the paper cover off the butyl sealant at both end of the underside of the flashing. Push (center at each panel) the long drip edge flashing onto the small drip edge flashing and into the sealant on the concrete blocks and against the crawlspace insulation.

The exterior of the SSW will be exposed Rigid Board insulation. Insure all joints are taped with vapor retarder tape.

Install the Removable Façade Wall (RFW):

Proceed to square number 1 to start installation

Lay both Removable Façade Wall (RFW) panels in front of the corner of square 1 on the wall wheel barrel 2-6" above grade. Plug a power supply into the security access panel located in the main SSW (see installation plans), allowing the wall solenoid locking systems the ability to receive the RFWCs with the automatic locking feature. The emergency locking/unlocking system may also be engaged to install the RFWCs if power is not available, or if the owner requests a manual install only.

Center the Removable Façade Wall Corner (RFWC) panel on the Stationary Structural Wall Corner (SSWC); tilt the Removable Façade Wall Corner (RFWC) to a vertical position, then place so that the Wedge Locking Clamps (WLC) panel systems align (place the cams above the grove and against the metal plate, insure the threaded studs on the bottom wall's support angle are centered into the column support angle holes. Slide the Removable Façade Wall (RFW) panel down and into to the wall Wedge Locking Clamps (WLC) and column angle holes. When the Wedge Locking Clamps (WLC) are resting in the mating Wedge Locking Clamps (WLC), the locking mechanism automatically engages. Note: the steel stud insulation infill is pre attached and fits snugly next to the adjacent panel. After the Removable Façade Wall (RFW) panel is lowered tighten the two bolts at the bottom of the panel; reaching through the crawlspace insulation access holes.

The Wedge Locking Clamps (WLC) piston mechanism assembly consists of a rod and piston or solenoid that is moved upwards into the locking cams, forcing wedges into the mating housing securing it into place. The rod and piston mechanism may be operated by hydraulic, electrical or mechanical means. The mechanism controls are to be located behind the baseboard trim hatch at the Electrical Galvanized Raceway (EGR) in a main SSW. The mechanism is to have a security access for operation and an outlet for 24-volt power supply or similar.

Install Smart Wall Panel (SWP) assemblies in rows when facing the end structure at square number 1. Install the remaining panels per sections above in the same way the corner panels were installed.

When installing the openings (doors and windows) ensure the flashing overlap in a shingle fashion shedding water/moisture to the outside (windows are not drawn)

Insure the corner rubber seals remain in place, tape adjacent corner/panel vapor retarder sheets together.

Install and tape the 12"×14" access hole insulation filler at the Crawlspace Insulation Assembly (CIA).

Install the Ceiling Panel Assembly (CPA):

Start at the corner of the building and install the ceiling panels up towards the ridge of the building. Install both sides of the row (left and right sides of the truss) and the center (ridge) panel and then the last top panels. Then install the next row.

The first (low) Ceiling Panel Assembly (CPA) (marked 001 Red) has two vertical sides that are to be placed against the Stationary Structural Wall (SSW) in the corner. The panels are designed to be lifted 90 degrees to placement and turned onto the bottom cords and slid into place (preferred), or can be placed straight up if they cannot be rotated into place. Note: when the panels are placed straight up the locking clamps sleeve need to be slid back to bypass the bottom cord, the panel lifted and clamps pushed through the bottom chords, when at the correct ceiling height (clamps above the bottom cords), slide the sleeve over the bottom cord and tighten the bolts hand tight at this time (an alternate clamping method uses four horizontal quick release hold down clamps). The vertical sides and horizontal lap of the CPA insulation has continuous rubber seals around them, insure they are undamaged and in the routed slot where they are glued.

The second (center) Ceiling Panel Assembly (CPA) (Marked 002 Blue) has one vertical side that is to be placed against the Stationary Structural Wall (SSW). Install as before. The second panel must fit into the first such that the sheet metal top laps onto the lower panel's sheet metal and the mastic on the sheet metal seals the ceiling. Note: the top panel should lap over or on top of the lower panel.

The third Ceiling Cap (long) Assembly (CCA) (Marked 003 Green) is placed into the slot of Ceiling Panel Assembly (CPA) (Marked 004 Yellow) and as above.

Continue to the next row and proceed as before. Note that the Ceiling Cap Assemblies (CCAs) alternate long and short and are mated with the matching CPA length.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A panelized building, built on a foundation, comprising:
   a) a floor assembly;
   b) a plurality of wall panels, each of said plurality of wall panels having a structural support wall portion, attached to said floor assembly and an exterior façade wall portion, removably attached to said structural support wall portion;
   c) a plurality of roof truss members each of said plurality of roof truss members having a top and a bottom, attached to said structural support wall portions;
   d) a plurality of panelized ceiling members, attached to the bottom of said plurality of said roof truss members;
   e) a plurality of roof panels, attached to the top of said plurality of roof truss members;
   f) a plurality of fascia panel assemblies, attached to said plurality of roof panels and extending downwardly therefrom; and
   b) a plurality of soffit panel assemblies, attached to said plurality of fascia panel assemblies, wherein each of said soffit panel assemblies includes:
   i) a soffit lock down assembly having a sheet metal portion a wooden finish trim member; a slot for airflow venting;
   ii) a moveable finish panel; and
   iii) a fixed finish panel having at least one lockable spring hinge attached thereto and further wherein the to at least one lockable spring hinge is also attached to said movable finish panel such that said movable finish panel is movable with respect to said fixed finish panel.

2. The panelized building of claim 1 further comprising a plurality of crawlspace insulation assemblies, attached to said plurality of structural walls and extending downward therefrom.

3. The panelized building of claim 1 further comprising at least one door assembly, installed on said floor between two of said plurality of wall panels.

4. The panelized building of claim 3 wherein said door assembly comprises, and inner structural door component and an exterior façade door component.

5. The panelized building of claim 1 wherein the floor assembly includes:
   a) a plurality of floor joist assemblies that are connected by a series of strut rings and bolts;
   b) a sub floor, attached to said plurality of floor joist assemblies; and
   c) a finished floor, attached to said sub floor.

6. The panelized building of claim 5 wherein each of said plurality of floor joist assemblies includes a plurality of floor strut assemblies.

7. The panelized building of claim 1 wherein each of said structural support wall portions include:
   a) top protection plate having a plurality of rings attached thereto;
   b) a pair of cross bracing straps;
   c) interior rigid insulation attached to said pair of cross bracing straps;
   d) a plywood panel, attached to said ridged insulation;
   d) at least one wedge locking clamp attached to said plywood panel;
   e) a solenoid operated spring locking system attached to said plywood panel and being n operative communication with said at least one wedge locking clamp;
   f) a plurality of steel galvanized plates attached to said plywood panel;
   g) at least one gravity locking cams attached to said plywood panel and also being in operative communication with said at least one wedge locking clamp;
   h) a pair of wall tie rod assemblies installed in said structural support wall portion, said pair of wall tie rod assemblies being attached to one of said plurality of floor joist assemblies;
   i) a wall stud frame assembly attached to said plywood panel; and
   j) an interior wall board member, being attached to said wall stud frame assembly.

8. The panelized building of claim 7 further comprising:
   a) a section of crown molding, attached to said interior wall board member; and
   b) a base molding, attached to said wall board member.

9. The panelized building of claim 2 wherein each of said plurality of crawlspace insulation assemblies includes:
   a) a concrete bond beam;
   b) a piece of flashing having a drip edge attached to said concrete bond beam; and
   c) a piece of rigid insulation attached to said concrete bond beam.

10. The panelized building of claim 9 wherein each of said plurality of crawlspace insulation assemblies further includes a length of galvanized rebar, installed within said concrete bond beam.

11. The panelized building of claim 1 further comprising four corner wall sections, attached to said floor and to said plurality of wall panels.

12. The panelized building of claim 11 wherein each of said four corner wall sections comprise:
   a) a first wall panel assembly having a structural support wall portion, attached to said floor assembly and an exterior façade wall portion, removably attached to said structural support wall portion; and
   b) a second wall panel assembly having a structural support wall portion, attached to said floor assembly and an exterior façade wall portion, removably attached to said structural support wall portion;
   c) whereby said first and second wall panel assemblies are connected orthogonally.

13. The panelized building of claim 12 wherein said first and second wall panel assemblies each have a side portion that is mitered.

14. The panelized building of claim 1 wherein each of said plurality of panelized ceiling members includes:
   a) a sheet metal ceiling panel;
   b) at least two ceiling anchor clamps attached to said sheet metal ceiling panel;
   c) a plywood platform attached to said sheet metal ceiling panel;
   d) an insulation support frame attached to said plywood platform;
   e) a quantity of insulation installed in said insulation support frame; and
   f) a lower finish material. Attached to said insulation support frame.

15. The panelized building of claim 14 wherein the lower finish material is drywall.

16. The panelized building of claim 1 wherein each of said plurality of roof panels comprise:
   a) an outer finish material;
   b) a hurricane protection plate installed below said outer finish material;
   c) a plywood panel, attached to said hurricane protection plate;
   d) a pair of roof panel support angles attached at the top and bottom of said plywood panel; and
   e) two horizontal quick release hold down clamps, attached to said plywood panel.

17. The panelized building of claim 1 further comprising a roof ridge vent, installed on said plurality of roof truss members.

18. The panelized building of claim 1 wherein each of said fascia panel assemblies includes:
   a) a galvanized sheet metal flashing portion;
   b) a fascia panel, offset from said galvanized sheet metal flashing portion;
   c) a plywood panel, attached to said fascia panel;
   d) a fascia board having a rubber of foam seal, attached to said fascia panel; and
   e) at least one hold down clamp attached to the fascia assembly to hold the fascia panel assembly one of said roof truss members.

\* \* \* \* \*